(12) United States Patent
Lee et al.

(10) Patent No.: US 8,866,734 B2
(45) Date of Patent: Oct. 21, 2014

(54) MOTION INPUT DEVICE FOR PORTABLE TERMINAL AND OPERATION METHOD USING THE SAME

(75) Inventors: Jae Myeon Lee, Yongin-si (KR); Hyun Su Hong, Seongnam-si (KR); Jin Yong Kim, Seoul (KR); Kyung Hwa Kim, Seoul (KR); Seung Woo Shin, Seoul (KR); Ji Hye Ban, Suwon-si (KR); Jung Yeob Oh, Seongnam-si (KR); Myeong Lo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 888 days.

(21) Appl. No.: 12/615,733

(22) Filed: Nov. 10, 2009

(65) Prior Publication Data

US 2011/0053641 A1    Mar. 3, 2011

(30) Foreign Application Priority Data

| Nov. 10, 2008 | (KR) | 10-2008-0111242 |
| Nov. 13, 2008 | (KR) | 10-2008-0112907 |
| Nov. 26, 2008 | (KR) | 10-2008-0118088 |
| Nov. 28, 2008 | (KR) | 10-2008-0120057 |
| Dec. 1, 2008 | (KR) | 10-2008-0120440 |
| Dec. 1, 2008 | (KR) | 10-2008-0120477 |
| Mar. 19, 2009 | (KR) | 10-2009-0023500 |

(51) Int. Cl.
*G09G 5/00* (2006.01)
*G06F 3/01* (2006.01)
*G06F 1/16* (2006.01)

(52) U.S. Cl.
CPC .............. *G06F 1/1694* (2013.01); *G06F 3/017* (2013.01); *G06F 1/1626* (2013.01)
USPC ............................ 345/156; 345/173; 715/863

(58) Field of Classification Search
CPC ............................... G06F 1/1694; G06F 3/017
USPC .................................. 345/156–178; 715/863
See application file for complete search history.

(56) References Cited

U.S. PATENT DOCUMENTS

| 6,268,857 B1 * | 7/2001 | Fishkin et al. ................. 715/863 |
| 2005/0216867 A1 * | 9/2005 | Marvit et al. .................. 715/863 |
| 2007/0177803 A1 * | 8/2007 | Elias et al. .................... 382/188 |

* cited by examiner

*Primary Examiner* — Michael Pervan
(74) *Attorney, Agent, or Firm* — H.C. Park & Associates, PLC

(57) ABSTRACT

The present invention relates to a motion input device for portable terminal and an operation method using the same. A motion input device of a portable terminal of the present invention includes a sensor unit configured to collect a sensor signal from at least one sensor; an operation recognition unit configured to generate a motion signal corresponding to an operation of portable terminal based on the sensor signal; a scenario preparation unit configured to generate an input scenario based on at least one motion signal; and a scenario mapping unit configured to detect, in a scenario database, a standards scenario corresponding to the input scenario, and to generate an input signal corresponding to the standards scenario.

23 Claims, 36 Drawing Sheets

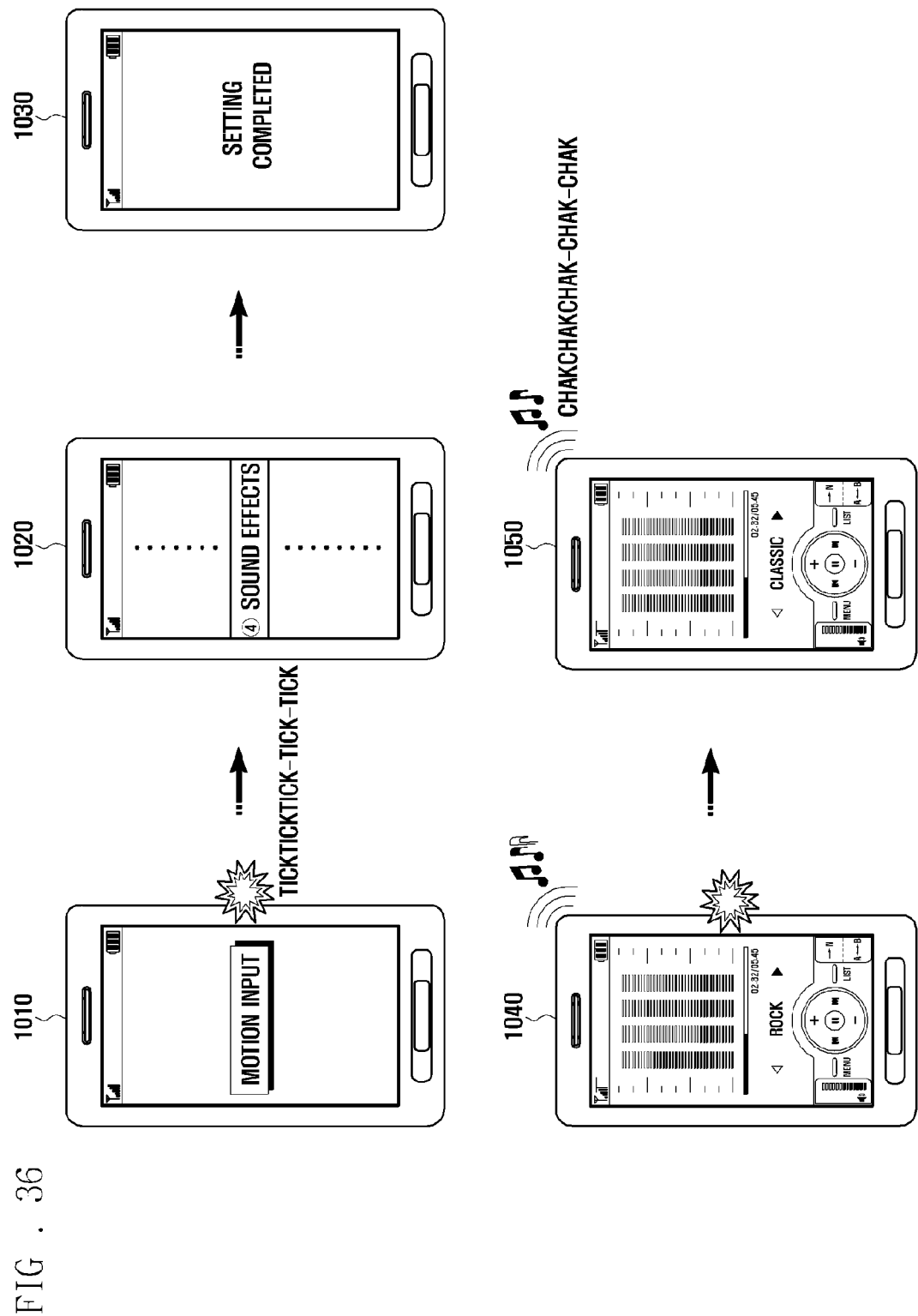

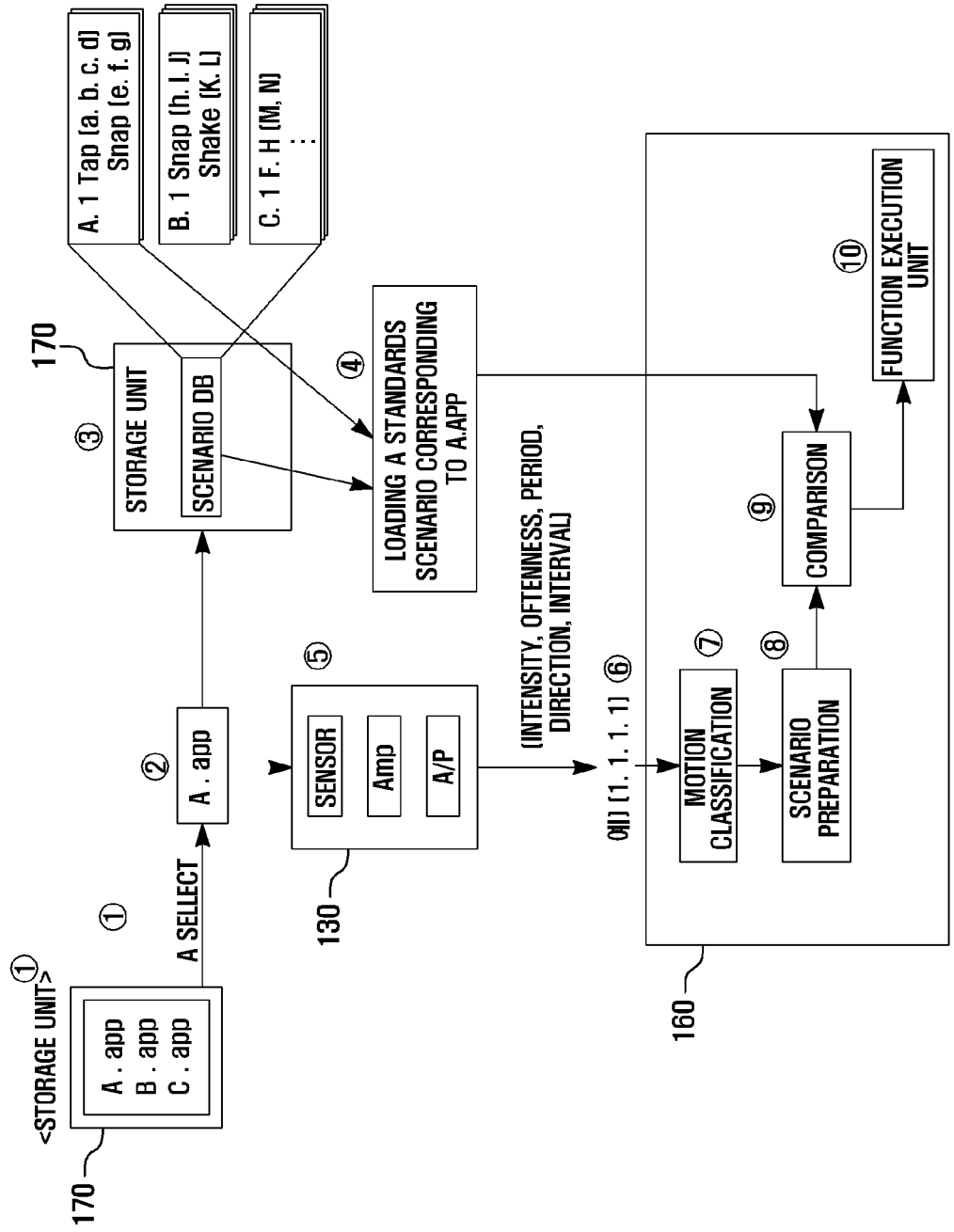

MOTION INPUT DEVICE FOR PORTABLE TERMINAL AND OPERATION METHOD USING THE SAME

CROSS REFERENCE TO RELATED APPLICATION

This application claims priority from and the benefit of Korean Patent Application No. 10-2008-0111242, filed on Nov. 10, 2008, Korean Patent Application No. 10-2008-0112907, filed on Nov. 13, 2008, Korean Patent Application No. 10-2008-0118088, filed on Nov. 26, 2008, Korean Patent Application No. 10-2008-0120057, filed on Nov. 28, 2008, Korean Patent Application No. 10-2008-0120440, filed on Dec. 1, 2008, Korean Patent Application No. 10-2008-0120477, filed on Dec. 1, 2008, and Korean Patent Application No. 10-2009-0023500, filed on Mar. 19, 2009, the contents of which are hereby incorporated by reference for all purposes as if fully set forth herein.

BACKGROUND OF THE INVENTION

1. Field of the Invention

Exemplary embodiments of the present invention relate to a motion input device for a portable terminal and an operation method using the same.

2. Description of the Background

Recently, portable terminals have become widely used because of their portability. Particularly, among the portable terminals, a mobile communications terminal which enables the voice communications while moving has very high popularity. The mobile communications terminal can have various other functions such as a MP3 function, corresponding to a file playing function, or an image collection function corresponding to a digital camera capable of collecting an image. Moreover, the typical portable terminal supports a function capable of performing a mobile game or an arcade game. The typical portable terminal uses a touch screen method which controls the portable terminal according to the generation of a touch event, and a keypad method which controls the portable terminal according to a key input, as an input signal generation method. According to the touch screen and keypad methods, a user is able to more flexibly and rapidly control the operation of the portable terminal. However, such an input signal generation method requires a delicate touch or a delicate click operation. That is, the conventional input signal generation method cannot generate an input signal which the user wants when the user does not accurately press a specific key prepared in a keypad, or does not accurately touch a touch area outputted to a touch screen. As portable terminals have become smaller in size, this problem has become an increasingly common problem.

SUMMARY OF THE INVENTION

Exemplary embodiments of the present invention provide a motion input device of a portable terminal and an operation method of the portable terminal which applies a motion to a program executed in a terminal after recognizing a motion of user and converts the motion into a proper input signal.

It is to be understood that both the foregoing general description and the following detailed description are exemplary and explanatory and are intended to provide further explanation of the invention as claimed.

Exemplary embodiments of the present invention provide a method of operating a portable terminal. The method includes determining at least one standards scenario corresponding to an application program in the portable terminal, operating at least one sensor arranged in a portable terminal, receiving, from the at least one sensor, a sensor signal, and generating a motion signal based on the sensor signal. The motion signal corresponds to an operation of the portable terminal. The method further includes generating an input scenario based on the motion signal, detecting, in the at least one standards scenario, a same standards scenario as the input scenario, and generating an input signal corresponding to the detected standards scenario.

Exemplary embodiments of the present invention provide a method of operating a portable terminal. The method includes activating an application program in response to an input of a motion input, and displaying at least one motion signal combination corresponding to the application program using at least one of a text, an image, and an icon.

Exemplary embodiments of the present invention provide a motion input device of a portable terminal. The motion input device includes a sensor detection unit, an operation recognition unit, a scenario preparation unit, a storage unit, and a scenario mapping unit. The sensor detection unit is configured to receive at least one sensor signal from at least one sensor unit. The operation recognition unit is configured to generate, based on the at least one sensor signal, a motion signal corresponding to an operation of the portable terminal. The scenario preparation unit is configured to generate an input scenario based on the motion signal. The storage unit is configured to store at least one application program. The scenario mapping unit is configured to detect, in a scenario database, a standards scenario corresponding to the input scenario, and to generate an input signal corresponding to the standards scenario after determining an application program being executed in the portable terminal, and determining at least one standards scenario corresponding to the determined application program and stored in the scenario database.

Exemplary embodiments of the present invention provide a motion input device of a portable terminal. The motion input device includes a storage unit and a display unit. The storage unit stores an application program in response to input of a motion input. The display unit displays, using at least one of a text, an image, and an icon, at least one motion signal combination corresponding to the application program being executed on the portable terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIGS. 27, 28, 29, 30, 31, 32, 33, 34, 35, and 36 are drawings illustrating a fifth exemplary embodiment of the present invention, FIG. 37 is a drawing illustrating an operation process according to an exemplary embodiment of the present invention.

DETAILED DESCRIPTION OF THE ILLUSTRATED EMBODIMENTS

Figure 1:
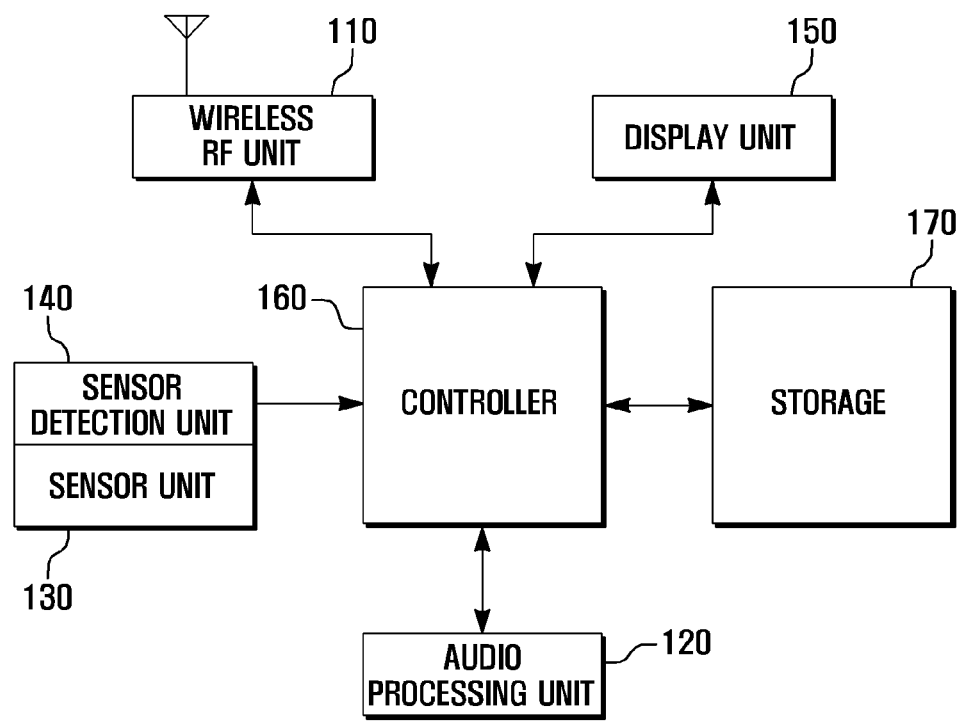
FIG. 1 is a block diagram illustrating a configuration of a portable terminal according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Prior to explaining exemplary embodiments of the present invention, relevant terminology will be defined for the description below.

A sensor signal may refer to a signal which is transmitted to an operation recognition unit of a controller after a sensor detection unit detects the signal generated in the sensor. A motion signal may refer to a signal which indicates the operation performed by a portable terminal through sensor signals received from a sensor detection unit.

Hereinafter, exemplary embodiments of the present invention will be described in detail with reference to the accompanying drawings.

FIG. 1 is a block diagram illustrating a configuration of a portable terminal according to an exemplary embodiment of the present invention.

Referring to FIG. 1, a portable terminal 100 includes a wireless radio frequency (RF) unit 110, an audio processing unit 120, a sensor unit 130, a sensor detection unit 140, a display unit 150, a storage unit 170, and a controller 160. The portable terminal 100 may activate a motion input device according to a user input, and prepare an input scenario based on a plurality of inputted motion operations. The portable terminal 100 may detect a same standards scenario as an input scenario by comparing the input scenario with the standards scenario matched to a stored scenario database. The portable terminal 100 may then generate an input signal mapped to the standards scenario, and apply the generated input signal to the executing application program of the portable terminal 100.

Hereinafter, each configuration of the portable terminal 100 is illustrated in detail. The radio frequency unit 110 transmits and receives a voice signal required for the call function and data required for data communications under the control of the controller 160.

The radio frequency unit 110 can include a radio frequency transmitter which amplifies a frequency of the transmitted signal and up-converts the transmitted signal, and a radio frequency reception unit which low-noise amplifies a received signal and down-converts the frequency of the received signal. Particularly, the radio frequency unit 110 can form a communications channel with another portable terminal, or can cancel a communications channel formed with another portable terminal according to a motion signal which is generated by the controller 160 based on sensor signals generated by the sensor detection unit 140. The audio processing unit 120 includes a speaker (SPK) for reproducing audio data transceived during the call, and a microphone (MIC) for collecting a voice of a portable terminal user or other audio signals during the call.

The audio processing unit 120 sends an audio signal by forming a communications channel according to the motion signal which is generated by the controller 160 based on sensor signals generated by the sensor detection unit 140. The audio processing unit 120 may also output a corresponding audio signal through the speaker (SPK) in case a specific audio file is executed according to the motion signal. During formation of the communications channel, the microphone (MIC) of the audio processing unit 120 collects the audio signal and can transmit the audio signal to another portable terminal through the communications channel under the control of the controller 160.

The sensor unit 130 includes various sensors such as, for example, an acceleration sensor, a gyro sensor, a pressure sensor, and a vibration sensor. The sensors operate based on a power supplied under the control of the controller 160. The sensors may generate a specific signal according to the movement of the portable terminal 100 or a pressure transmitted to the portable terminal 100.

The sensor unit 130 can send a specific signal generated by the sensors to the sensor detection unit 140. In addition, the sensor unit 130 can include an additional sensor such as a terrestrial magnetism sensor, an optical sensor, and a photo sensor. The sensor detection unit 140 monitors various sensors and can determine which sensor generates a signal. Accordingly, the sensor detection unit 140 can send, to the controller 160, information on the sensor generating a signal, and a signal value sent from the corresponding sensor.

In more detail, if the acceleration sensor is arranged in the inner side of a portable terminal 100 case, the sensor detection unit 140 can detect a signal generated according to the shaking or snap movement of the portable terminal 100. The sensor detection unit 140 can detect the shaking and snap movement through a change of frequency, which is generated according to the movement of the portable terminal 100. For example, the sensor detection unit 140 classifies movement of the portable terminal 100 as a shaking when an amplitude-frequency change curve generated according to the movement of the portable terminal 100 is gentle, and the amplitude-frequency change curve is generated many times. If the amplitude-frequency change curve is steep and is generated one time, the movement can be classified as a snap.

The sensor detection unit 140 can detect, using a gyro sensor, a signal corresponding to a change of direction of the portable terminal 100, such as, for example, tilting of the portable terminal 100. Moreover, by using a vibration sensor, the sensor detection unit 140 can detect a signal corresponding to the shaking of the portable terminal 100, or a signal corresponding to the vibration due to external shocks. The sensor detection unit 140 can detect, using a pressure sensor, a signal generated according to the pressure applied to a case of the portable terminal 100 from the outside. For example, by using the pressure sensor, the sensor detection unit 140 can detect a signal which is generated if the user is holding the portable terminal 100, or how firmly the portable terminal 100 is held. The sensor detection unit 140 can detect whether the user holds the exterior of the portable terminal 100 by using a proximity sensor. The sensor detection unit 140 can send signals detected from respective sensors to the controller 160 as respective sensor signals. The display unit 150 outputs a screen activated according to the function of the portable terminal 100. For example, the display unit 150 can output a booting screen, a stand-by screen, a menu screen, and a call screen.

The display unit 150 can include a liquid crystal display (LCD). The display unit 150 can include a LCD controller, a memory to store data, and a LCD displaying device. If the LCD is a touch screen type, the screen of the display unit 150 can be operated as an input unit.

The display unit 150 can output a screen depending on the activation of a specific application program according to the request of user. The display unit 150 can output a menu item mapping a standards scenario controlling an application program currently being executed for an input signal or an input signal table mapping a standards scenario menu item. If the user inputs a separate motion signal, the input signal table can be displayed as a window overlapping an application program screen, or can be output to a separate pop-up window. The input signal table can be added to a relevant image in the output of an image corresponding to a key for the activation of an application program if the input signal table is displayed but not output to the separate pop-up window or not overlapping a screen. For example, the display unit 150 can output at least one menu item, and can output the combination of text, image, or icon with the menu item. At least one standards scenario for executing a corresponding menu item is predefined. The storage unit 170 stores an application program for the motion input device operation, a database for the support of the motion input device, user data, as well as an application program necessary for functional operations according to exemplary embodiments of the present invention.

The storage unit 170 can manage the function of buffering, which temporary stores motion signals collected in the operation of the motion input device. This storage unit 170 includes a program area and a data area. The program area stores an operating system (OS) for booting the portable terminal 100, an application program for the operation of the sensor unit included in the motion input device, and an application program necessary for other function options of the portable terminal 100, such as, for example, a sound playing function, and an image or moving picture playing function.

The program area can store a motion input device support application program, an application program for operating each sensor included in the sensor unit 130, a program which collects a signal from the sensor unit 130 and prepares an input scenario, a program which compares the prepared input scenario with a standards scenario prepared in the input signal table and generates a corresponding input signal, and an application program for executing a specific function according to the generated input signal.

The data area is an area in which the data generated according to the use of the portable terminal 100 are stored. The user data relating to various function options such as, for example, the moving picture, the phone book data, the audio data, and information corresponding to relevant contents or user data, can be provided by the portable terminal 100 and stored in the data area.

Moreover, the data area stores the above-described input signal table, and loads the input signal table into the controller 160. To this end, the data area can store a scenario database. The scenario database is an input signal table prepared according to an application program. The input signal table is, as described above, a table in which the standards scenario and the input signal are mapped according to an application program.

The controller 160 controls the power supply of the portable terminal 100 and the activation of respective devices, and a signal flow transmitted and received between the respective devices. Particularly, the controller 160 controls the power supply to the sensor unit 130 and the sensor detection unit 140. By using the motion signal generated based on a sensor signal generated by the sensor detection unit 140, the controller 160 prepares an input scenario based on a signal that the sensor unit 130 generates.

The input scenario is generated based on one or more motion signals. If the user selects a motion user interface (UI) activation mode, the controller 160 selects and loads, in the scenario database, an input signal table corresponding to an application program being executed in the portable terminal 100. The controller 160 detects the same standards scenario by comparing the generated input scenario and the standards scenarios in the input signal table. Thereafter, the controller 160 can control to generate an input signal corresponding to the detected standards scenario, and to apply a relevant input signal to the application program being executed.

Figure 2:
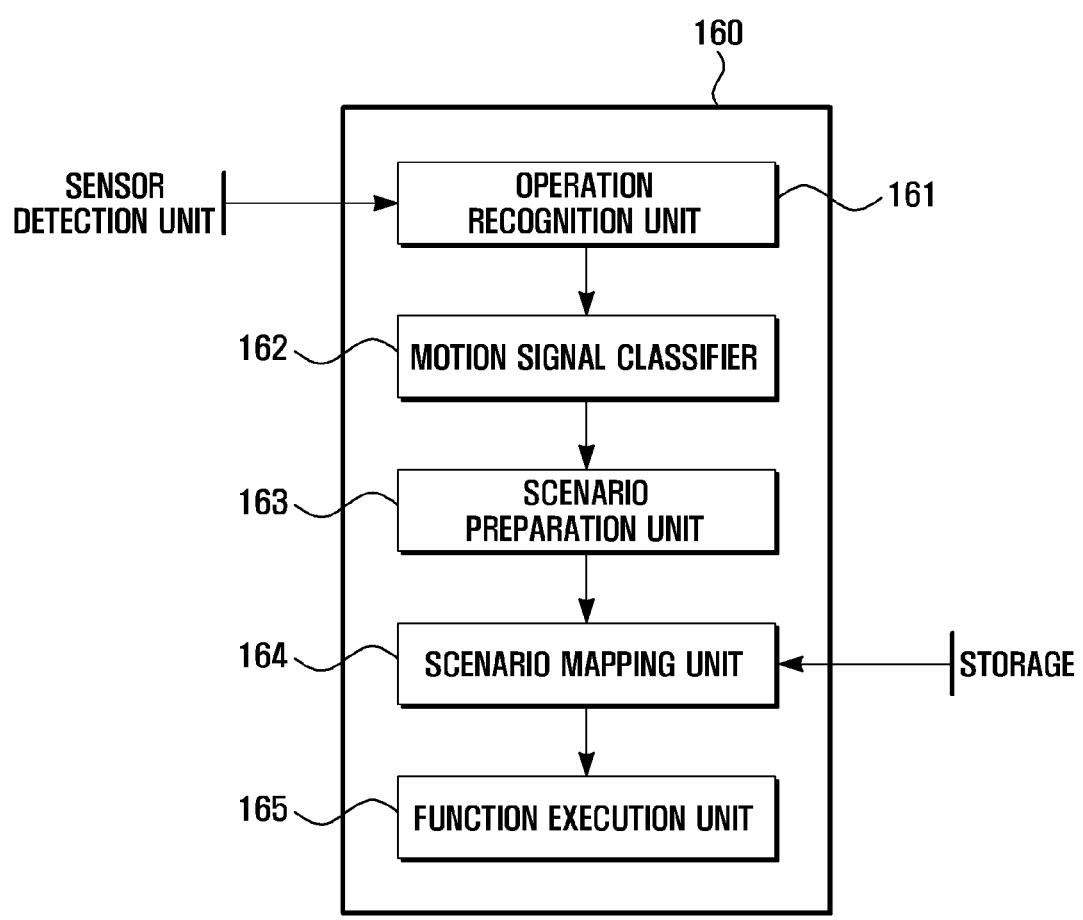
FIG. 2 is a drawing illustrating a configuration of a controller according to an exemplary embodiment of the present invention.

As shown in FIG. 2, the controller 160 can include an operation recognition unit 161, a motion signal classifier 162, a scenario preparation unit 163, a scenario mapping unit 164 and a function execution unit 165.

The operation recognition unit 161 is a configuration of recognizing the operation performed by the portable terminal 100 based on a sensor signal sent from the sensor detection unit 140. The operation recognition unit 161 collects a sensor signal sent from the sensor detection unit 140, and classifies the collected sensor signal into a corresponding motion signal. That is, the operation recognition unit 161 can generate a motion signal corresponding to motions such as tapping, shaking, snapping, tilting, griping, and a no-motion state, based on a sensor signal generated in the sensor detection unit 140.

For example, if the user taps a case of the portable terminal 100, the sensor detection unit 140 receives a signal from at least one of the vibration sensors and the pressure sensors included in the sensor unit 130. The sensor detection unit 140 generates a sensor signal corresponding to the received signal in a specific sensor, and sends the sensor signal to the operation recognition unit 161. The operation recognition unit 161 can generate a tapping motion signal based on the sensor signal. Moreover, if the user shakes the portable terminal 100, the operation recognition unit 161 can generate a motion signal corresponding to the shaking or the snapping by using a sensor signal sent by the sensor detection unit 140, which receives a signal from at least one of the acceleration sensors and the vibration sensors of the sensor unit 130.

The sensor detection unit 140 differently sends the oscillation waveform generated (e.g., sensor signal) according to the shaking motion of the portable terminal and the oscillation waveform generated according to the snapping operation to the operation recognition unit 161. The operation recognition unit 161 can classify and generate a shaking or snapping motion signal based on the sent sensor signal. Additionally, the operation recognition unit 161 generates a motion signal according to a sensor signal provided by the of gyro sensor in the sensor detection unit 140, and can generate a griping motion signal according to the sensor signal provided by the pressure sensor in the sensor detection unit 140. The operation recognition unit 161 can generate a motion signal corresponding to a rubbing movement of the portable terminal 100 based on a sensor signal sent form the sensor detection unit 140.

In this way, the operation recognition unit 161 can detect a plurality of motion signals based on the type of sensor signal. Each motion signal generated in the operation recognition unit 161 is sent to the controller 160 and becomes a basic element to prepare an input scenario.

The motion signal classifier 162 executes a task of classifying motion signals which are sent from the operation recognition unit 161 on a real time basis. That is, the motion signal classifier 162 classifies the tapping motion signal, the shaking motion signal, the snapping motion signal, the tilting motion signal, the griping motion signal, the no-operation motion signal, and the rubbing motion signal sent from the operation recognition unit 161, and successively sorts and sends the classified motion signals to the scenario preparation unit 163.

The scenario preparation unit 163 prepares an input scenario based on motion signals received from the operation recognition unit 161. For example, if a first no-operation motion signal indicating that a motion signal is not inputted for a first predefined time is provided by the operation recognition unit 161, the scenario preparation unit 163 executes an initialization process for the preparation of input scenario. If a motion corresponding to at least one of the tapping motion, the shaking motion, the snapping motion, the tilting motion, and the griping motion is input, the scenario preparation unit 163 sequentially assembles a corresponding motion signal. Thereafter, if a motion signal which terminates one input scenario (e.g., a second no-operation motion signal indicating that a motion signal is not input for a second predefined time) is input, the scenario preparation unit 163 can determine a combination of the motion signals which are previously combined as one input scenario.

If a no-operation motion signal is input for a third time which is predefined between each input motion signal, the scenario preparation unit 163 can classify a motion signal previously input and a motion signal which is input later.

If a plurality of motion signals is simultaneously input, the scenario preparation unit 163 can recognize those signals as one motion signal in view of a point of time. For example, if a griping motion signal and a shaking motion signal are simultaneously input, the scenario preparation unit 163 can determine the griping motion signal and the shaking motion signal as one motion signal. Moreover, the scenario preparation unit 163 can prepare an input scenario by separating and recognizing each simultaneously generated motion signal. This scenario preparation unit 163 sends the prepared input scenario to the scenario mapping unit 164. The scenario mapping unit 164 compares the input scenario sent from the scenario preparation unit 163 with the standards scenario prepared in the input signal table, and generates a corresponding input signal.

The scenario mapping unit 164 loads an input signal table corresponding to an application program being executed on the portable terminal 100. The input signal table is provided from the scenario database which is previously stored in the storage unit 170. The scenario mapping unit 164 sends an input signal corresponding to the input scenario to the function execution unit 165. An example of information provided by the input signal table is shown in TABLE 1 and shall be discussed in further detail below.

The function execution unit 165 is configured to use an application program being executed on the portable terminal 100 based on an input signal sent from the scenario mapping unit 164. For example, the function execution unit 165 may be playing an audio file, and may receive an input signal corresponding to "pausing" from the scenario mapping unit 164. The function execution unit 165 can then stop the playing of the audio file being played.

As described above, the portable terminal 100 including a motion input device according to an exemplary embodiment of the present invention can activate the motion input device according to the request of user, generate an input signal corresponding to the input motion signal, and apply a corresponding input signal to the application program being executed.

Figure 3:
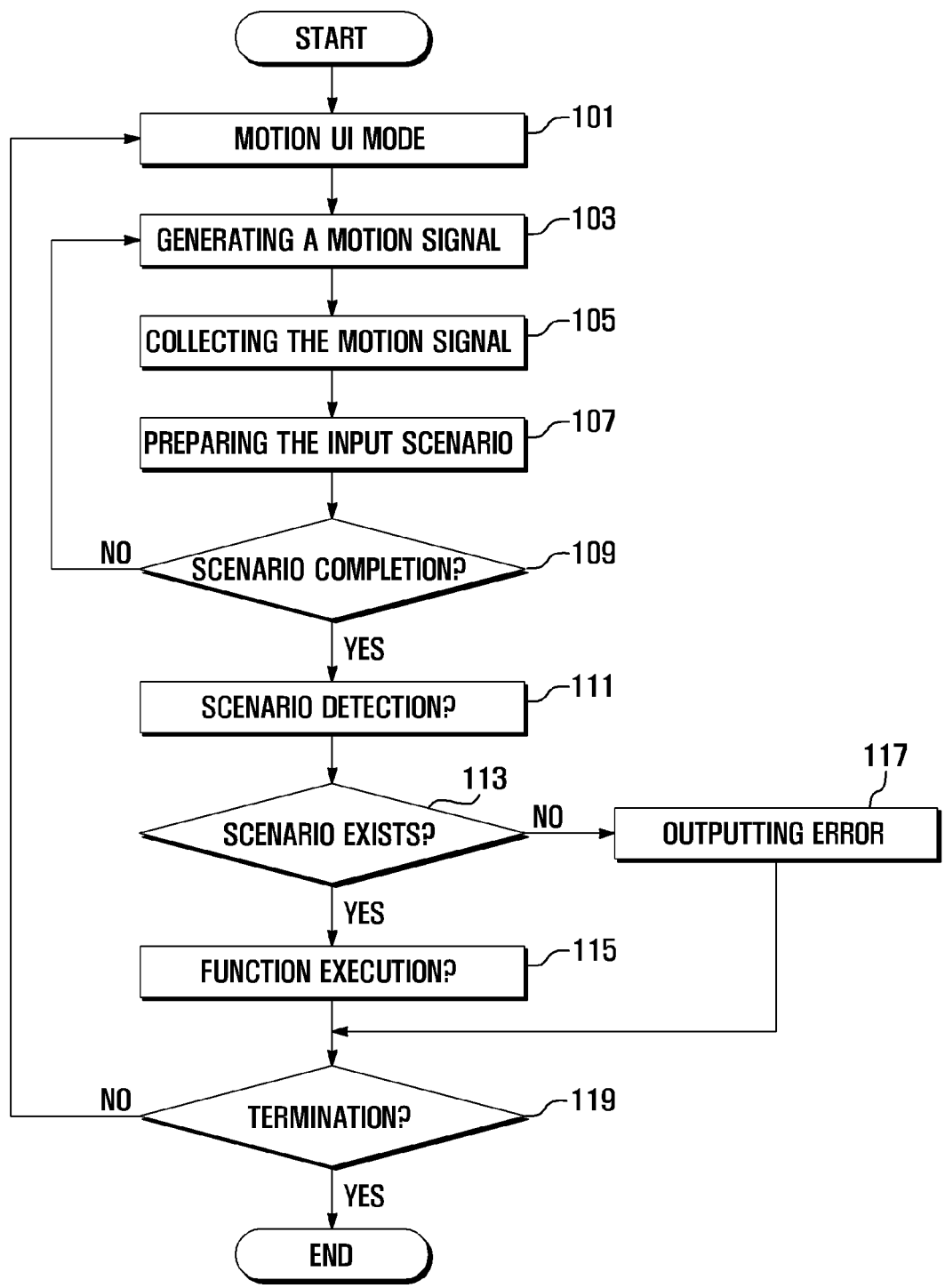
FIG. 3 is a flowchart illustrating an operating method of a motion input device according to an exemplary embodiment of the present invention.

FIG. 3 is a flowchart illustrating an operation method of a motion input device according to an exemplary embodiment of the present invention.

Referring to FIG. 3, if the portable terminal 100 activates a motion UI mode according to the request of user (101), the portable terminal 100 executes an initialization process for the driving of motion input device. For example, if a hotkey or a menu item for the switching of motion UI mode is activated, the user can activate a corresponding hotkey or can select the menu item. The portable terminal 100 then supplies power to the sensor unit 130 and the sensor detection unit 140 for the support of motion UI mode. The sensor unit 130 further supplies power to various sensors, for example, an acceleration sensor, a vibration sensor, a pressure sensor, and a gyro sensor, included in the portable terminal 100, so that the sensor unit 130 performs an initialization.

If a signal is generated in each sensor unit 130, the sensor detection unit 140 receives the signals from each sensor unit 130 and generates a sensor signal based on a signal value generated according to the sensor the signal is received from. The sensor signals generated by the sensor detection unit 140 are then provided to the operation recognition unit 161.

The operation recognition unit 161 of the portable terminal 100 generates a motion input signal based on the received sensor signal (103). That is, the operation recognition unit 161 generates a motion signal corresponding to the operation of the portable terminal 100 based on the sensor signal (e.g., the tapping motion signal, the shaking motion signal, the snapping motion signal, the tilting motion signal, the griping motion signal, and the no-operation motion signal) detected in each sensor unit 130. The scenario preparation unit 163 collects the motion signal from the operation recognition unit 161 (105) and prepares the input scenario (107). The scenario preparation unit 163 checks whether the input scenario being prepared is completed (109). If the input scenario is not complete, the process returns to step 103.

In more detail, if a motion signal indicating the completion of one input scenario among the transmitted motion signals is sent, for example, in case the no-operation motion signal is sent for a predefined time, the scenario preparation unit can complete the input scenario by assembling the motion signals which are previously input. In the completion process of the input scenario, if a motion signal is input, for example, if a shaking motion signal is input after a griping motion signal is input, and a no-operation motion signal is input, the scenario preparation unit can generate one input scenario which includes a griping motion signal and a shaking motion signal, which are successively input.

Moreover, after a griping motion signal and a shaking motion signal are simultaneously input, if a no-operation motion signal is input for a predefined time, the scenario preparation unit can generate one input scenario including the simultaneously input griping motion signal and shaking motion signal.

If a no-operation motion signal is input for a predefined time after one motion signal is input, the scenario preparation unit can generate one input scenario including the one motion signal and the no-operation motion signal. That is, by using motion signals which are input according to a predefined condition regardless of the kind and number of motion signal, the scenario preparation unit can prepare an input scenario. If the input scenario is completed, the portable terminal 100 examines whether the prepared input scenario corresponds to standards scenarios stored in the scenario database (111).

To this end, the portable terminal 100 checks an application program (e.g., a stand-by screen application program, a file playing application program, a call program, and a camera application program) being executed. The portable terminal 100 reads an input signal table corresponding to a relevant application from the scenario database, and can check whether a standards scenario corresponds to the input scenario exists (113). If the input scenario does not exist, the portable terminal 100 can output an input error (117), or can ignore an input scenario. If a standards scenario corresponding to the input scenario exists at step 113, the portable terminal 100 supports execution of the function (115). That is, the portable terminal 100 checks the input signal table and generates an input signal corresponding to the input scenario. In addition, the portable terminal 100 applies this input signal to the application program being executed on the portable terminal 100. The portable terminal 100 then checks whether the motion UI mode is terminated or whether the motion UI mode is maintained (119). If the motion UI mode is terminated, the process illustrated in FIG. 3 ends. If the motion UI mode is not terminated, the process returns to step 101 and repeatedly performs the steps described above in relation to FIG. 3.

An example of screen interface according to the motion input device based portable terminal operation is illustrated with reference to FIG. 4.

Figure 4:
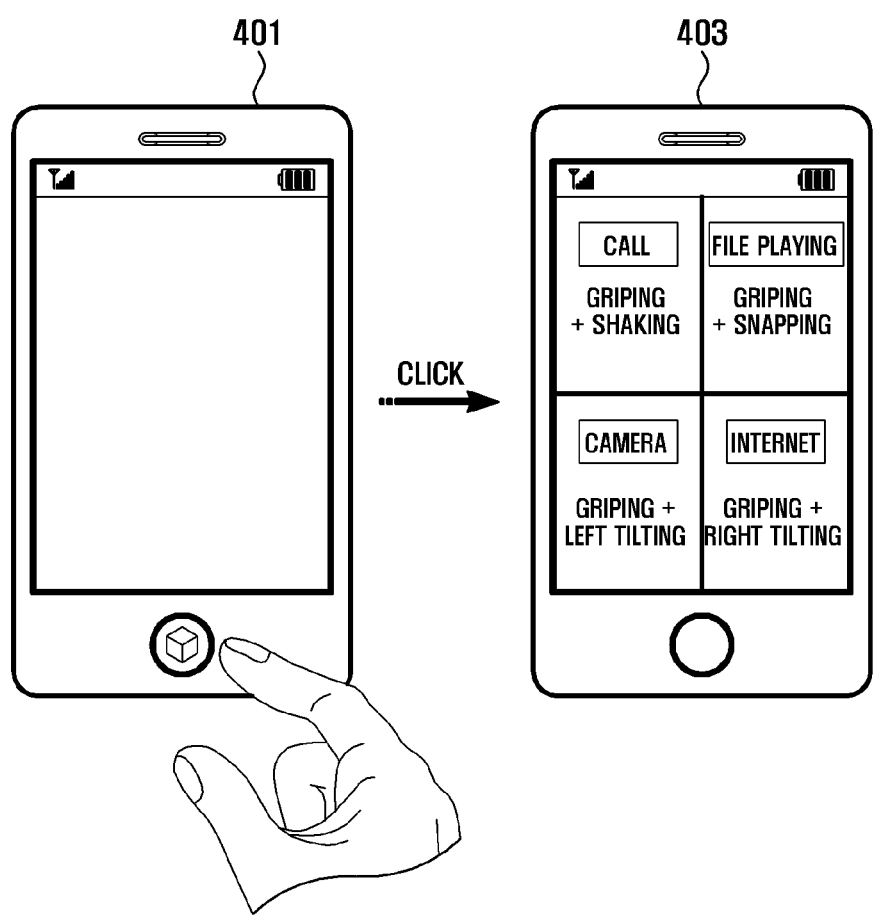
FIG. 4 is a drawing illustrating an example of a screen interface of a portable terminal, in the output of a menu item, according to an exemplary embodiment of the present invention.

Referring to FIG. 4, the portable terminal user activates a motion UI mode switching key or a menu item provided on one side of the portable terminal 100. If the portable terminal 100 is implemented with a touch screen, the portable terminal 100, as shown in FIG. 4, can output an image or icon corresponding to the motion UI mode switching key on a touch screen area at all times, or during activation of the screen.

Accordingly, the user can touch or click a corresponding motion UI mode switching key. After the portable terminal 100 is switched to the motion UI mode on the touch screen, the relevant switching key may not be output so as to indicate that the current state is a motion UI mode switching state. Then, as shown in 403 of FIG. 4, the portable terminal 100 can output the menu item on screen. Each menu item can be a list of application programs which can be supported by the portable terminal 100. A standards scenario can be outputted with a text, an image, or an icon combination, so that each menu item may be selected and activated according to the motion signal in respective menu items.

Figure 5:
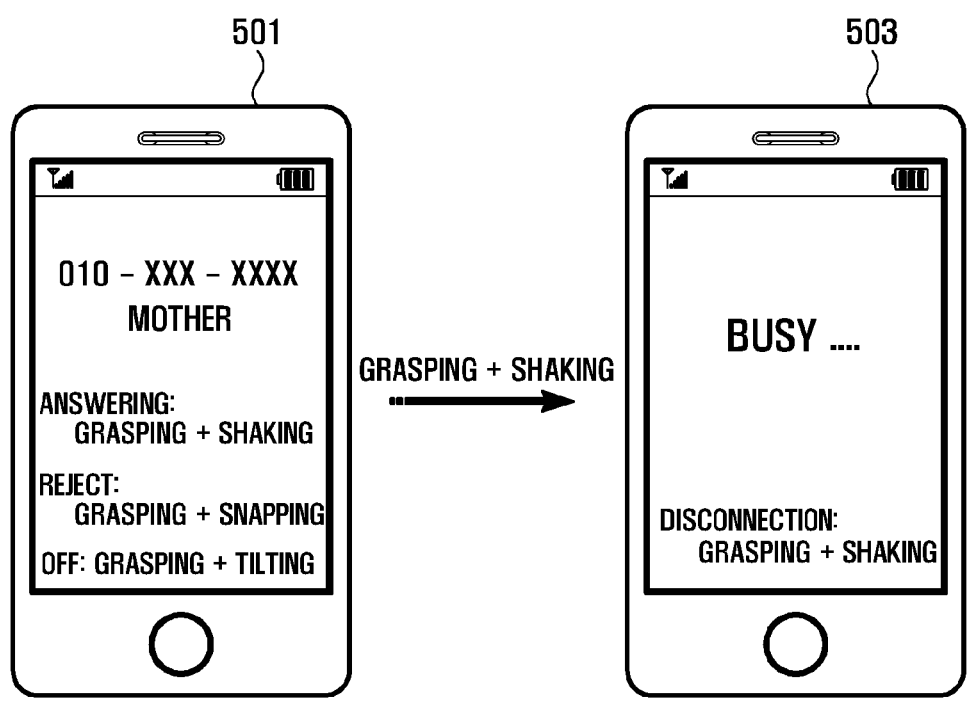
FIG. 5 is a drawing illustrating another example of a screen interface of a portable terminal during execution of the application program, according to an exemplary embodiment of the present invention.

In more detail, the display unit 150 of portable terminal 100 can output a plurality of application program lists, for example, the call item, the file playing item, the camera item, and the internet item. The display unit 150 of portable terminal 100 can output the standards scenario for execution of each item to an area in which a relevant item is output or to an area related to a relevant item. For example, the portable terminal user can know that the call item can be executed by the standards scenario which includes the griping and shaking motion signal. The file playing item can be executed by a standards scenario, which includes the griping and snapping motion signal. The camera item can be executed by a standards scenario, which includes the griping and the left tilting motion signal, and the internet item can be executed by a standards scenario, which includes the griping and the right tilting motion signal. When a call for call channel formation is received from another portable terminal, the portable terminal 100 can output a screen as shown in 501 of FIG. 5 in a sleep state.

If the number of the other portable terminal is stored in the phone book, the display unit 150 of portable terminal 100 outputs the stored information and number corresponding to the other portable terminal to the display unit 150. The display unit 150 of portable terminal 100 can output standards scenario information which should be executed to receive a call. For example, the portable terminal 100 can output standards scenario information which includes the griping and shaking motion signal to the display unit 150 to accept the call. This standards scenario may not be output according to a setting of the user.

If the call is received, the portable terminal 100 activates a call program, while detecting and loading an input signal table corresponding to the call program from the scenario database. The portable terminal 100 can output standards scenario information to receive the call to the display unit according to the user setting. At this time, the portable terminal 100 can output a calling rejection using the standards scenario information corresponding to power-off. For example, the user may implement the standards scenario information which includes the griping and snapping motion signal so as to reject the call, or the standards scenario information which includes the griping and tilting motion signal so as to discontinue power provided to the display unit 150.

The input scenario is prepared based on the motion signal input by user, and the control of the portable operation is executed according to the prepared input scenario. If the user executes the griping and shaking, the portable terminal 100 forms the call channel according to the call. As shown in 503 of FIG. 5, the portable terminal 100 can output a standards scenario (e.g., a text, an image, or an icon indicating the griping and shaking motion signal) corresponding to the call disconnection to the screen. If the portable terminal 100 indicates respective standards scenario information, the portable terminal 100 can also indicate the set up parameter information. For example, as shown in TABLE 1, the answering call in the input signal table can include a parameter of each motion signal.

TABLE 1

| STANDARDS SCENARIO (ANSWERING CALL) | PARAMETER 1 | PARAMETER 2 |
|---|---|---|
| griping | 10 (intensity) | 200 (interval) |
| shaking | 3 (frequency) | 300 (hour) |

Referring to TABLE 1, for answering the call, the user should hold the exterior of the portable terminal 100 with an intensity of 10 for 200 ms, and should shake the portable terminal 100 3 times within 300 ms. The portable terminal 100 can then generate the griping motion signal and the shaking motion signal corresponding to the answering call and, accordingly, perform the answering call. When the portable terminal 100 displays the standards scenario information to the display unit 150, the portable terminal 100 will be able to indicate the griping (two seconds) and the shaking (3 times) required to answer a call.

Hereinabove, a schematic description and a simple embodiment were illustrated with respect to the operation of the portable terminal 100 based on the motion input device. However, exemplary embodiments of the present invention are not limited to the above-described embodiment. That is, it should be understood that exemplary embodiments of the present invention generate motion signals corresponding to a predefined operation based on sensor signals input from the motion input device, and convert the input motion signals into an input scenario according to a predefined condition, thereafter, applying the motion signals to the application program of portable terminal which is being executed.

Figure 6:
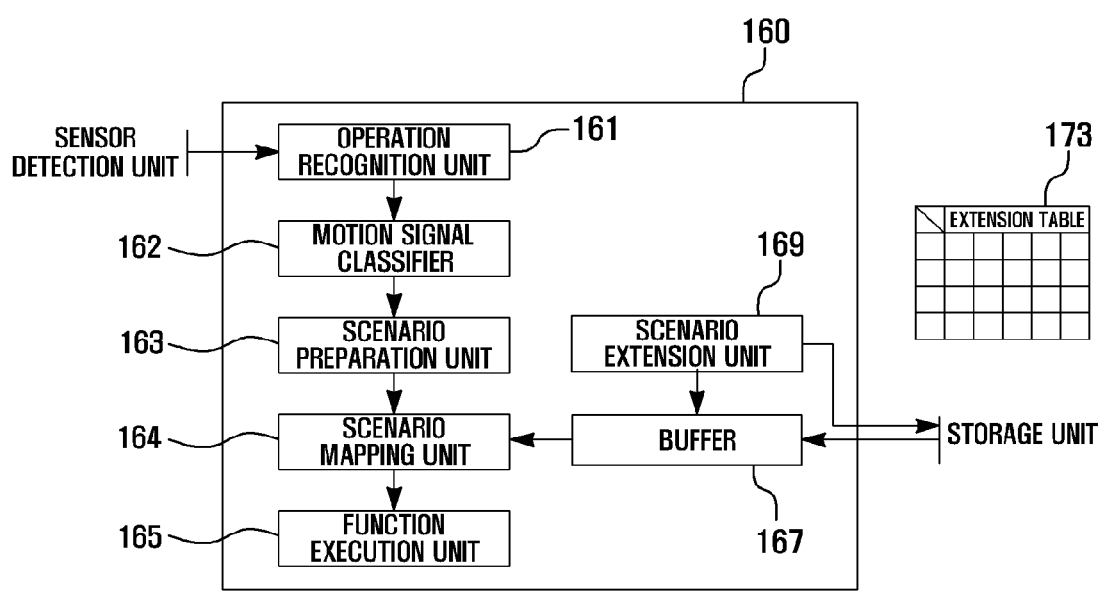
FIG. 6 is a drawing illustrating a controller configuration according to another exemplary embodiment of the present invention.

FIG. 6 is a drawing illustrating an application of an extension table according to exemplary embodiments of the present invention.

Referring to FIG. 6, the controller 160 of the portable terminal 100 includes an operation recognition unit 161, a motion signal classifier 162, a scenario preparation unit 163, a scenario mapping unit 164, a buffer 167, a scenario extension unit 169, and a function execution unit 165. Since the operation recognition unit 161, the motion signal classifier 162, and the scenario preparation unit 163 perform the same function as described with reference to FIG. 2, the detailed description of those elements is omitted. The scenario mapping unit 164 compares an input scenario sent by the scenario preparation unit 163 with a standards scenario written in an input signal table, and generates a corresponding input signal. The scenario mapping unit 164 loads an input signal table corresponding to an application program which is executed from among a scenario database stored in the storage unit 170. The scenario mapping unit 164 sends an input signal corresponding to the input scenario to the function execution unit 165. Moreover, under the control of the controller 160, the scenario mapping unit 164 can generate an input signal corresponding to the input scenario which the scenario preparation unit 163 sends based on an extension table 173 provided by the scenario extension unit 169. The buffer 167 can temporary store the input signal table from the storage unit 170 and send the input signal table to the scenario mapping unit 164 under the control of the controller 160. In this process, the buffer 167 can provide the input signal table to the scenario extension unit 169. In case the scenario extension unit 169 changes the content of the input signal table and generates an extension table 173, the buffer 167 can temporary store the extension table 173, and can send the temporarily stored extension table 173 to the scenario mapping unit 164. When an input signal table which corresponds to a relevant application program from the controller 160 is loaded from the storage unit 170 to the buffer 167 according to an activation of a specific application program of the portable terminal 100, the scenario extension unit 169 provides a function of editing the input signal table stored in the buffer 167. In case the user searches the input signal table corresponding to a separate application program for generating the extension table 173, the searched corresponding input signal table can be stored in the buffer 167. Accordingly, the scenario extension unit 169 can independently provide a function for editing the input signal table stored in the buffer 167 to a specific application program. The scenario extension unit 169 is configured to read the input signal table stored in the storage unit 170 or buffer 167 according to the request of the portable terminal user, to generate the extension table 173 by adding, correcting, and changing parameter values defined in a corresponding input signal table such that an input signal which the user wants can be generated. The scenario extension unit 169 receives the extension table 173 or the input signal table previously stored according to an external input and stores the tables into the storage unit 170. Based on this, the scenario extension unit 169 can change the parameter value of the input signal table or the extension table 173, or can control the parameter type. In detail, the portable terminal user can connect to a server or connect to a PC through an external connection, for example, a radio frequency unit or a serial communications or the like, and can store the extension table 173 in the storage unit 170 of the portable terminal 100.

Accordingly, in case a specific application program is activated, the controller 160 can check whether the extension table 173 for the corresponding application is stored in the storage unit 170. In case a corresponding extension table 173 exists in the storage unit 170, the controller 160 supports to load the stored extension table 173 according to the activation of the application program to the scenario mapping unit 164.

The controller 160 uses the stored extension table 173 to compare a standards scenario with the input scenario.

The controller 160 can provide an extension table input tool. To this end, the portable terminal user provides a menu item using an extension table input tool based on the scenario extension unit 169, and can control to activate the extension table input tool according to the user's request.

TABLE 2 indicates an example of the extension table. As described below, a basic operation ID corresponds to the standards scenario based on the input signal table.

TABLE 2

| BASIC OPERATION ID | PARAMETER 1 | PARAMETER 2 | PARAMETER 3 | ... |
|---|---|---|---|---|
| TAPPING | | | | ... |
| SNAPPING/ SHAKING | | | | ... |
| ... | ... | ... | ... | ... |

One row of the basis operation sequence corresponding to the standards scenario can be designed to recognize one or more basic operations. For example, when the duration and the intensity of the parameter of snap operation is changed, several patterns can be generated. By using such various patterns, the portable terminal 100 can support an independent operation pattern recognition function with respect to each application. For example, the forwarding or rewinding can apply a weak snapping pattern in a music playing application program, while a strong snapping pattern can be applied in a message service application program. The standards of weak snapping and strong snapping can be defined based on a given threshold value which a designer decides. The standards of the threshold value can be changed according to the intention of a portable terminal designer or the intention of an application program designer. Moreover, in the portable terminal 100, even in case of the same operation, a difference of intensity and duration can be generated for every user. Every user can set a parameter value by using the extension table input tool.

TABLE 3 indicates an example of the scenario which is defined in the extension table.

TABLE 3

| | PARAMETER 1 | PARAMETER 2 | PARAMETER 3 | PARAMETER 4 |
|---|---|---|---|---|
| 1 | 2 (FREQUENCY) | 200 (INTERVAL) | 4 (INTENSITY) | 10 (TIMEOUT) |
| 2 | 3 (FREQUENCY, SNAPPING) | 2 (INTENSITY, SNAPPING) | 30 (TIME, SHAKING) | 5 (INTENSITY, SHAKING) |

When the scenario extension unit 169 provides a first parameter table to the scenario mapping unit 164, the scenario mapping unit 164 can perform the recognition of operation based on a table shown in TABLE 4.

In case a timeout occurs in the standby of the recognition of operation, as shown in TABLE 4, the portable terminal 100 can initialize the motion operation when the timeout is over whereas it can continuously standby when the timeout is not defined.

TABLE 5 indicates an example of a scenario according to a plurality of operations.

TABLE 5

| SCENARIO 1 | PARAMETER 1 | PARAMETER 2 | PARAMETER 3 |
|---|---|---|---|
| FLIP TOP TO BOTTOM | 1 SEC (TIME WHEN DISPLAY UNIT FACES UPWARD) | 45 DEG/SEC (SPEED OF OVERTURNING) | 10 DEG (HORIZONTAL ANGLE AFTER BEING OVERTURNED) |

As shown in TABLE 5, the extension table 173 can be generated by changing parameter values even when recognizing the "flip top to bottom" operation. For example, when the parameter 3 is corrected to be 30°, the standards scenario which user desires can be configured by changing the permissible range of the scenario 1. As described above, the portable terminal 100 provides an extension table input tool so that the user can arbitrarily change the input signal table stored in the portable terminal 100.

Figure 7:
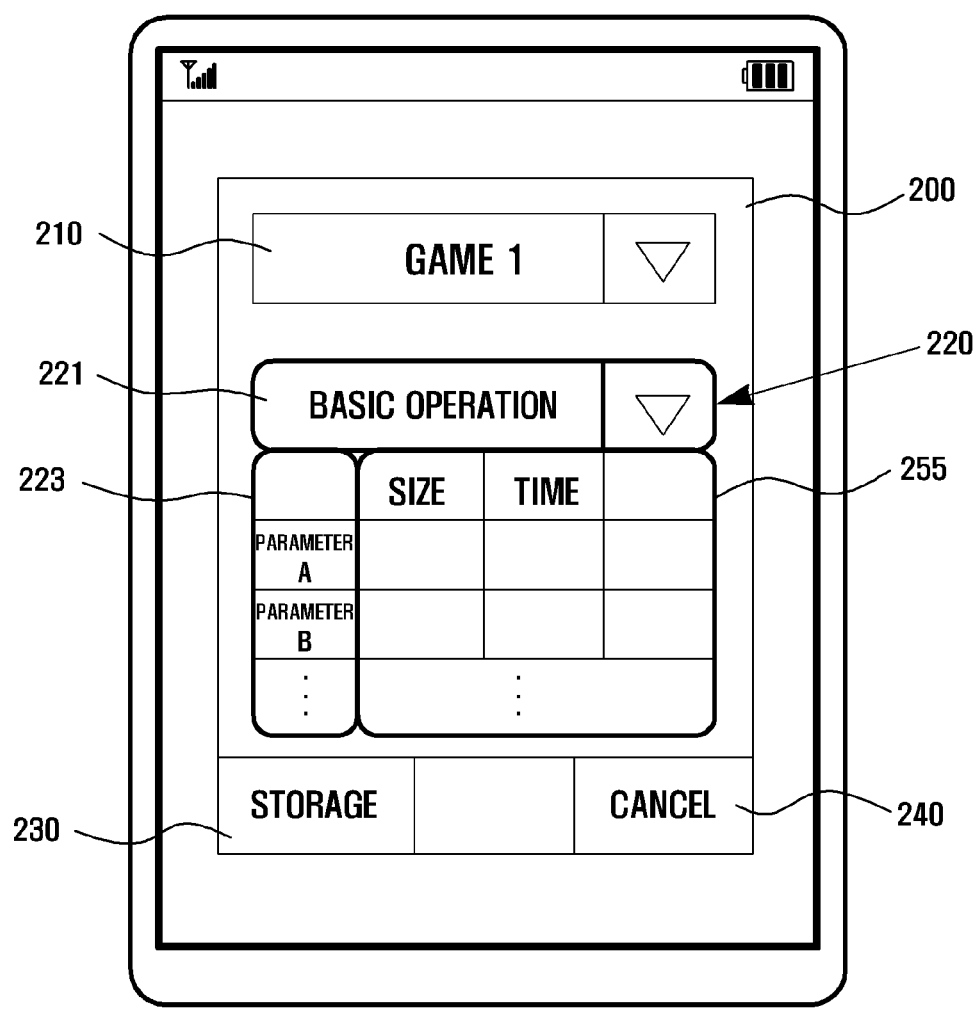
FIG. 7 is a drawing illustrating an example of a screen configuration of an extension table input tool according to an exemplary embodiment of the present invention.

As shown in FIG. 7, the extension table input tool can generate a new extension table 173 by changing or adding a corresponding parameter value, based on the input signal table stored in the storage unit 170. In detail, the extension table input tool 200 can include an application program selection area 210, a table area 220, a storage area 230, and a cancel area 240. The application program selection area 210 is an area which selects an application program to which the user desires to apply the extension table 173 from among various application programs which the portable terminal 100 supports. According to the selection of the application program, the basic operation ID, the parameter, and the parameter value of the table area 220 can be differently displayed. The basic operation ID is information corresponding to the standards scenario. The table area 220 can include a basic operation ID area 221, a parameter display and addition area 223, and a parameter value display and addition area 255. The basic operation ID area 221 is an area displaying an input signal. That is, the basic operation ID area 221 is an area in which input signals necessary to execute an application program can be selected for a corresponding application program selection area 210. The parameter display and addition area 223 indicates whether parameters corresponding to a specific basic operation selected in the basic operation ID area 221 exist, and includes an area to which the user can add the parameters. The parameter value display and addition area 255 is an area indicating a value allocated to the parameters display and addition area 255, and is an area in which the user can adjust the value of corresponding parameters by using an input unit. The storage area 230 is an area for storing a corresponding extension table after adding or changing a parameter into the basic operation ID area 221, or adding or changing a param-

TABLE 4

| SCENARIO 1 | PARAMETER 1 | PARAMETER 2 | PARAMETER 3 | PARAMETER 4 |
|---|---|---|---|---|
| TAPPING | 2 (FREQUENCY) | 200 (INTERVAL) | 4 (INTENSITY) | 10 (TIMEOUT) |
| SNAPPING/SHAKING | 3 (FREQUENCY, SNAPPING) | 2 (INTENSITY, SNAPPING) | 30 (TIME, SHAKING) | 5 (INTENSITY, SHAKING) | eter value. The cancel area 240 is an area capable of is canceling the extension table input process.

Figure 8:
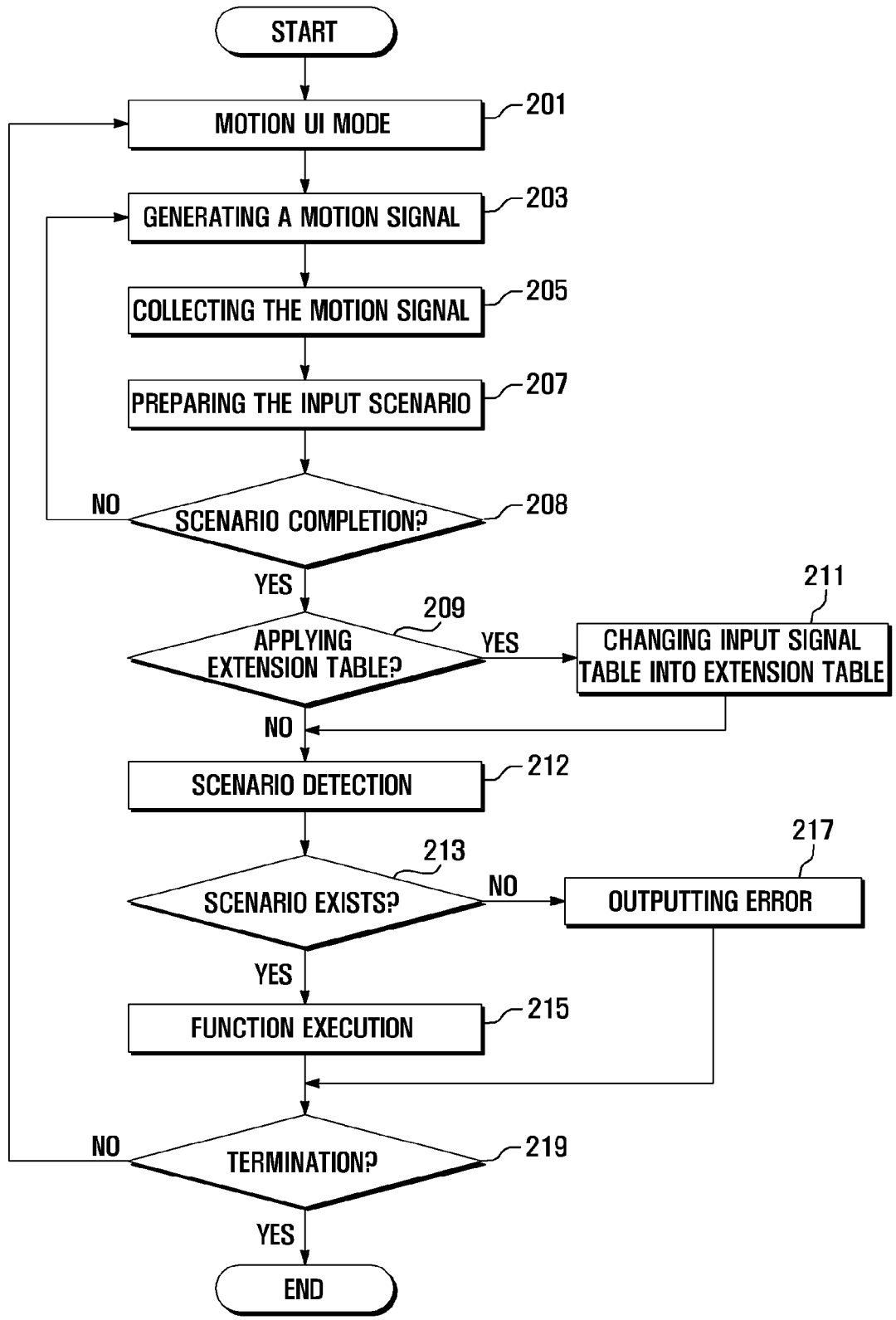
FIG. 8 is a flowchart illustrating an extension table based motion input device operation method according to an exemplary embodiment of the present invention.

FIG. 8 is flowchart for illustrating the motion input device operation method according to the extension table application, according to an exemplary embodiment of the present invention.

Referring to FIG. 8, in the operation method of the portable terminal 100, a motion UI mode may be activated according to the user's request (201). The portable terminal 100 may perform an initialization for the driving of the motion input device. The operation recognition unit 161 of the portable terminal 100 generates a motion signal based on a received sensor signal (203). The scenario preparation unit 163 collects a motion signal from the operation recognition unit 161 (205), and prepares an input scenario (207). The scenario preparation unit 163 checks whether the input scenario being currently prepared is completed (208). In case it is not completed, the process returns to step 203 so that the next processes can be repeatedly executed. If the input scenario is made, the portable terminal 100 checks whether the extension table 173 is applied (209). To this end, the portable terminal 100 can check whether the extension table 173 for applying to a specific application program exists. The extension table 173 can be stored with the input signal table, can be received from outside, or can be generated by the extension table input tool 200. That is, the portable terminal 100 can connect to a specific server which provides the extension table 173 by using the radio frequency unit 110 and receiving a corresponding extension table 173. Moreover, the portable terminal 100 can form a communications channel with other portable terminals by using the radio frequency unit 110, and can receive a corresponding extension table from another portable terminal. This extension table 173 can include an application program identifier. Accordingly, the portable terminal 100 can check whether an extension table 173 for the application program being currently executed exists by checking the application program identifier included in the extension table 173. Moreover, the portable terminal 100 can provide an extension table input tool 200 capable of generating an extension table 173. By making use of the extension table input tool 200, the portable terminal user can generate an extension table 173 by changing a parameter and parameter values of the input signal table for the application program being currently executed. In the process of storing the extension table 173, the portable terminal 100 can write the application program identifier into the extension table 173. And the portable terminal 100 can output a selection window which queries whether the extension table should be applied (209).

The portable terminal user can determine the application of the extension table 173 through the selection window. In case the extension table 173 exists at step 209 and the extension table 173 is set to be applied as a default, or in case the user generates an input signal for using the extension table 173, the portable terminal 100 can read the extension table 173 about a current application program (211). In this process, the portable terminal 100 performs the process of changing the input signal table linked to an application program into an extension table 173. Thus, the extension table 173 can be applied without designing an additional routine. When the extension table 173 is not applied at step 209, the portable terminal 100 can perform a scenario detection procedure based on the input signal table linked to the currently executed application program (212). Moreover, in case the portable terminal 100 applies the extension table 173, the scenario detection procedure can be performed based on the extension table 173 which is applied instead of the input signal table (211). That is, the portable terminal 100 examines whether a standards scenario corresponding to the prepared input scenario exists from among standards scenarios of the input signal table stored in the scenario database or standards is scenarios of the extension table 173. The portable terminal checks 100 whether the standards scenario corresponding to the input scenario exists in the input signal table or the extension table 173 (213). If the standards scenario does not exists, an input error may be output, or the input scenario can be ignored (217). If the standards scenario corresponding to the input scenario exists in the input signal table or the extension table 173 at step 213, the portable terminal 100 supports the performing of functions. The portable terminal 100 checks the termination of the motion UI mode support or the maintenance of the motion UI mode support (219). Thereafter, if the motion UI mode support is maintained, the motion UI mode support returns to step 201 so that the next process is repeatedly performed. Hereinabove, the motion input device and input method according to an exemplary embodiment of the present invention was described. Hereinafter, an application example of the portable terminal 100 based on the above-described motion input device is described. A portable terminal 100 and the operation method of the same may perform the termination, the cancel, the deletion, or the resetting of a first function or a second function being used according to the shaking motion in a portable terminal 100 operated based on a touch UI or a keypad in a first exemplary embodiment of the present invention. The portable terminal 100 discussed hereinbelow can have a configuration which is similar to a terminal configuration described with reference to FIG. 1 and FIG. 2. That is, in this application embodiment, the portable terminal 100 can have a configuration including a radio frequency unit 110, an audio processing unit 120, a sensor unit 130, a sensor detection unit 140, a display unit 150, a storage unit 170, and a controller 160. A portable terminal 100 can have a touch screen where a touch unit is included in the display unit 150. The radio frequency unit 110 transmits and receives a speech signal necessary for the call function and a data necessary for data communications under the control of the controller 160. The radio frequency unit 110 can include a radio frequency transmitter which up-converts and amplifies the frequency of the transmitted signal, and a radio frequency receiving unit which low-noise amplifies the received signal and down-converts the frequency.

Particularly, the radio frequency unit 110 forms a communications channel with another portable terminal under the control of the controller 160, and transceives the voice or image signal based on a corresponding communications channel. The radio frequency unit 110 can disconnect a communications channel which is formed between the portable terminal 100 and other portable terminals, or can reset the formation of the communications channel which was already attempted and failed, according to a shaking motion signal which is generated by shaking while a physical force is applied to the portable terminal 100. The audio processing unit 120 includes a speaker for playing audio data transmitted and received in the call, and a microphone for collecting the voice of user or other audio signal in the call. Particularly, the audio processing unit 120 can control the stopping of the output of the audio signal being output based on a sensor signal which is generated in the sensor detection unit 140, or control to stop the audio signal collection of the microphone. As the shaking motion signal is consecutively generated, the audio processing unit 120 can consecutively sound an alarm, for example, a beep sound, to perform one of resetting, canceling, deleting, and terminating a first function and/or a second function. To perform a vibration alarm capable of replacing a sound alarm in addition to the sound alarm, the portable terminal 100 can include a vibration module. The sensor unit 130 includes various sensors including an acceleration sensor, a gyro sensor, or the like. The various sensors operate based on a power supplied under the control of the controller 160, and generate a specific signal according to the movement of the portable terminal 100. The sensor unit 130 can send the specific signal which various sensors generated to the sensor detection unit 140. The sensor detection unit 140 can monitor the sensor unit 130 and check a signal generated in the sensor unit 130. In detail, the sensor detection unit 140 classifies the shaking motion of the portable terminal 100 based on a sensor signal collected by the acceleration sensor or the gyro sensor, and can send a corresponding operation signal to the controller 160. That is, the sensor detection unit 140 analyzes the operation being input from the sensor unit 130. For example, the sensor detection unit 140 analyzes the amplitude of the operation being generated when the portable terminal 100 is shaken from side to side, the change of amplitude, or the cyclic frequency, so that the sensor detection unit 140 determines whether the portable terminal 100 is currently performing the shaking motion.

When the user shakes the portable terminal 100 right and left, top and bottom, or to a specific direction, the sensor unit 130 generates a given frequency according to the shaking. In case a cycle is generated with the frequency which is set up within a given time period when a corresponding frequency is generated one-time or repeatedly while having a given amplitude or the change of a specific amplitude corresponding to the shaking, the sensor detection unit 140 can determine that the portable terminal 100 is in a specific shaking motion state. The touch screen can be formed in such a manner that the touch unit is arranged in one side of the display unit 150 or in one side of the portable terminal 100, and can perform the function of the input unit of the portable terminal 100. To this end, the touch screen sets an image and a coordinate corresponding to a plurality of input keys and function keys for receiving a number or character information from the user and setting various functions, and can send a corresponding touch event to the controller 160. The function keys can include a direction key, a side key, and a shortcut key, which are set to perform a specific function. Moreover, the touch screen generates a key signal associated with a user setting and a function control of the portable terminal 100 and sends the key signal to the controller 160.

Particularly, the touch screen can output various key images necessary for the operation of the portable terminal 100 to the display unit 150. And, after sensing the touch of user by using the touch unit, the touch screen can recognize a key which is touched after being mapped to a key image outputted to the display unit. The touch screen can be formed with a full screen. Such a touch screen generates a touch event corresponding to a touch signal for selecting a specific file stored in the storage unit 170, a drag signal moving the selected specific file, and an input signal necessary for a file edition, and sends information to the controller 160. If the touch screen sends, to the controller 160, only information about coordinates, in case user touches a corresponding coordinate after outputting a certain image to a specific coordinate of the touch screen, the controller 160 controls to perform the function corresponding to the set up image. The touch screen is illustrated for the generation of an input signal. However, the above-described touch screen can be replaced with a keypad generating a key input signal. The display unit 150 outputs a screen activated according to the function of the portable terminal 100. For example, the display unit 150 can output the booting screen, the stand-by screen, the menu screen, and the call screen, or the like. A Liquid Crystal Display (LCD) can be applied to such a display unit 150, while the display unit 150 can include a LCD controller, a memory to store LCD data, and a LCD display device or the like. In case the LCD is implemented by a touch screen type, the display unit screen can be operated as an input unit. Particularly, the display unit 150 can output a screen according to the specific function activation under the request of the terminal user. At this time, a shaking motion signal corresponding to the resetting, the deletion, the cancel and the termination of an event according to the function currently being executed is received from the sensor detection unit 140, and the display unit 150 can output a pop-up is window for resetting/deleting, canceling, and terminating the function. The storage unit stores a touch User Interface (UI) operating program for the operation of the touch screen, an operating program for recognizing the shaking motion of the portable terminal 100 as an input signal, and user data or the like, in addition to an application program necessary for the executing the function. In the meantime, the storage unit 170 can manage the function of buffering temporary-storing sensor signals which are collected according to the operation of the portable terminal 100. This storage unit 170 can include a program area and a data area. The program area stores an operating system (OS) booting the portable terminal 100, a touch UI operating program, an application program for the support of the sensor unit 130 and the sensor detection unit 140, and an application program necessary for other function options of the portable terminal 100, for example, the sound playing function, and the image or moving picture playing function or the like. Particularly, the program area can store an application program for operating each sensor included in the sensor unit 130, and an operation program which can recognize the signal inputted from the sensor unit 130 as a shaking motion signal which is previously set. The data area is an area in which data generated according to the use of the portable terminal 100 are stored. The data area can store information corresponding to user data associated with various function options which the portable terminal provides, for example, a moving picture, a phone book data, an audio data, and a relevant contents or user data. Moreover, the data area can store a screen according to the currently executed application program operation, and can store an input signal table or an extension table defining the function resetting, the deletion, and the cancel and the termination being currently executed according to the operation of the portable terminal 100 during the execution of the application program operation.

The input signal table or the extension table 173 can be a table which stores standards scenarios to perform the function resetting, the deletion, the cancel, and the termination according to the operation which is generated in the activation of the message writing function, the phone-call service function, the memo writing function, the music playing function, the calculator function, the converter function, the stopwatch function, the dictionary function, the local area wireless communications module function, the camera function, the timer function, and the search function, or the like.

The controller 160 controls the power supply of the portable terminal 100 and the activation of each device, and a signal flow transmitted and received between devices. Particularly, the controller 160 can control the termination, the deletion, the cancel or the resetting of the function currently being executed according to the shaking motion signal which is generated under the operation control of the portable terminal 100 based on the input signal table or the extension table 173. The controller 160 recognizes whether the portable terminal 100 performs an appropriate shaking motion state based on a sensor signal sent from the sensor detection unit 140. This controller 160 collects a sensor signal sent from the sensor detection unit 140, can determine that the collected sensor signal is a one time shaking motion, or a consecutive shaking motion. That is, the controller 160 can examine whether the change of amplitude of the frequency according to the shaking motion that the sensor detection unit 140 sends satisfies the set cycle and the set amplitude. For example, the controller 160 can set the frequency parameter value according to the shaking motion in such a manner that it is apart from the direction of axis and is independent of the initial state of the portable terminal 100 and the stationary state after the completion of operation. The controller 160 can detect whether the absolute value of the amplitude is 10 or more within a given time, for example, within 3 seconds and is repeatedly generated over 3 times. It is preferable that the controller 160 can set an error rate for a given time to be over one second and supports a value to be changed according to the intention of designer or the resetting of user. In case a frequency is repeatedly generated over 3 times, it is preferable that the controller 160 is set to recognize this as the shaking motion of two or more times, or set to ignore the frequency which is generated three or more times. That is, the controller 160 can recognize the frequency, which is repeatedly generated between three times and five times within 3 second with amplitude 10 or more, as the shaking motion. In case the shaking motion is recognized, the controller 160 can recognize the frequency which is generated for a next given time as a consecutive shaking motion, or can ignore it. Moreover, the controller 160 can recognize the shaking motion as a plurality of modes according to the parameter setup of the frequency according to the shaking motion. That is, in case a first mode can be defined with an amplitude having absolute value 10 or more, repetition between three times and five times, and within three seconds. The controller 160 can define a second mode with an amplitude having absolute value 20 or more, repetition between three times and six times, and within three seconds. Further, the controller 160 can define a third mode with the amplitude generation corresponding to a one-time shaking regardless of a magnitude of the amplitude and a time range.

When a specific function is activated and the shaking motion signal is received, the controller 160 loads an input signal table or an extension table 173 previously stored in the storage unit 170, and checks whether the activated function is included in a list. In addition, in case the function which is currently activated is included in the input signal table or the extension table 173, the controller 160 performs an operation which is set based on a corresponding table, that is, one operation among the termination, the deletion, the cancel, and the resetting.

At this time, the sent shaking motion signal is consecutively generated, the controller 160 can consecutively perform the termination, the deletion, the cancel, and the resetting about the function which is currently performed. When the deletion. cancel, and the resetting are consecutively generated as the shaking motion signal, the controller 160 can perform an alarm so as to alarm a successive function performing when the function according to a second shaking motion signal is performed, after the function according to a first shaking motion signal is performed. That is, in the generation of the above-described consecutive operations, the controller 160 can control to perform a sound alarm such as beep, or to perform a vibration alarm, or the like. Moreover, the controller 160 can perform a different operation with the function of the same terminal according to the shaking motion signal mode which the controller 160 sends.

Accordingly, the controller 160 can control a first function which is currently performed or at least one second function which is performed subsequently to the first function to reset, cancel, delete, and terminate, respectively or wholly, according to a first shaking motion signal having a first amplitude or a first amplitude change with a cycle of a first frequency within a first given time. The controller 160 can control a plurality of first shaking motion signals which are consecutively generated, and a second shaking motion signal having a second amplitude or a second amplitude change with a cycle of a second frequency within a second given time. Hereinafter, the operation of the portable terminal 100 illustrated in the above-described first exemplary embodiment is illustrated in detail with reference to drawings.

Figure 9:
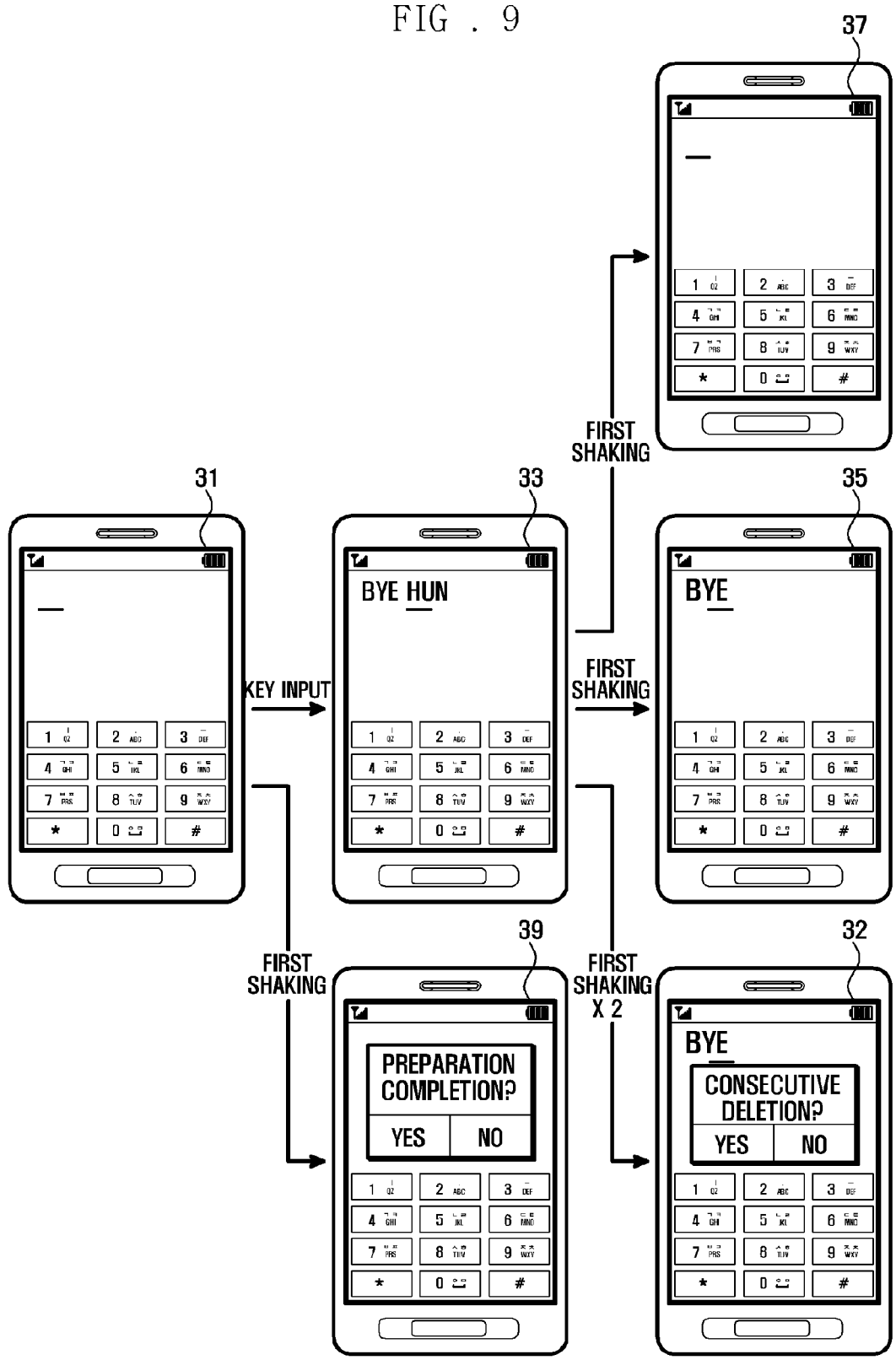
FIGS. 9, 10, 11, and 12 are drawings illustrating a first exemplary embodiment of the present invention.

FIG. 9 is a drawing illustrating an example of screen for illustrating the operation of a portable terminal input unit in the writing of a message.

Referring to FIG. 9, in case the user activates the message writing function among menu, the display unit 150 can output a message write window for the writing of message like a screen 31. At this time, the portable terminal 100 can control to output a key map for the writing of message to the display unit 150 through a touch screen. Exemplary embodiments of the present invention are not, however, limited to a touch screen. If the portable terminal has a keypad, a separate key map output may not be needed. If the user touches the key map outputted to the display unit 150 for the writing of message, a message is prepared according to the touched key input. At this time, the display unit 150 can output the message to screen according to the key input like a screen 33. In the writing of the message, a wrong character can be entered. A user who discovered this wrong character can perform a shaking motion with a predefined frequency, for example, a one-time shaking.

The sensor unit 130 may then generate a frequency having a given amplitude according to the shaking motion of the portable terminal 100, and the sensor detection unit 140 can detect this and send a signal to the controller 160. If the portable terminal 100 performs a one-time shaking motion, the controller 160 checks an input signal table or an extension table 173 stored in the storage unit 170. According to the writing of the table, the controller 160 deletes all messages being written and performs the service resetting for the writing of message, or can delete the previous character of a spot where a space bar is output like in screen 35. In this way, the portable terminal user can delete a character which is mistakenly inputted during the writing of message by a simple shaking motion, without using a separate delete key or a delete key with using a direction key.

In the meantime, when a second shaking mode is recognized according to a frequency value corresponding to a size of a first amplitude, a first given period, and a first cycle having a set frequency which are set during the writing of message, (e.g., an amplitude of 20, a cycle of six or more, within three seconds) the controller 160 can control to delete whole characters previously entered, as in screen 37, to reset a message service. Moreover, in case a character which is to be deleted according to a first shaking does not exist during the writing of message based on a table, the controller 160 can terminate the writing of message like screen 39, or can control to output a pop-up window for the confirmation of the termination of message writing. And in case a first shaking motion is consecutively generated, the controller 160 controls to consecutively delete a set number of written characters, for example, two characters, or to output a pop-up window for the confirmation of consecutive deletion after one character deletion, as in screen 32. As described above, when a first function for the writing of message is activated and a second function corresponding to the input of characters according to a key input is input after the execution of the first function, the controller 160 controls the cancel or the deletion of the second function according to the shaking motion of the portable terminal 100. If the shaking motion is generated only when the first function operates without the second function, the termination of the first function can be controlled.

Figure 10:
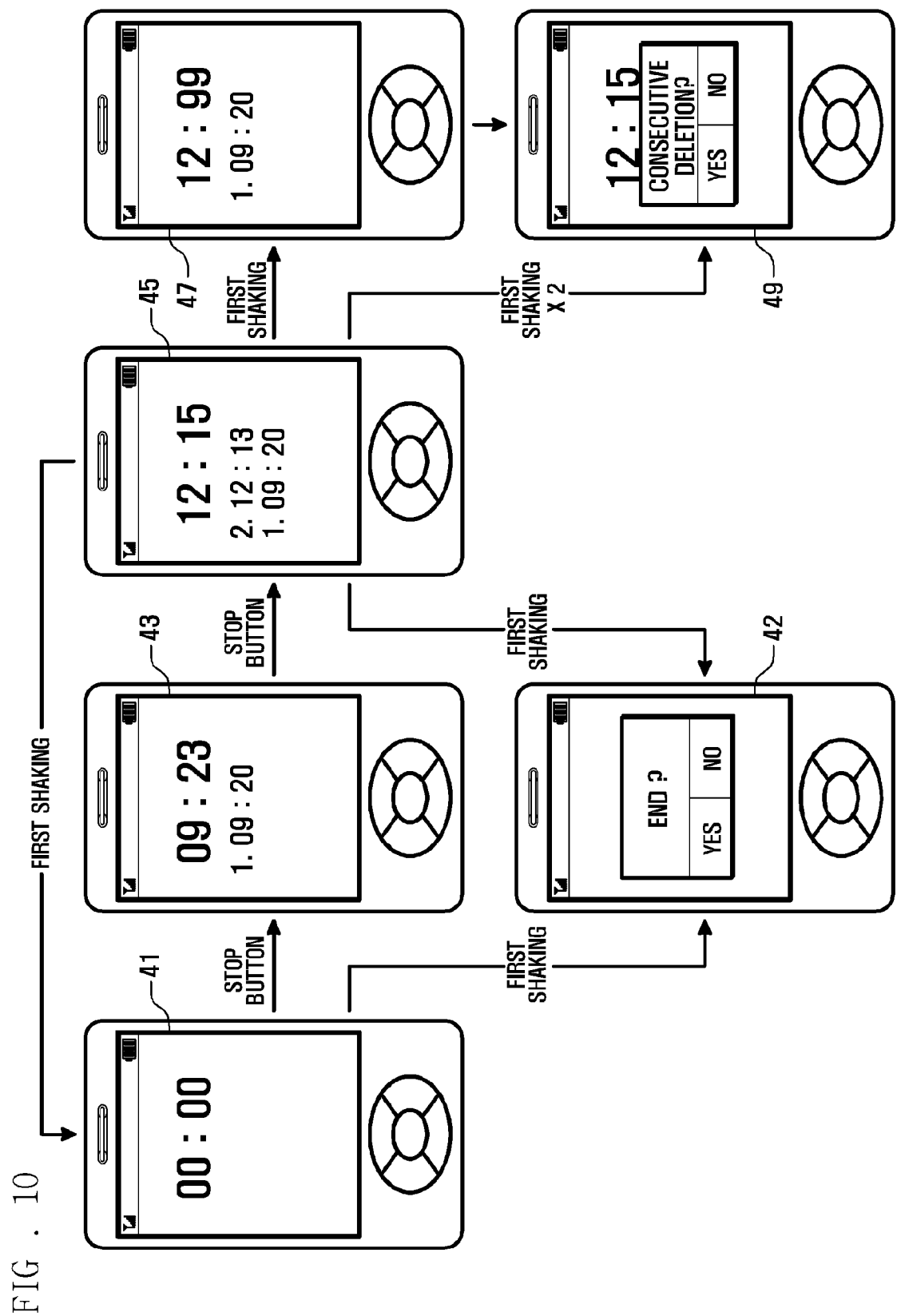

FIG. 10 is an example of screen for illustrating a stopwatch control according to the operation of a portable terminal input unit, according to exemplary embodiments of the present invention. Hereinafter, it is assumed that a first shaking is a shaking motion having a first amplitude, a first given time, and a cycle of a first frequency, and it is assumed that a second shaking is a shaking motion having a second amplitude, a second given time, and a cycle of a second frequency.

Referring to FIG. 10, if the user activates the stopwatch function among menu, the display unit 150 can output the stopwatch activation screen for the operation of the stopwatch as in screen 41. If the stopwatch activation screen is outputted, the portable terminal user can operate a stopwatch through a key input and count a time. Then, the portable terminal user can activate a stop button and obtain first time information. The portable terminal 100 can temporarily store the first time information in a storage unit 170, and can output to a certain area like screen 43. And the portable terminal user can obtain second time information by re-activating the stop button. Accordingly, the portable terminal 100 temporarily stores the second time information in the storage unit 170, and can output to a certain area so as not to overlap with the first time information, as shown in screen 45. The portable terminal user can obtain a plurality of time information by repeatedly executing the same process. And the portable terminal 100 may control to output the plurality of time information to the display unit 150.

In the meantime, if the obtaining of the time information is completed, the portable terminal user can perform a predefined operation, for example, one time shaking so as to generate a first shaking signal. Accordingly, the portable terminal 100 can cancel or delete the time information stored just before, for example, second time information so that it can control the second time information not to be outputted to the display unit, as in screen 47. At this time, the user can consecutively generate the first shaking. And the portable terminal 100 can control to consecutively delete the second time information and the first time information, or to output a pop-up window for the confirmation of consecutive deletion after the deletion of the second time information, as in screen 49.

In the meantime, the user can generate a second shaking, for example, a shaking having amplitude of 10, with a cycle between three and five, within three seconds. If an operation signal corresponding to the second shaking is generated from the sensor detection unit 140, the portable terminal 100 can output a screen corresponding to resetting the whole data deletion of the first time information, the second time information, and the stopwatch initialization like screen 41, based on the input signal table or the extension table 173 stored in the storage unit 170. Moreover, when the second shaking is generated according to the setting, the portable terminal 100 can control to terminate the function corresponding to a stopwatch, or to output a pop-up window for termination as in screen 42. When the output state of the time information does not exist in the screen, and the first shaking is generated in the initial state where a timer does not operate, the portable terminal 100 can terminate the function corresponding to a stopwatch, or output a pop-up window for termination, as in screen 42. As described above, when a second function which outputs the time information obtained in the state where a first stopwatch function is activated is plurally being output, based on the input signal table or the extension table 173 stored in the storage unit 170, a second function may be canceled or deleted according to an inputted shaking signal. Accordingly, the second function is not executed, or a first function is not terminated according to a shaking signal of another preset mode.

Figure 11:
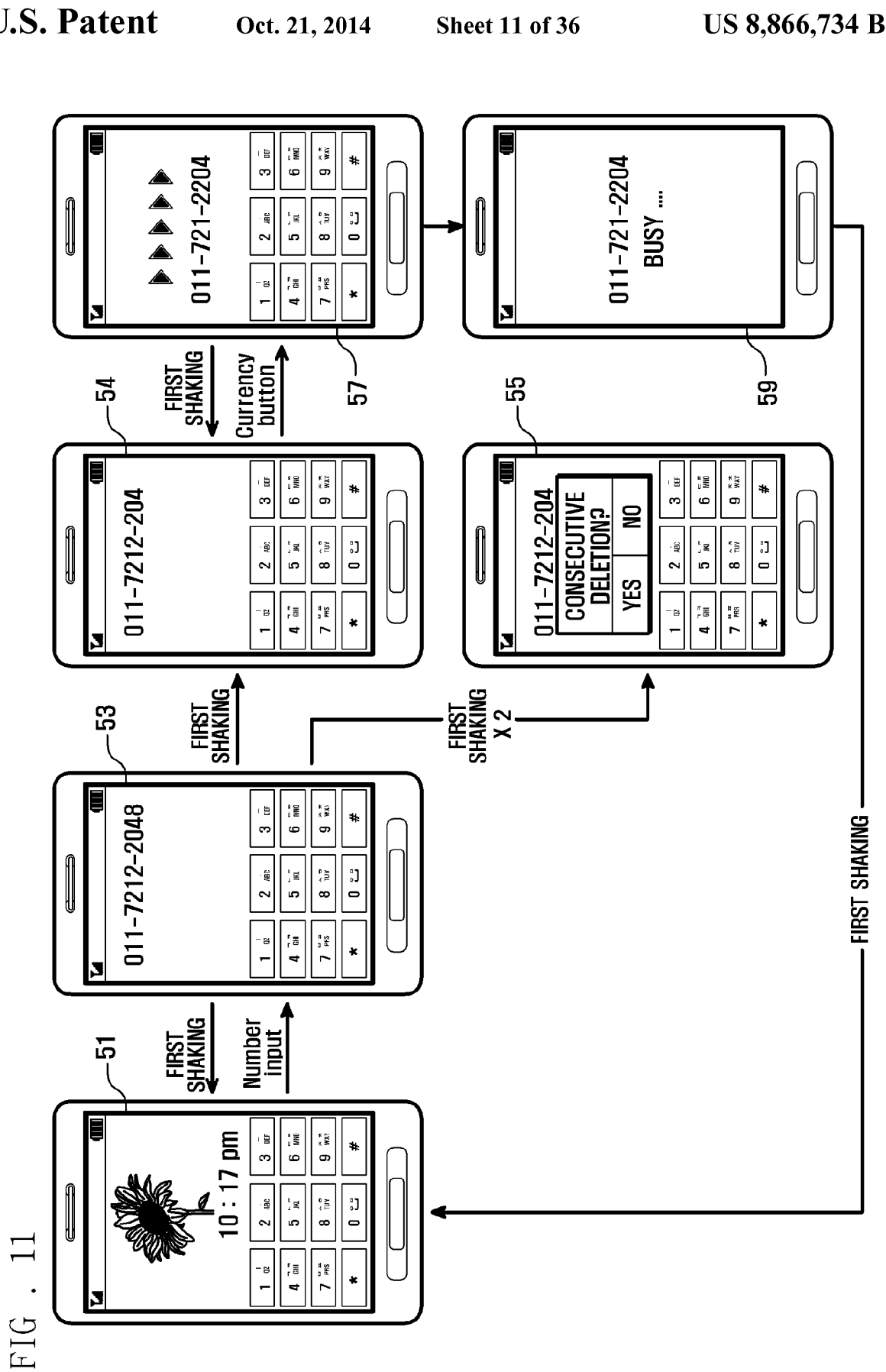

FIG. 11 is an example of screen for illustrating a phone call procedure according to an operation of a portable terminal input unit, according to exemplary embodiments of the present invention.

Referring to FIG. 11, when the user performs the folder open or slide up of a portable terminal 100, the portable terminal 100 can control to output the preset stand-by screen like a screen 51. Then, if the user inputs a numeric key corresponding to a telephone number or a shortcut key in which a telephone number of other portable terminal is inputted, the portable terminal 100 outputs a corresponding telephone number to the display unit 150, as in screen 53. At this time, when the portable terminal user performs the first shaking having a first amplitude, with a cycle of a first frequency, within a first given time, the portable terminal 100 can delete one-by-one the last digit of the inputted telephone number, as shown in screens 53 and 54. When the first shaking is consecutively generated, the portable terminal 100 can delete the consecutively inputted last digits of the telephone number, or can output a pop-up window which checks the consecutive deletion after the deletion of a number according to the initial first shaking, as shown in screen 55. And when the portable terminal user performs the second shaking having a second amplitude, with a cycle of a second frequency, within a second given time, the portable terminal 100 can control to delete all of the outputted telephone numbers to perform the call input resetting and can return to the screen 51. Then, when the user activates a send button in the state of screen 54, the portable terminal 100 outputs a telephony call and executing a transceiving process, as shown in screen 57, for forming a communication channel with another portable terminal having a corresponding telephone number. At this time, when the portable terminal user performs the first shaking having a first amplitude, with a cycle of a first frequency, within a first given time, the portable terminal 100 can cancel the telephone call transceiving process, and can return to the screen 54 state. In the meantime, if the user does not perform a separate input operation or key input, the portable terminal 100 forms a communication channel with another portable terminal, and accordingly, the screen during phone call can be outputted like a screen 59. The portable terminal controller 160 controls to output a voice signal received from another portable terminal through a speaker in case of voice communications and controls to collect an audio signal by using microphone and transmit an audio message to the other portable terminal. At this time, the portable terminal user can perform the first shaking, and the portable terminal 100 can control to cancel or delete the communication channel currently formed according to the generation of the first shaking and can output a preset stand-by screen like screen 51.

As described above, the portable terminal input unit operation process for the call service support according to an exemplary embodiment of the present invention supports to perform the cancellation, the deletion, the termination, and the resetting according to the shaking motion of the portable terminal 100 in the various stepwise operation function state, which is necessary to proceed the function corresponding to the call service.

As described above, the portable terminal input unit according to an exemplary embodiment of the present invention supports the portable terminal 100, which is operated based on a touch UI, a keypad, or the like, to easily perform the termination, the cancel, the deletion, or the resetting, or the like, of the first function or the second function. The first function and the second function are currently used according to the shaking motion, and support to output a pop-up window so that the termination, the cancel, the deletion, or the resetting which are inappropriate may not be generated, in the performance of corresponding process. Accordingly, the portable terminal input unit can perform an effective control of a terminal 100. Here, the first function can be a specific function, for example, various functions included in a menu item of the portable terminal 100 such as a camera function, a file playing function, a phone-book function, a stopwatch function, and a timer function. The second function can be a function being performed according to the key input inputted in the state where the first function is performed, for example, the character input function, the image collection function, and the time information collection function. And the first function can be a character output function according to the key input, and the second function can be various menu functions such a phone call connection service function being performed based on the outputted character, a character or number search function, and a memo or schedule preparation function.

Figure 12:
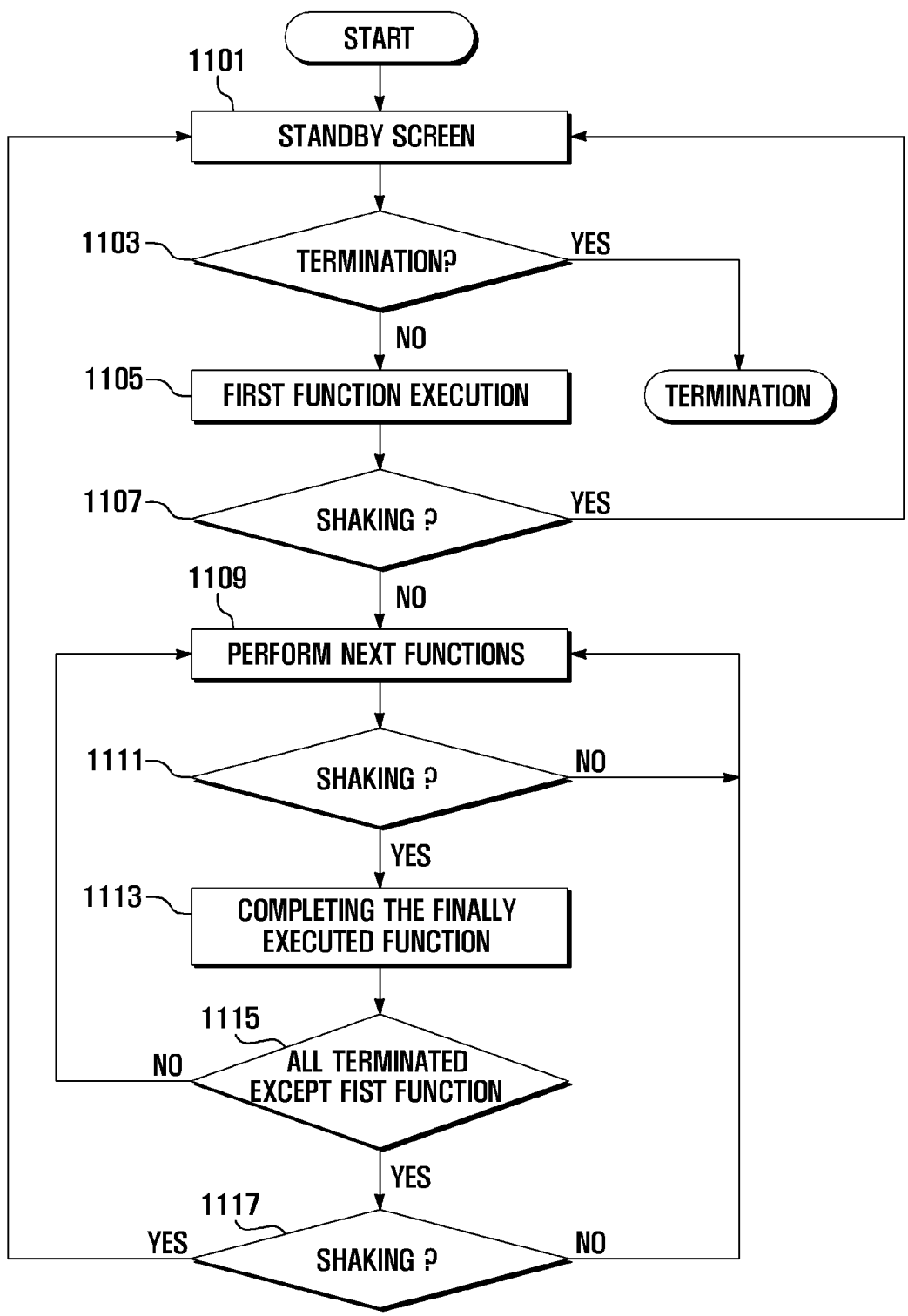

FIG. 12 is a flowchart illustrating an input method of a portable terminal 100 according to an exemplary embodiment of the present invention.

Referring to FIG. 12, in the input method of the portable terminal 100, a booting process is performed by using a power supplied by the controller 160 after the power is supplied to the portable terminal 100, and a preset stand-by screen is outputted to the display unit 150 (1101). After the stand-by screen is outputted, it is checked whether the use of terminal 100 is terminated (1103). If terminal use is continuous, a first function is performed according to the key input which the user inputs (1105).

The first function is a function of the portable terminal 100 according to the key input which user inputs. The first function can be a key input function and can be a text or an image output function according to the key input. Among the key input function, the key input which is initially inputted can be the first function, and the key input which is next inputted can be the second function. In other words, the first function can be a specific function, for example, various functions which are included in a menu item of the portable terminal including the camera function, the file playing function, the phone-book function, the stopwatch function, and the timer function. The second function can be a function which is performed according to a key input which is inputted in the state where the first function is performed, for example, the character input function, the image collection function, and the time information collection function. And the first function can be a character output function according to the key input. The second function can be various menu functions, such as the character or number search function, the memo or schedule preparation function, and the calling connection service function performed based on the outputted character. Then, the portable terminal 100 checks whether the controller 160 of the portable terminal 100 is applied with a physical force to have a given direction and a given angle and a shaking motion signal is generated by the shaking (1107). At this time, if the shaking motion signal is generated, the first function which is currently performed is terminated and the controller of the portable terminal can return to step 1101. If the shaking motion signal is not generated at step 1107, the portable terminal controls to perform next functions, that is, at least one second function, according to the user input (1109).

The at least one second function is a portable terminal function which is configured after the first function. The at least one second function can be a camera function, and/or a short-range wireless communications function. The controller 160 of the terminal 100 examines again whether the shaking motion signal is generated (1111). If the shaking motion signal is not generated but a key input is generated, the process can return to step 1109 so that the next functions according to the generated key input can be performed. In the meantime, in case the shaking motion signal is generated at step 1111, the controller 160 of the terminal 100 terminates the function which is finally executed (1113). For example, if the key input function corresponding to "1, 2, 3, 4" is generated, and the shaking motion signal is generated after "4" is input, the output of "4" which is finally inputted can be canceled or can be deleted. And the controller 160 of portable terminal 100 checks whether all functions are terminated except the first function (1115). If other functions are still maintained, the controller 160 of portable terminal 100 returns to step 1109 to maintain the functions which are currently performed, or to perform additional functions according to the key input which the user newly inputs. If all functions are terminated except the first function at step 1115, the controller 160 of portable terminal 100 examines whether the shaking motion signal is generated (1117). In case the shaking motion signal is generated, the process can return to step 1101 while terminating the first function. In the meantime, if the shaking motion signal is not generated at step 1117, the controller 160 of portable terminal 100 returns to step 1109 and performs the first function or other functions according to the user input. In the above-described description, it was illustrated that the mode of shaking motion is set with only one mode. However, as described above, the mode of shaking motion can be classified and set with various modes. Accordingly, when all functions which are currently performed at step 1107, 1111, and 1117 are initialized, or the shaking motion for terminations is set, and a corresponding operation is generated, the portable terminal 100 returns to step 1101 at each step and can repeatedly perform the process.

As described above, the portable terminal input method according to an exemplary embodiment of the present invention controls to reset, delete, cancel, and terminate at least one from among the first function and the additional functions based on the input signal table or the extension table 173 stored in the storage unit 170, when the first function among the portable terminal function is performed according to the input signal generated by at least one of the key input and the touch input, or when the shaking motion signal corresponding to the shaking motion having a cycle of a first frequency, with a first amplitude or a first amplitude change within a preset given time is generated, while additional functions are performed during the first function and the first function performance. Accordingly, even when any function of the portable terminal 100 is used by the portable terminal user, one process can be easily activated among the resetting, the deletion, and the cancel and the termination of a corresponding function.

Hereinafter, the operation of an application program according to the accelerated motion of one time in a second exemplary embodiment of the present invention is illustrated.

The portable terminal of the second exemplary embodiment of the present invention can be configured of a wireless frequency unit, an audio processing unit, a sensor unit, a sensor detection unit, a touch screen having a touch unit and a display unit, a storage unit and a controller, similarly to the first exemplary embodiment. In the foregoing description, repeated descriptions of configurations and components already described above with reference to FIG. 1 to FIG. 12 shall be omitted. The radio frequency unit forms a communications channel with another portable terminal under the control of the controller, transmits and receives a voice or image signal based on a corresponding communications channel. At this time, the wireless frequency unit can move, change, or terminate a communications channel based on a signal which is generated according to the accelerated motion of one time as a physical force is applied to the portable terminal. The sensor detection unit monitors the sensor unit and can check a signal generated in the sensor unit.

In detail, the sensor detection unit classifies the movement of the portable terminal based on a sensor signal collected by an acceleration sensor or a gyro sensor, and can send a corresponding movement signal to the controller. That is, the sensor detection unit analyzes the portable terminal movement provided by the sensor unit. For example, the sensor detection unit analyzes the change of the acceleration which is generated when the portable terminal moves from side to side, the amplitude or the change of the amplitude, and the number of cycle, to determine whether the portable terminal performs a preset movement.

The controller can control the function which is currently performed according to a signal generated due to accelerated motion of the portable terminal. The controller can recognize whether the portable terminal performs an appropriate one time accelerated motion based on a sensor signal sent from the sensor detection unit. The controller collects the sensor signal sent from the sensor detection unit, and can classify whether the collected sensor signal is a one time accelerated motion, or a consecutive accelerated motion. That is, the controller can examine whether the change of the acceleration magnitude according to the one time accelerated motion which the sensor detection unit sends is a critical value or more. For example, the controller can be set in such a manner that the controller can recognize the direction of a specific axis related with the acceleration change value according to the movement. The controller sends the accelerated motion signal of one time, the preset input signal table fetched from the storage unit, and the input scenario related signal coinciding with the standards scenario extracted from the extension table after comparing with the standards scenario, to the application program. The controller can control to perform the stepwise execution of the application program according to the accelerated motion of the portable terminal. The embodiment of such controller is described below with reference to drawings.

Figure 13:
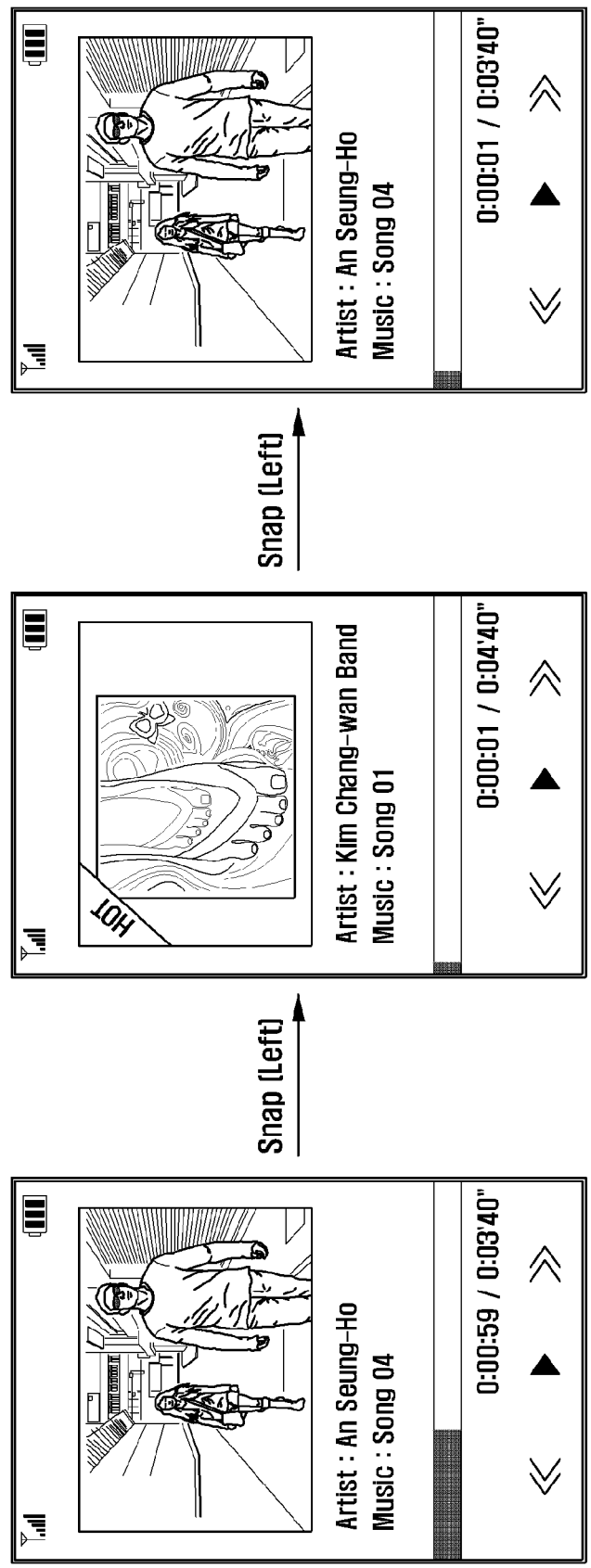
FIGS. 13, 14, 15, and 16 are drawings illustrating a second exemplary embodiment of the present invention.

FIG. 13 is a drawing of an example of a screen for illustrating the operation of a portable terminal input unit which performs a function of moving to a next step, and/or previous step in the case of a contents player for music, moving picture, or the like, according to an exemplary embodiment of the present invention.

Referring to FIG. 13, when the application program is a contents player for music, moving picture or the like, the controller of the portable terminal fetches the input scenario table or the extension table in which the preset standard scenario related with the contents player for music and moving picture is stored, from the storage unit 170. The controller also detects a signal from the sensor detection unit. When the accelerated motion of one time is sensed by the sensor unit, the sensor detection unit generates the accelerated motion signal of one time. The controller recognizes whether the portable terminal performs an appropriate one time accelerated motion state based on the sensor signal sent from the sensor detection unit. At this time, the controller can classify whether the collected sensor signal is a one time accelerated motion. That is, the controller can examine whether the change of the acceleration according to the one time accelerated motion which the sensor detection unit sends is a critical value or more that the critical value. To this end, the controller can be set in such a manner that the controller can recognize whether the acceleration change value according to the one time accelerated motion is a critical value or more.

If the controller receives a signal corresponding to a one time accelerated motion, the controller sends the coinciding standards scenario after comparing the preset standards scenario related with the contents player for music and moving pictures, which are previously fetched from the storage unit, to the application program as an input signal. At this time, when the application program is a contents player for music and moving pictures, the standards scenario can include information which defines the function of moving to a next step or a previous step by the accelerated motion of one time. If it is determined that the input scenario corresponding to the above-described standards scenario is a signal sent from the sensor detection unit, the controller controls to move to a previous track by the accelerated motion of one time in a first direction, and to move next track by the accelerated motion of one time in a second direction. That is, if the user shakes the terminal to the left side or the right side one time, the portable terminal can check a signal of moving to the left side of terminal based on a signal received from the sensor unit. The controller previously sets the critical value of speed in the movement of the terminal. When the terminal moves to the left side or the right side over a given speed, the controller considers a corresponding movement as an effective state, and can exactly recognize a relevant operation. If the movement recognition is determined, as shown in FIG. 3, the controller controls to perform the control of contents playing which is predefined with respect to a corresponding direction. That is, if the accelerated motion is generated one time to the left side, the controller controls the movement to the previously played track based on the contents which is currently being played, whereas if the accelerated motion is generated one time to the right side, the controller controls the movement to the next track based on the contents which is currently being played. To this end, it is preferable that the controller loads the play list of the contents from the storage unit. In the above-described description, the state of moving the terminal to the left side is considered as the previous track selection, and the state of moving the terminal to the right side is considered as the next track selection. However, the setting of the track selection according to the direction can be changed by user or designer.

Figure 14:
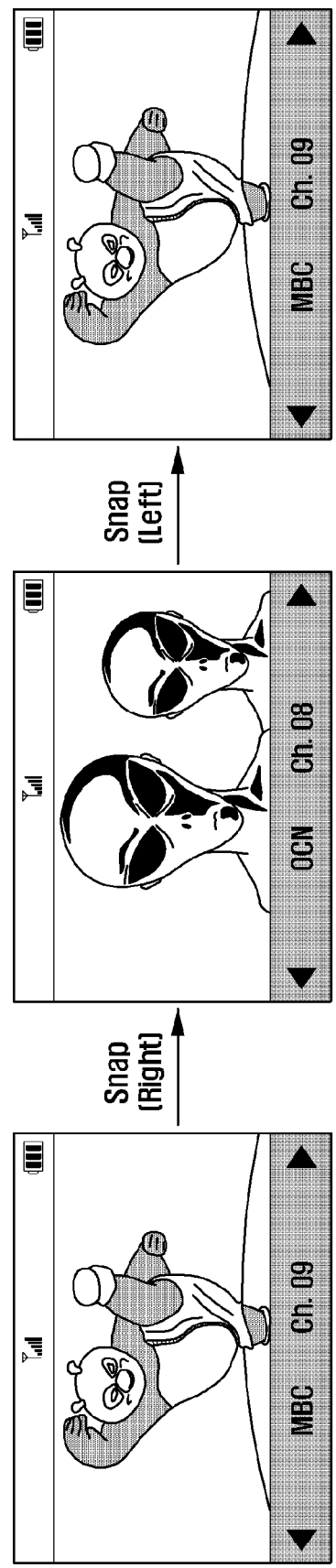

FIG. 14 is a drawing of an example of a screen for illustrating the operation of portable terminal which moves to a next, or previous channel, in case of a channel player including a radio, a digital multimedia broadcast (DMB), or the like according to an exemplary embodiment of the present invention. The detailed apparatus operation process is similar to the contents player for the music and the moving picture illustrated in FIG. 13.

That is, in the state where the controller previously obtains the information of the channel list through a channel guide, the controller senses one time accelerated motion of the portable terminal, controls to select the previous channel or the next channel around the current channel on the channel list based on the information of the direction of a corresponding accelerated motion.

Figure 15:
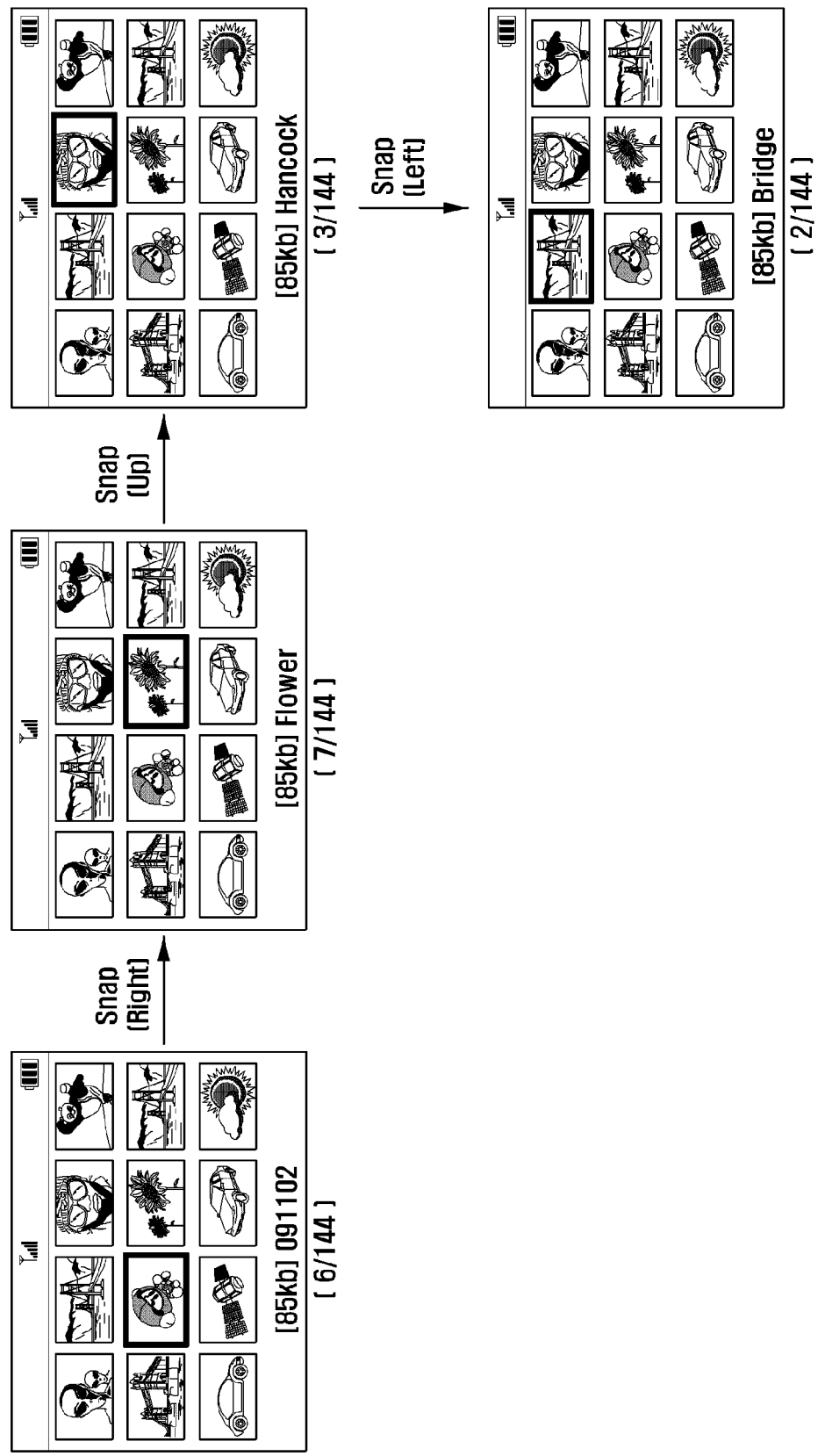

FIG. 15 is a drawing of an example of a screen for illustrating the operation of a portable terminal in which a highlight moves to 4 degrees of freedom (up, down, left, right) in case of two dimension GUI object view according to an exemplary embodiment of the present invention. The detailed apparatus operation process is similar to the contents player for the music, the moving picture, or the like. That is, according to the user's request, the portable terminal can provide a menu screen or a contents multi-view screen. In such screen, a plurality of selectable images are arranged while having a certain arrangement according to object. At this time, if the user shakes the portable terminal to one direction including up, down, the left, and the right with the one time accelerated motion, the sensor unit of the portable terminal can send the information about a corresponding direction to the controller. If the movement having a speed over a preset critical value with respect to a specific direction is generated, the controller can determine a relevant movement state as a signal corresponding to the generation of an input signal for the object designation. And if the controller determines a corresponding signal value, the controller can control to move a highlight box or a check box for designating objects which are output to a screen according to a corresponding signal.

In the above-described description, the sensor unit initializes a specific sensor, for example, a gyro sensor or an acceleration sensor, before detecting movement to a specific direction, and can send the information about a direction of the accelerated motion to the controller, after the state in a corresponding initialization process is determined as a central axis.

Figure 16:
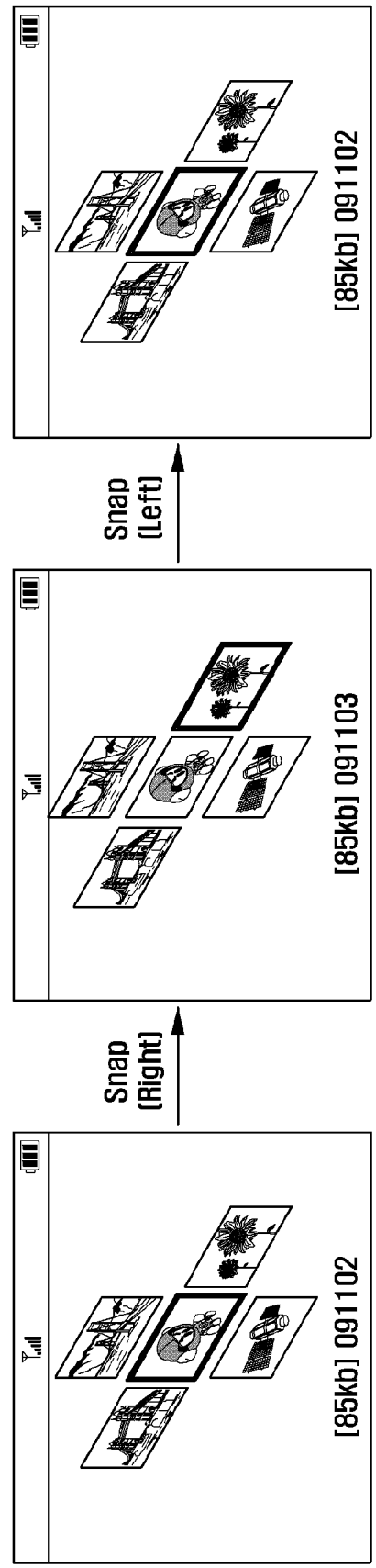

FIG. 16 is a drawing of an example of a screen for illustrating the operation of the portable terminal in which the highlight moves to 6 degrees of freedom (previous, next, up, down, left, right) in case of three dimension GUI object views according to an exemplary embodiment of the present invention.

As illustrated in FIG. 15, when the current state is determined as a central axis in the initialization state of the sensor in the sensor unit, and a one time accelerated motion over a preset critical value is generated in a specific direction based on a corresponding state, the controller can recognize a corresponding state as an operation for the generation of an input signal. At this time, the controller determines the operation state for 6 directions in consideration of the currently activated three-dimensional object. That is, the controller can variously determine the operation state of the portable terminal based on a signal value sent from the sensor unit according to the characteristic of the currently executed application. And the controller can control the movement of the highlight box according to a signal value on the three-dimensional object which is currently outputting.

In the above description, the accelerated motion in a specific direction includes an accelerated motion in a specific direction through rotational motion of the terminal and an accelerated motion in a specific direction through linear motion.

When receiving a signal value from the sensor detection unit, the controller controls to prepare the standard scenario based on the input signal table or the extension table stored in the storage unit, to compare the input scenario corresponding to a signal value received from the sensor detection unit with the standard scenario to generate an input signal for controlling the operation of a portable terminal in the above-described description.

Hereinafter, a portable terminal according to a tilting motion and an operation method in a third exemplary embodiment of the present invention is illustrated in detail. The configuration of the portable terminal according to the third exemplary embodiment of the present invention can have a configuration which is similar to the above-described configuration of FIG. 1. That is, the portable terminal includes a wireless frequency unit, an audio processing unit, a sensor unit, a sensor detection unit, a display unit, a storage unit, and a controller. Accordingly, repeated descriptions of like components and configurations shown with reference to FIG. 1 to FIG. 16 are omitted. The sensor unit generates a signal of a tilting angle according to the tilting motion of the portable terminal. The sensor unit includes an additional sensor for the generation of tilting angle signal, for example, a terrestrial magnetism sensor, an optical sensor, and a photo sensor.

In case the acceleration sensor is arranged in the inner side of the portable terminal case, the sensor detection unit can detect a signal generated according to the change of the tilting angle due to the tilting motion of the portable terminal. The sensor detection unit can detect a signal corresponding to the change of the direction of tilting motion by using the gyro sensor. The sensor detection unit can send signals detected from each sensor to the controller. The display unit can output a screen according to the activation of a specific application program upon the user's request. At this time, the display unit can output an input signal table mapping the standards scenario capable of controlling the currently executed application program to an input signal respectively or mapping the standards scenario menu item. In case the user inputs a separate motion signal, the input signal table is overlapped and displayed to the application program screen, or can be outputted through a separate pop-up window. In the meantime, the input signal table can be added and displayed to a corresponding image when outputting an image corresponding to a key for the activation of the application program while not being outputted to a separate pop-up window or not being overlapped to a screen. For example, the display unit can output at least one menu item, and can output a combination of text, image or icon where at least one standards scenario for executing a corresponding menu item is predefined, with the menu item. The storage can temporarily store, that is, buffer, tilting motion signals collected in the operation of the tilting motion input device. Such storage unit includes a program area and a data area.

The program area can store a tilting motion input device support application program, an application program for operating each sensor included in the sensor unit, a program which collects a signal inputted from the sensor and prepares an input scenario, a program which compares the prepared input scenario with a standards scenario prepared in the input signal table and generates a corresponding input signal, and an application program for executing a specific function according to the generated input signal. The data area stores the above described tilting angle input signal table, and loads it into the controller under the control of the controller in the operation of the motion input device. To this end, the data area can store a scenario database. The scenario database is a tilting angle input signal table or an extension table prepared according to an application program. The tilting angle input signal table, as described above, is a table mapping the standards scenario to a tilting angle input signal according to an application program. The controller prepares the input scenario by using a tilting angle input signal generated based on a sensor signal which the sensor detection unit generates. The input scenario is generated based on at least one tilting angle signal.

In case the user selects the tilting motion UI activation mode, the controller selects the tilting angle input signal table or the extension table corresponding to the application program of the currently executed portable terminal from the scenario database and loads it. The controller compares the prepared input signal table with the standards scenarios written in the input signal table, and detects the same standards scenario. Thereafter, the controller can control to generate an input signal corresponding to the detected standards scenario, and to apply a corresponding input signal to an application program currently being executed.

Figure 17:
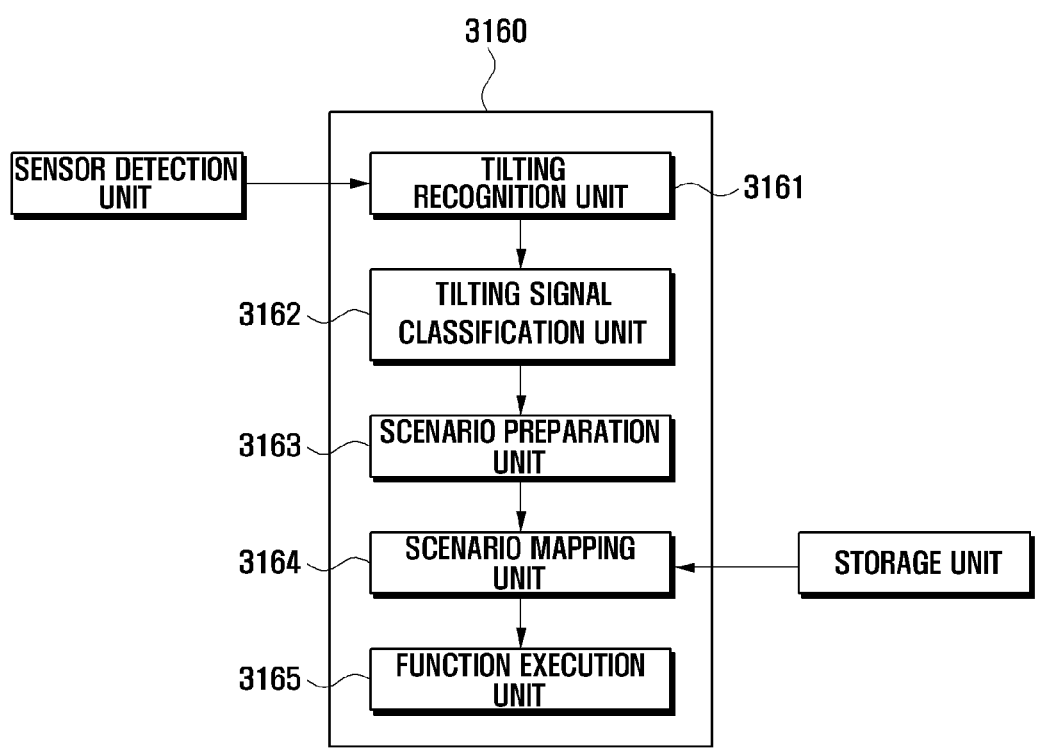
FIGS. 17, 18, 19, 20, 21, and 22 are drawings illustrating a third exemplary embodiment of the present invention.

To this end, as shown in FIG. 17, the controller 3160 can include a tilting recognition unit 3161, a tilting signal classification unit 3162, a scenario preparation unit 3163, a scenario mapping unit 3164, and a function execution unit 3165. In FIG. 17, the scenario extension unit illustrated in FIG. 6 can be added, and the operation identical with the operation described in FIG. 6 is available. For the sake of convenience in illustration, hereinafter, the operation based on the input signal table is described.

The tilting recognition unit 3161 recognizes a specific form of the operation recognition unit, that is, a tilting in the motion. The tilting signal classification unit 3162 recognizes a tilting signal among the motion signals. The tilting recognition unit 3161 detects the tilting motion of portable terminal based on a sensor signal sent from the sensor detection unit. The tilting recognition unit 3161 receives a sensor signal sent from the sensor detection unit, and determines that the collected sensor signal corresponds to a tilting signal. The tilting signal is a signal which includes a tilting start point, a tilting direction, and a tilting variation of the portable terminal. That is, the tilting recognition unit 3161 can generate a tilting angle signal through a tilting start point, a tilting direction, and a tilting variation based on a sensor signal generated in the sensor detection unit.

For example, if the user tilts a portable terminal to a specific direction, the sensor detection unit receives a signal from at least one among the acceleration sensor and the gyro sensor included in the sensor unit. Based on the received signal, the sensor detection unit generates a sensor signal corresponding to the generation of a special signal in a specific sensor, and sends it to the tilting recognition unit 3161. The tilting recognition unit 3161 can generate a tilting angle signal based on the sensor signal. The sensor detection unit differently sends an oscillation waveform corresponding to an angle and generated according to the tilting operation of the portable terminal, to the tilting recognition unit 3161. Each tilting angle signal generated in the tilting recognition unit 3161 is transferred to the controller and becomes an element for preparing an input scenario. The tilting signal classification unit 3162 performs a task of classifying the tilting signals sent on a real time basis from the tilting recognition unit 3161. That is, the tilting recognition unit 3161 respectively classifies the tilting angle signals sent from the tilting recognition unit 3161 and successively assorts the tilted angle signals, and sends the assorted tilting angle signals to the scenario preparation unit 3163. The scenario preparation unit 3163 prepares an input scenario based on the tilting angle signals received from the tilting recognition unit 3161.

In an initial state, the scenario preparation unit 3163 performs an initialization process for the preparation of the input scenario. When a tilting signal is received, the scenario preparation unit 3163 sequentially mixes the tilting angle signals generated through the start point of a corresponding tilting, the direction of the tilting, and the variation of the tilting. Then, when receiving a tilting angle signal of a terminating one input scenario signal, for example, a second non-tilting signal received at a preset second time, the scenario preparation unit 3163 can determine the combination of the tilting angle signals which are previously mixed as one input scenario. If the non-tilting angle signal is input between respective inputted tilting angle signals for a preset third time, the scenario preparation unit 3163 can classify the tilting angle signal previously inputted and the tilting angle signal inputted next.

In case a plurality of tilting angle signals are simultaneously inputted, the scenario preparation unit 3163 can recognize that the tilting operations are consecutively performed base on the input time. Moreover, the scenario preparation unit 3163 can separately recognize the respective tilting angle signals which are simultaneously generated and can make an input scenario. This scenario preparation unit 3163 sends the prepared input scenario to the scenario mapping unit 3164. The scenario mapping unit 3164 compares the input scenario which the scenario preparation unit 3163 sends with the standards scenario written in the input signal table, and generates a corresponding input signal. Here, the scenario mapping unit 3164 loads an input signal table corresponding to the application program executed in the portable terminal among the scenario database previously stored in the storage unit. And the scenario mapping unit 3164 sends an input signal corresponding to the input scenario to the function execution unit 3165. The function execution unit 3165 is configured to use the application program currently being executed based on the input signal sent from the scenario mapping unit 3164. For example, the function execution unit 3165 displays icons indicating current items. In case an input signal corresponding to "item arrangement" is received from the scenario mapping unit 3164, the function execution unit 3165 can control to arrange and display icons which are currently displayed according to a given condition. Hereinafter, the operation method of a portable terminal according to the above-described third exemplary embodiment of the present invention is illustrated in detail with reference to drawings.

Figure 18:
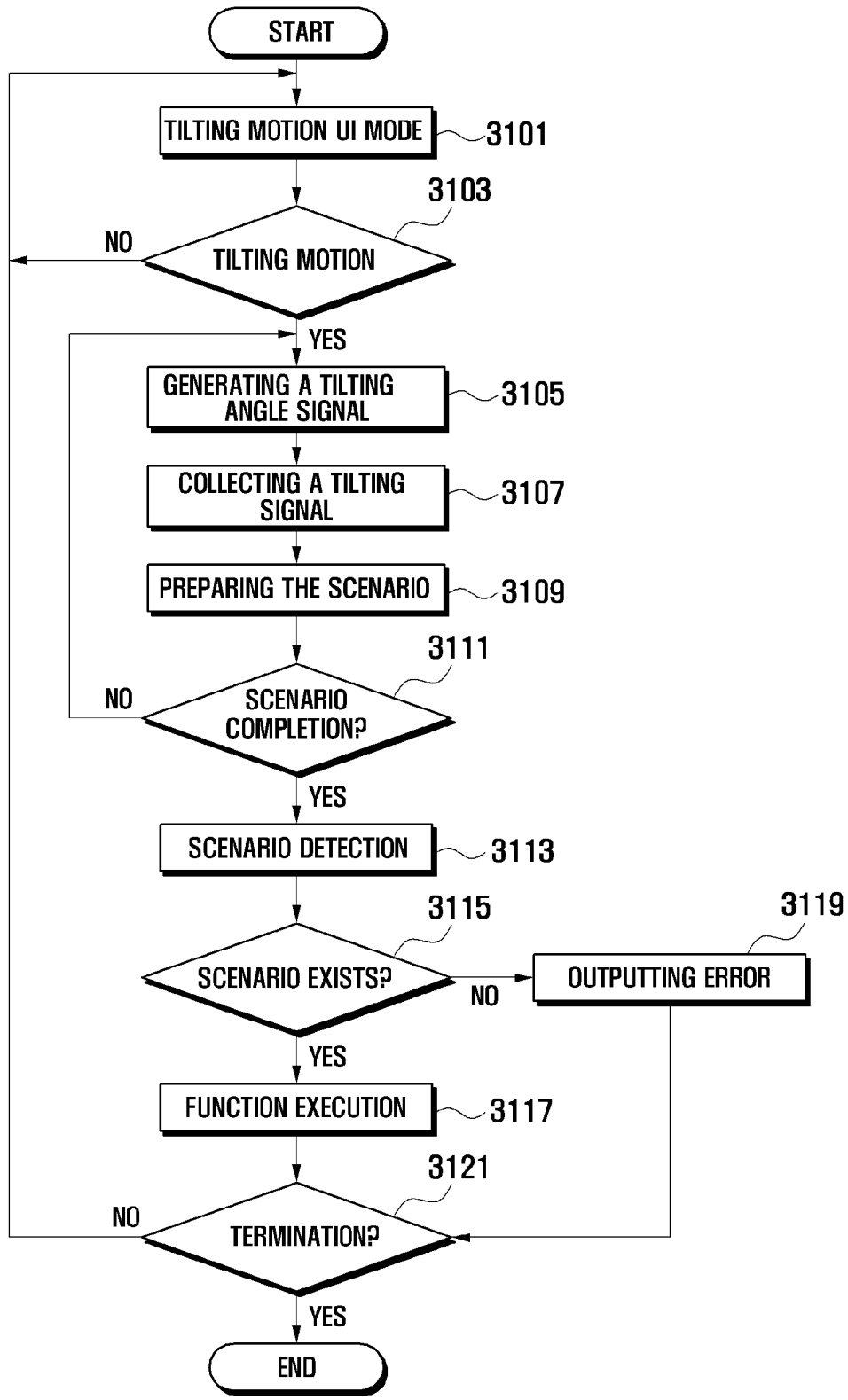

FIG. 18 is a flowchart illustrating the operation method of the tilting motion input device according to an exemplary embodiment of the present invention.

Referring to FIG. 18, when the portable terminal activates the tilting motion UI mode according to the user's request (3101), the portable terminal performs an initialization process for driving the tilting motion input device. For example, in case a hotkey or a menu item for the switching of tilting motion UI mode is set up, the user can activate a corresponding hotkey or can select a menu item.

The portable terminal may then supply a power to the sensor unit and the sensor detection unit for the support of tilting motion UI mode. The sensor unit provided with the power supplies the power to various sensors which the portable terminal includes, for example, an acceleration sensor, and a gyro sensor. The sensor unit also performs the initialization process.

If a signal is generated in the sensor unit, the sensor detection unit collects the signal and generates a sensor signal based on a signal value generated according to the kind of sensor, and provides this to the tilting recognition unit (3103). Then, the tilting recognition unit of the controller generates a tilting angle signal based on the received sensor signal (3105). That is, the tilting recognition unit determines the tilting angle of the portable terminal based on the sensor signal detected from the sensor unit and generates a titling angle signal. Then, the scenario preparation unit collects/receives the titling angle signal from the tilting recognition unit (3107), and prepares an input scenario (3109). The scenario preparation unit checks the completion of the input scenario which is currently prepared (3111). In case the input scenario is not completed, the process can return to step 3105.

In detail, in case the sent tilting angle signal is a tilting angle signal indicating the completion of one input scenario, for example, in case a non-tilting signal is sent for a preset time, the scenario preparation unit can mix the tilting angle signals previously inputted and complete the input scenario. In the process of completing the input scenario, the scenario preparation unit can generate one input scenario according to the tilting signals which are successively input as time elapses. Moreover, when the non-tilting signal is input for a preset time after the tilting angle signal is input, the scenario preparation unit can generate one input scenario which includes the inputted tilting angle signal of multi-direction. That is, the scenario preparation unit prepares an input scenario by using the tilting angle signals which are inputted according to a preset condition regardless of the kind of tilting angle signal. If the input scenario is prepared, the portable terminal examines whether the standards scenario among standards scenarios stored in the scenario database correspond to the prepared input scenario exists (3113).

To this end, the portable terminal checks the application program currently being executed, for example, the stand-by screen application program, the file search application program, the image application program, and the file sharing application program, or the like. The portable terminal reads an input signal table corresponding to the pertinent application program from the scenario database, and can check whether a standards scenario corresponding to the input scenario exists. Then, the portable terminal checks whether the standards scenario corresponding to the input scenario exists (3115). At this time, in case the standards scenario does not exist, the portable terminal can perform an input error output, or can ignore an input scenario (3119).

If the standards scenario corresponding to the input scenario exists at step 3115, the portable terminal supports the function performance (3117). That is, the portable terminal checks the input signal table to generate an input signal corresponding to the input scenario. And the portable terminal applies this input signal to the application program currently executed. Then, the portable terminal checks the termination of the tilting motion UI mode or the maintenance of supporting the tilting motion UI mode (3121). If the motion UI mode is not terminated, the process returns to step 3101 and performs the subsequent steps.

Figure 19:
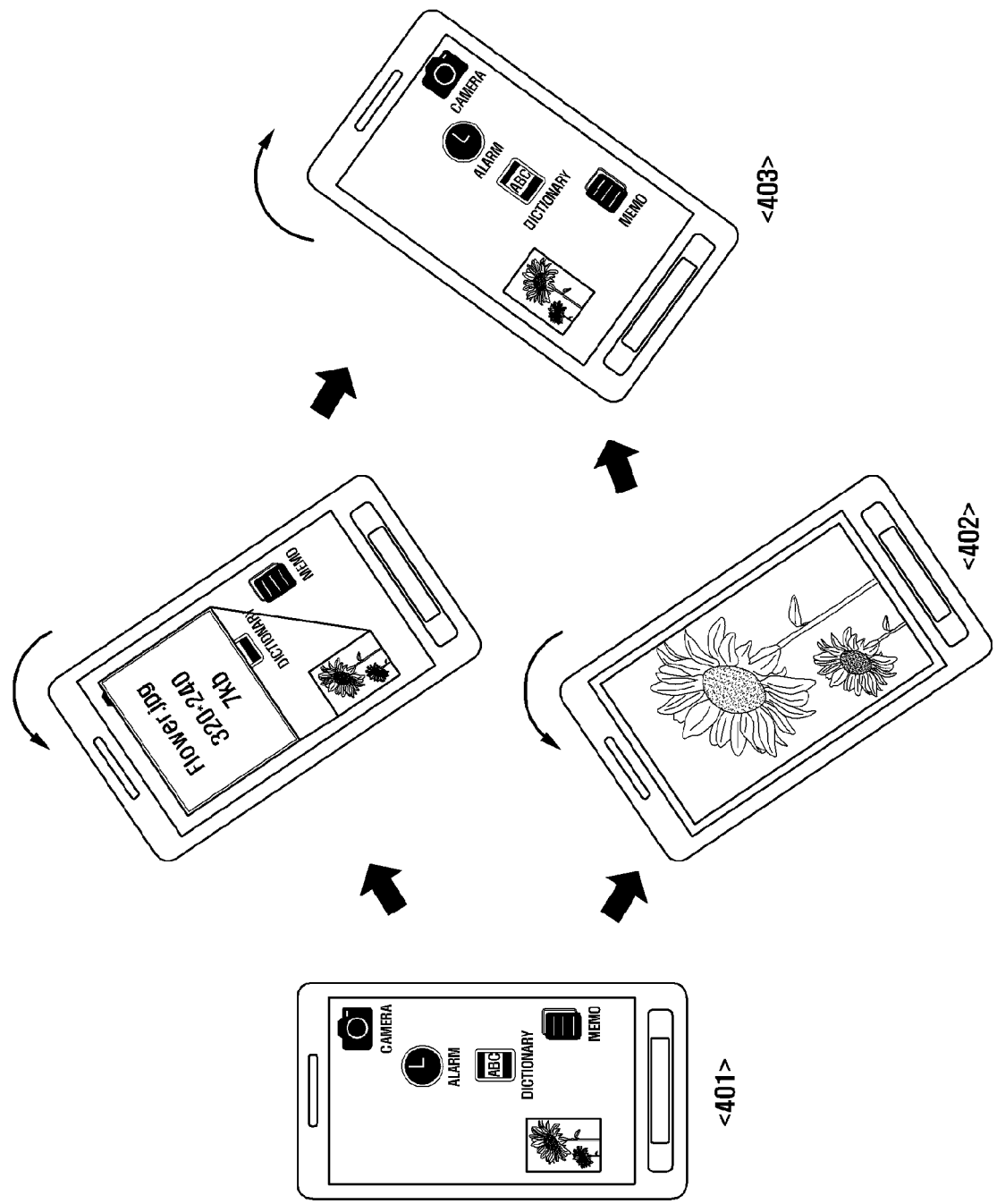

An example of a screen interface according to operation of a portable terminal based on a tilting motion input device of the present invention will be explained with reference to FIG. 19 in terms of viewpoint movement, object movement, and object rotation.

First, viewpoint movement is explained with reference to FIG. 19. As shown using reference numeral 401 in FIG. 19, a portable terminal can output an icon including sub-items and some detailed items. The icon may be a content file, a document file, or a folder including one or more files. After selecting the displayed icon, if the portable terminal is tilted to the right by more than 45° from the initial state, detailed items or sub-items of the selected icon are displayed. For example, if the icon is an image file, if the portable terminal is tilted to the right by more than 45°, the image may be extended as shown using reference numeral 402, or the detailed information of the image may be displayed as shown using reference numeral 403.

Further, after the portable terminal is returned to the initial state, if the portable terminal is tilted to the left by more than 45°, the displayed image or the detailed information is changed to the original image file. In case the icon is a folder including one or more files. After selecting the icon, if the portable terminal is tilted to the right by more than 45° from the initial state, the list of one or more files included in the folder may be displayed in the form of icons or a text list.

Further, after the portable terminal is returned to the initial state, if the portable terminal is tilted to the left by more than 45°, the displayed icons or the text list are changed to the initial icon state.

Here, when changing the state of displayed icons by recognizing the tilted angle, it is possible to adjust the speed of state change according to the tilted angle. That is, the speed of state change of the icon when the tilted angle is 45° and the speed of state change at 75° can be set to be different.

Figure 20:
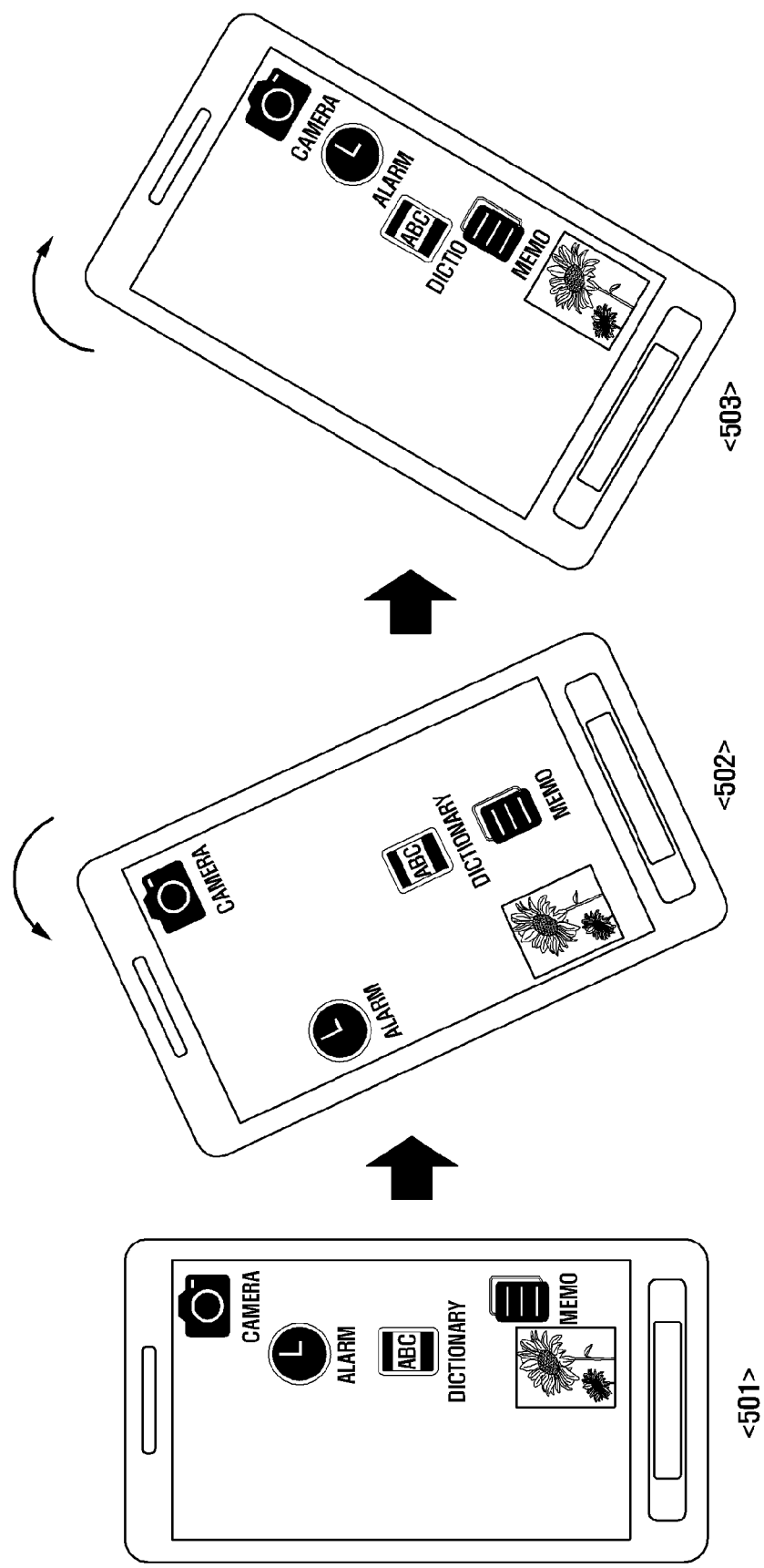

Next, object movement is explained with reference to FIG. 20. The portable terminal can display icons representing items on the screen as shown using reference numeral 501 in FIG. 20. Each icon item may be a group of application programs that can be supported by the portable terminal.

Further, a standards scenario may be outputted as a text, image or a combination of icons so that each menu item can be selected or activated according to the tilting signal in each icon item. After selecting certain icons or all displayed icons according to the user setting, if the portable terminal is tilted to the left by more than 45° from the initial state as shown using reference numeral 502, the selected one or more icons are arrayed on the left side of the screen.

After the portable terminal is returned to the initial state, if the portable terminal is tilted to the right by more than 45°, the selected one or more icons are arrayed on the right side of the screen as shown in reference numeral 503.

That is, the selected one or more icons may be arrayed on one side of the screen according to the tilted direction and angle of the portable terminal. If the portable terminal is returned to the initial state while the icons are moving to the right or the left, the icons stop moving.

Figure 21:
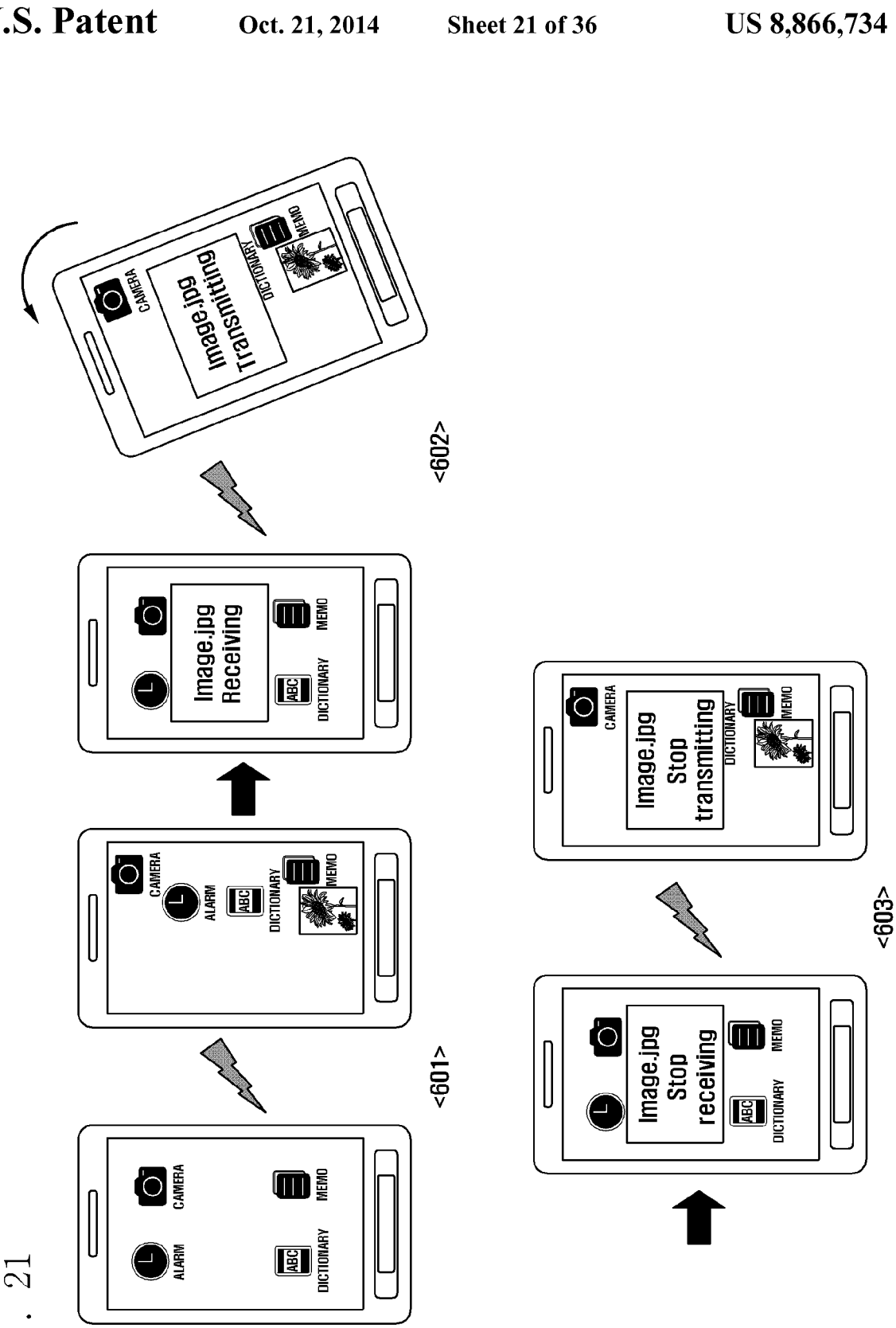

Next, another exemplary embodiment related to object movement is explained with reference to FIG. 21. As shown using reference numerals 601 to 603 in FIG. 21, in the state where the portable terminal is connected to another terminal by wireless communication, the content or file selected by the user can be transmitted by recognizing the tilt of the portable terminal.

In more detail, wireless communication refers to a communication method by which mutual data transmission and reception is possible between portable terminals, such as, for example, Bluetooth and ZigBee. First, if files are selected in the state where mutual data transmission and reception are possible as in reference numeral 601, and the portable terminal is tilted to the right or the left by more than 45° as in reference numeral 602, the selected files start to be transmitted to the connected portable terminal. In case the user wants to stop transmission while the files are being transmitted, if the user returns the portable terminal to the initial state before being tilted, the transmission operation is stopped.

Figure 22:
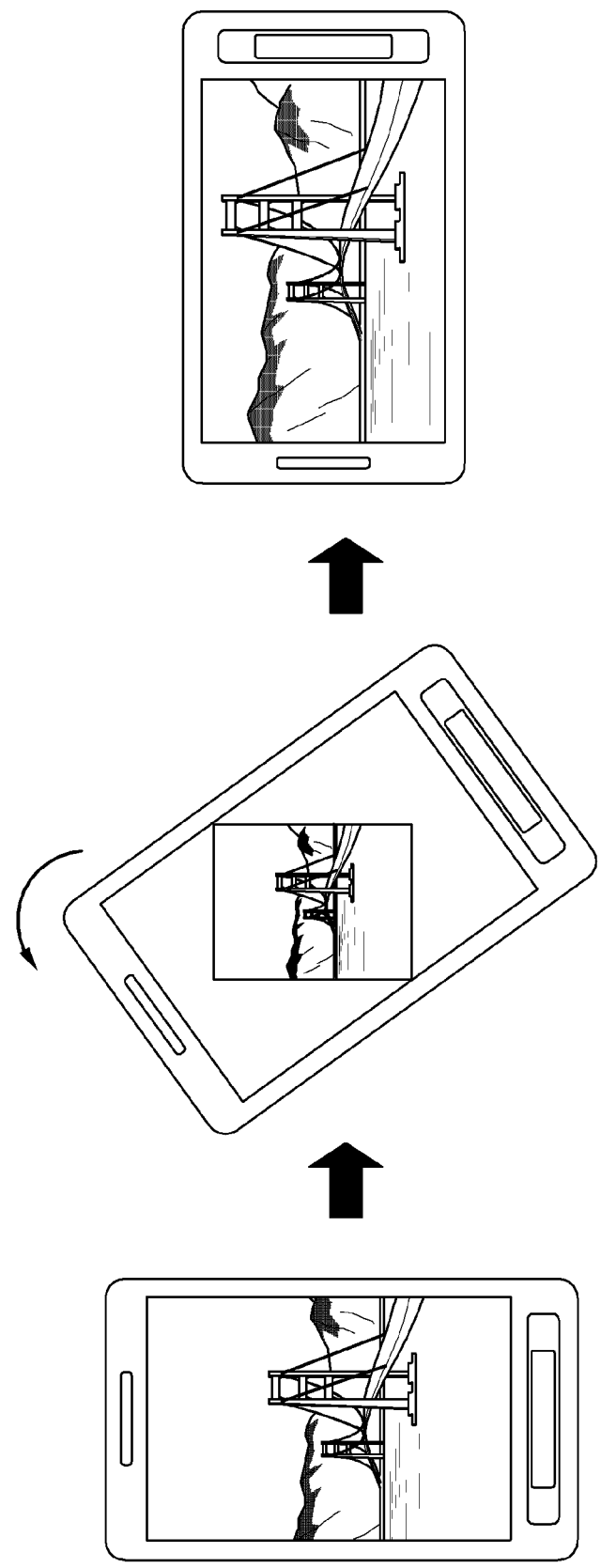

Next, object rotation is explained with reference to FIG. 22. As shown in FIG. 22, a portable terminal displays content such as a certain image or document thorough an application. At this time, if the portable terminal is tilted to the right or the left by more than a certain angle, the tilted angle of the portable terminal is detected, and the displayed content is rotated according to the tilted angle so that the user can see the content straight.

In more detail, if the portable terminal is tilted to the right by 45° from the initial state, the displayed content is rotated in the reverse direction of the tilt by 45°. That is, in response to the tilt of the portable terminal, the displayed content is rotated in the reverse direction by the corresponding angle, so the straight screen is always displayed.

The portable terminal according to the exemplary embodiment can display standards scenario information, and the set parameter information can also be displayed together. For example, in the above explanation, the scenario about object movement in an input signal table may include parameters for each tilt angle signal as shown in TABLE 5.

TABLE 5

| STANDARDS SCENARIO (OBJECT MOVEMENT) | PARAMETER 1 | PARAMETER 2 |
|---|---|---|
| Initial state | 0° (angle) | Straight direction (direction) |
| File movement | 45°-60° (angle) | Right (direction) |
| File movement (speed increase) | More than 60° (angle) | Right (direction) |

Referring to TABLE 5, if the user tilts the portable terminal to the right by more than 45° form the initial straight state, the file is moved, and if the user tilts the portable terminal to the right more than 60°, the file is moved at faster speed. Here, the portable terminal may display the standards scenario information as well as the tilted angle on the display unit.

Hereinafter, the sensing of at least two times of tapping and the method of operating a portable terminal after the sensing will be explained in another exemplary embodiment of the present invention.

In a fourth exemplary embodiment of the present invention, the portable terminal includes a wireless frequency unit, an audio processing unit, a sensor detection unit, a display unit, a storage unit, and a controller. The portable terminal may further include a camera. Repeated descriptions of elements and components already described with reference to FIG. 1 to FIG. 22 will be omitted.

In the process of activating a certain application program to support a certain function of a portable terminal according to the user's request, the portable terminal generates a corresponding signal based on at least two consecutive times of tapping, and applies the generated signal in controlling the application program currently being executed.

The wireless frequency unit forms a communication channel with another portable terminal under the control of the controller, and transmits and receives voice or image signals based on the communication channel. Here, in the wireless frequency unit, the communication channel may be turned on or off based on the signal generated by at least two consecutive times of tapping.

The audio processing unit may control audio signals to be played or to be temporarily stopped based on the signal generated by at least two consecutive times of tapping on the portable terminal.

The sensor unit is operated based on power supplied according to the control of the controller, and generates a certain signal according to at least two consecutive times of tapping on the portable terminal. The sensor unit may transmit the generated signal to the sensor detection unit.

The sensor detection unit can classify at least two consecutive times of tapping on the portable terminal based on the sensor signal collected by an acceleration sensor or a gyro sensor, and transmit the tapping signal to the controller. That is, the sensor detection unit analyzes at least two consecutive times of tapping inputted from the sensor unit, for example, analyzes whether the intensity of the tapping is more than a given critical value or whether time interval between the tappings is less than a given time, and determines whether the predefined at least two consecutive times of tapping is being performed.

The controller can control execution of or stop the function currently being executed according to the signal generated by at least two consecutive times of tapping on the portable terminal. The controller can recognize the input of at least two consecutive times of tapping on the portable terminal based on the sensor signal transmitted from the sensor detection unit. That is, the controller can check whether the change in acceleration size according to at least two consecutive times of tapping transmitted by the sensor detection unit is more than a critical value. For example, the controller can set to recognize whether the acceleration size change according to at least two consecutive times of tapping is more than the critical value and whether the time interval between the tappings is less than given time. Also, the controller compares the signal of at least two consecutive times of tapping and a given operation scenario fetched from the storage unit, and transmits the corresponding operation scenario and the relevant input signal to the application program. If at least two consecutive times of tapping is inputted on the portable terminal, the portable terminal can be controlled to execute or stop the application program. Hereinafter, the operation of the portable terminal is explained in more detail with reference to drawings.

Figure 23:
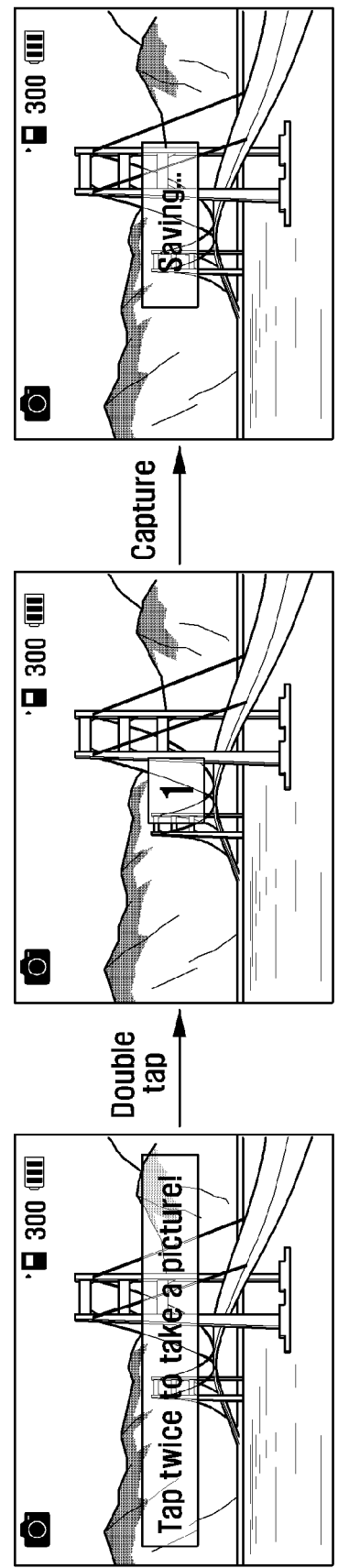
FIGS. 23, 24, 25, and 26 are drawings illustrating a fourth exemplary embodiment of the present invention.

FIG. 23 illustrates the operation of an input device of a portable terminal executing still picture capturing function when an application program according to an exemplary embodiment of the present invention is in a still picture shooting mode. In case the application program is in the still picture shooting mode, the controller fetches the given operation scenario related with the still picture shooting mode in the storage unit in a state where it is recognized that the application program is in the still picture shooting mode. In FIG. 23, it is assumed that two consecutive times of tapping is matched with the still image capturing function, and is stored in the storage unit. In case two consecutive times of tapping is sensed by the sensor unit, a sensor signal for at least two consecutive times of tapping is generated in the sensor detection unit, and the controller recognizes whether two consecutive times of tapping is input in the portable terminal based on the sensor signal transmitted from the sensor detection unit. A controller collects the sensor signal transmitted from the sensor detection unit, and classifies whether the collected sensor signal is two consecutive taps. The controller can check whether the change of acceleration motion due to two consecutive times of tapping transmitted by the sensor detection unit is more than the critical value. For example, the controller can recognize whether the change in acceleration motion by two consecutive times of tapping is more than the critical value and whether the time interval of the tappings is less than given time. Then, in case the corresponding signal is valid, the controller compares given standards scenarios related with the still picture shooting mode stored in the storage unit, and transmits the coincided standards scenario to the application program as an input signal. Here, in case the application program is in the still picture shooting mode, the standards scenario for two consecutive times of tapping is stored by performance of the still picture shooting function. Particularly, in the case of the still picture shooting function, in order to prevent the shaking of photos by automatically operating the self timer after two consecutive times of tapping is recognized, the capturing function can be set to operate the capturing function after a given time after the second tapping is sensed among two consecutive times of tapping. Also, an alarm can be set up to be output for a time period for the audio feedback.

Figure 24:
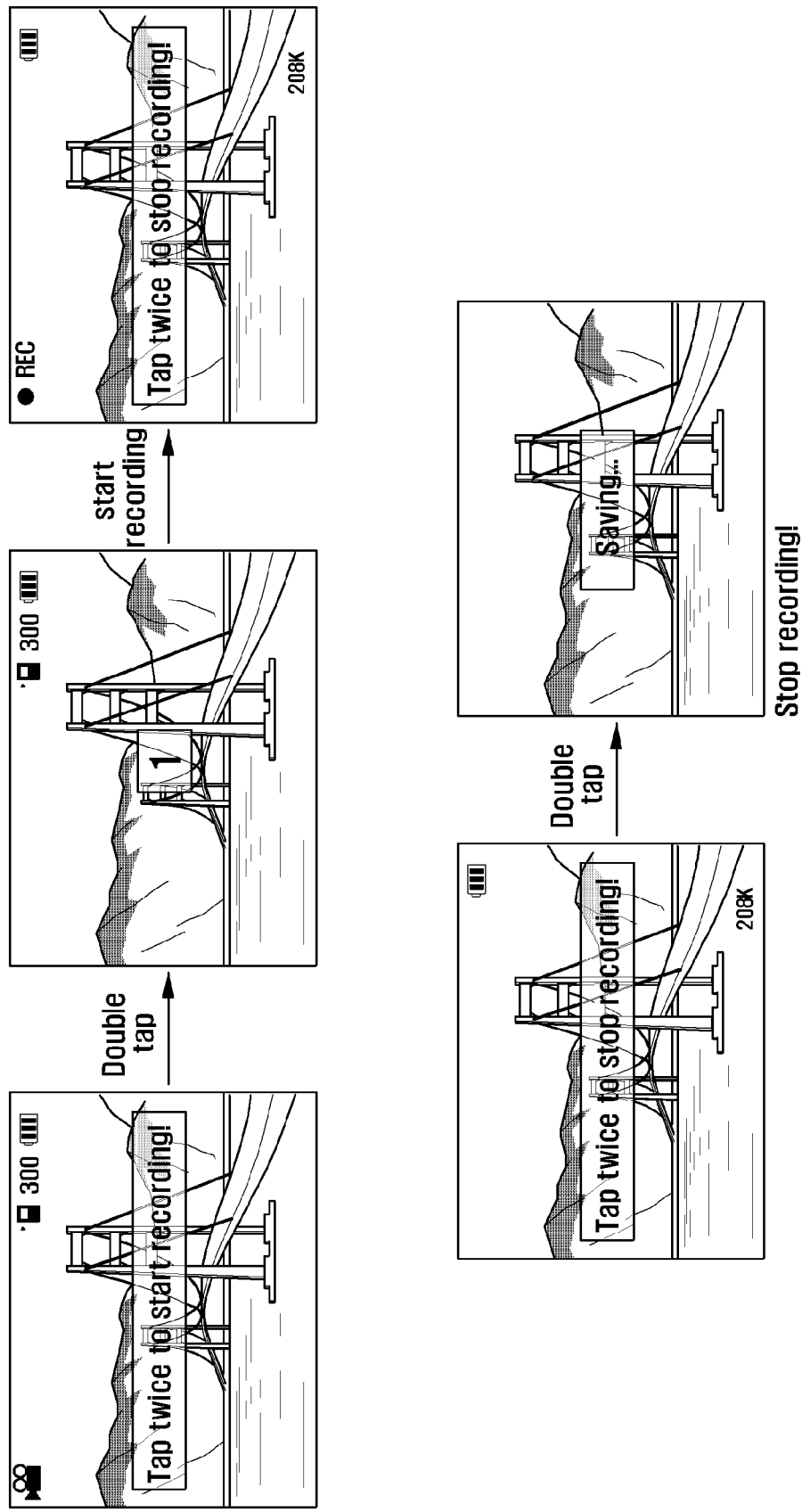

FIG. 24 illustrates an example of a screen for explaining the operation of a portable terminal which starts and stops a moving picture shooting in the moving picture shooting mode according to an exemplary embodiment of the present invention. The detailed apparatus operation process is the same as that in the still picture shooting mode. In FIG. 24, it is assumed that two consecutive times of tapping is matched with the start and stop function of the moving picture shooting, and is stored in the storage unit. In the case of the moving picture shooting mode, the stop of the moving picture shooting is set to two consecutive times of tapping, the moving pictures shake, and the tapping sound is recorded. Hence, the moving picture encoding can be set up to be started from the frame after the second tapping of the first two consecutive times of tapping is sensed, and to be continued until the frame before the first tapping of the second two consecutive times of tapping is sensed. Also, for the audio feedback, an alarm can be set up to be output during the time period between the first two consecutive times of tapping and the time point when the moving picture encoding is started and during time period between the second two consecutive times of tapping and the time point when the moving picture encoding is terminated.

Figure 25:
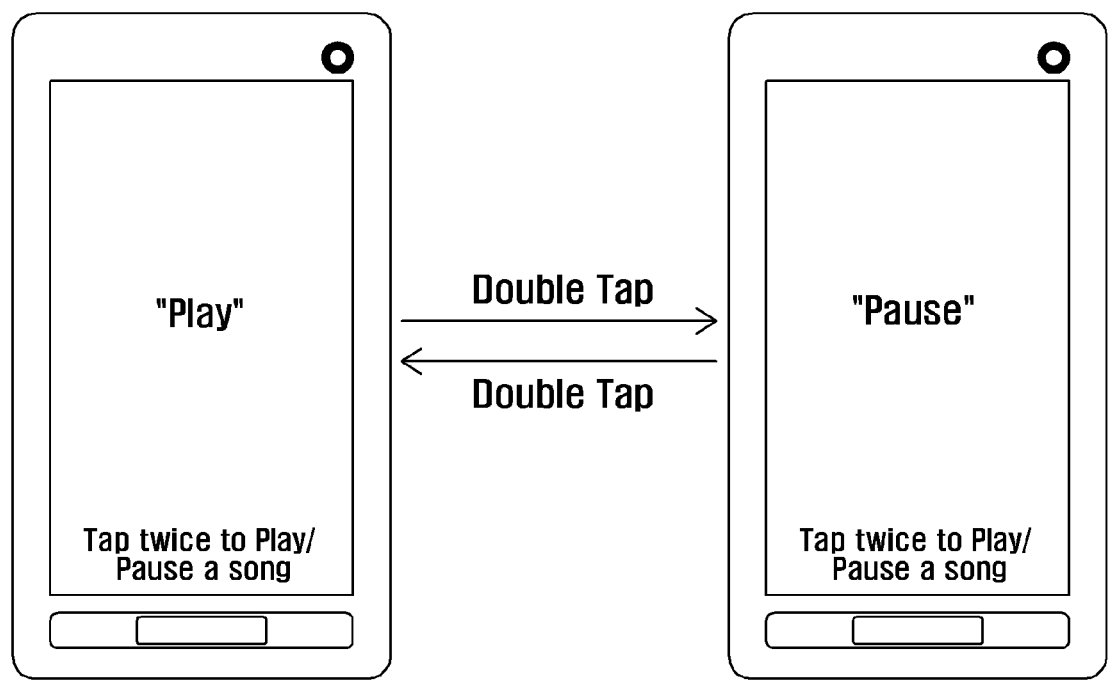

FIG. 25 illustrates an example of a screen for explaining the operation of a portable terminal input device which performs a play or a temporary stop using two consecutive times of tapping when the application program is at content play mode. The detailed device operation process is the same as that in the still picture shooting mode.

Figure 26:
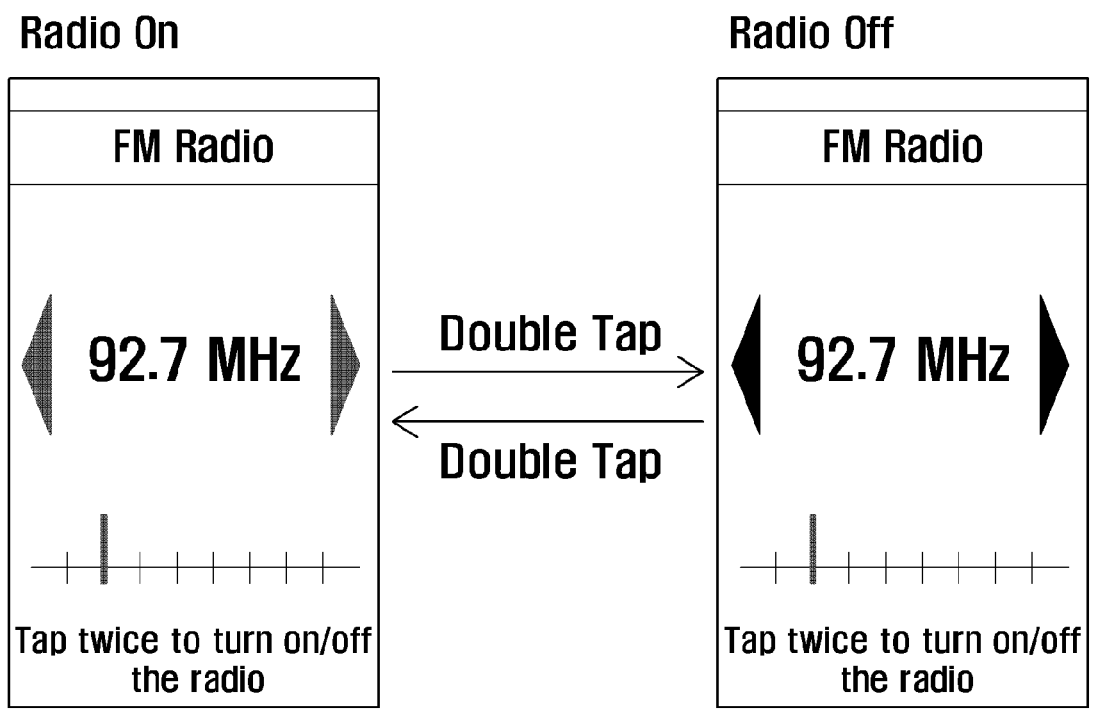

FIG. 26 illustrates an example of a screen for explaining the operation of a portable terminal input device which turns on or off the channel using two consecutive times of tapping when the application program according to an exemplary embodiment of the present invention is a digital multimedia broadcast (DMB), a radio, or the like. The detailed device operation process is the same as that in the still picture shooting mode.

Hereinafter, a portable terminal which operates according to a tapping pattern and the operation method according to a fifth exemplary embodiment of the present invention will be explained.

The portable terminal according to the fifth exemplary embodiment is similar to that of the portable terminal of the fourth exemplary embodiment, and includes a wireless frequency unit, an audio processing unit, a sensor unit, a sensor detection unit, a display unit, a camera, a storage unit and a controller. Also, the portable terminal may further include an image processing unit for processing signals inputted from the camera. The image processing unit may be part of the controller. In the following explanation, repeated descriptions of elements and components already described with reference to FIG. 1 to FIG. 26 will be omitted.

The storage unit may include a program area and a data area. The program area can store programs for controlling general operations of a portable terminal and a program which controls performance of the corresponding function in response to the tapping sense signal. Also, the data area temporarily stores data generated while such programs are performed. Also, the storage unit stores a scenario database which matches tapping patterns set by the user to functions according to the tapping patterns.

The controller controls general operations of a portable terminal. Also, the controller determines a tapping pattern by checking at least one of the tapping intensity, the tapping position, the frequency of tapping, the tapping recognition time, interval information between tappings, entire tapping input time and motion connection information with other motions except the tapping from the tapping sense signal. The controller controls the portable terminal to perform a function corresponding to the determined tapping pattern with reference to the database which matches tapping patterns to functions. The controller activates the sensor unit and the sensor detection unit before the tapping is input from the user. The sensor unit and the sensor detection unit can be activated while the portable terminal is turned on, and can become activated from the deactivated stated by an input. If the user inputs an activation command of the sensor unit and the sensor detection unit using the input unit, the controller changes the sensor unit and the sensor detection unit in the deactivated state to the activated state. When a certain application is executed among applications stored in the portable terminal, the controller takes the execution as an activation command of the sensor unit and the sensor detection unit, and changes the sensor unit and the sensor detection unit in the deactivated state into the activated state.

The sensor unit and the sensor detection unit detect movement of the portable terminal by the user. The sensor unit and the sensor detection unit may include one or more sensors, and an acceleration sensor, a gyro sensor, a terrestrial magnetic sensor, and any other sensor that can recognize the user's motion. The sensor unit and the sensor detection unit sense the user's tapping, generate the tapping sense signal, and output the signal to the controller. The sensor unit and the sensor detection unit can sense not only the tapping, but also the snapping, shaking, and tilting, and if the corresponding signal is output to the controller, the controller determines the motion pattern by linking the input motions, and performs the corresponding function.

A camera shoots image data, and includes a camera sensor which converts light signals into electronic signals and a signal processing unit which converts analog picture data taken from the camera sensor into digital data. Here, it is assumed that the camera sensor is a CCD sensor, and the signal processing unit can be implemented as a digital signal processor (DSP). Also, the camera sensor and the signal processing unit can be integrally implemented, or can be separately implemented.

The image processing unit generates screen data for displaying image signals from the camera. The image processing unit processes image signals output from the camera by frame units, and outputs the frame image data according to the feature and the size of the display unit. Also, the image processing unit classifies image CODEC, and compresses the frame image data displayed on the display unit according to a predefined method or restores the compressed frame image data to the original frame image data. The image CODEC may be JPEG CODEC, MPEG4 CODEC or Wavelet CODEC. It is assumed that the image processing unit includes OSD (On Screen Display) function, and the on-screen display data can be outputted depending on the displayed screen size.

The display unit displays image signals output from the image processing unit 150 on the screen, and displays user data output from the controller. When a certain function is performed according to the tapping pattern, the display unit can display a corresponding screen.

The input unit includes keys for inputting numbers and letters information and function keys for setting various functions, and when the display unit is implemented as a touch screen, the input unit may be in a combined form with the display unit.

Figure 27:
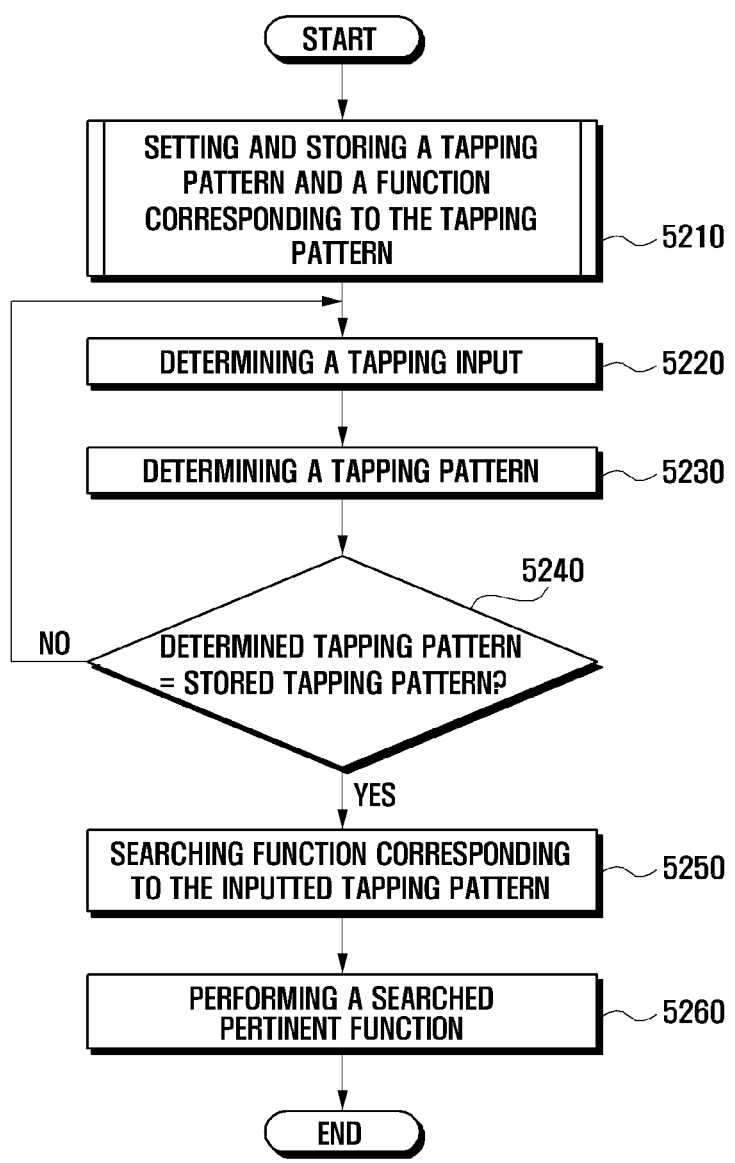

FIG. 27 is a flowchart illustrating a method of controlling the operation of a portable terminal by sensing tappings according to an exemplary embodiment of the present invention.

Figure 28:
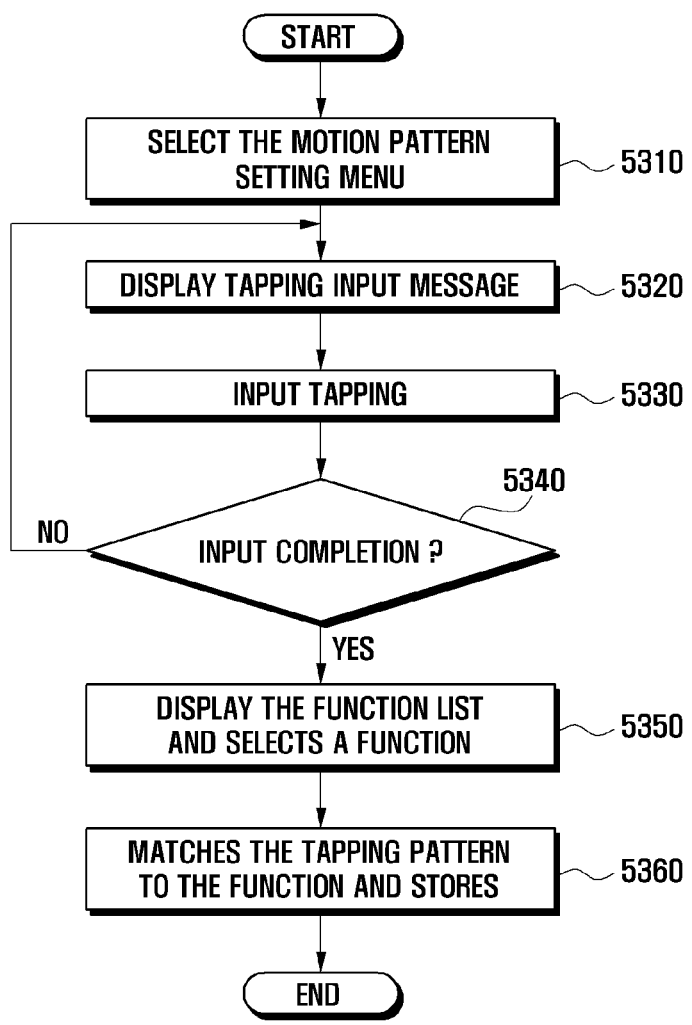

Referring to FIG. 27, first, a user sets and stores a tapping pattern and a function corresponding to the tapping pattern (5210). The portable terminal can receive the tapping pattern input and functions corresponding to the tapping patterns by providing a tapping pattern input setting menu. The process of setting and storing tapping patterns and the corresponding functions is illustrated in FIG. 28. Here, the tapping pattern may include at least one of the tapping intensity, the tapping position, the frequency of tapping, the tapping recognition time, time interval information between tappings, the entire tapping input time and the motion connection information with other motions, except the tapping from the tapping sense signal. The inputted tapping patterns and functions by patterns are stored in the storage unit in the form of database, and the number of tapping patterns can be arbitrarily set when designing a certain function.

Next, input of a tapping input by a user is recognized (5220). In case there is a tapping input by the user, the tapping pattern is determined from the tapping sense signal corresponding to the tapping input (5230). Specifically, the portable terminal outputs the tapping sense signal corresponding to the inputted tapping to the controller, and the controller determines the tapping pattern by analyzing the tapping sense signal. In case a plurality of tapping motions are inputted, the controller determines the user's tapping pattern after receiving all tapping sense signals. In case a critical time of the tapping input has been set up, the user sequentially inputs tapping motions, and if the critical time elapses from the last tapping motion, the controller considers that the tapping input is completed, and determines the tapping pattern for the inputted tappings. The controller determines the tapping pattern based on one of the tapping intensity, the tapping position, the frequency of tapping, the tapping recognition time, time interval information between tappings, the entire tapping input time, and the motion connection information with other motions excluding the tapping.

Figure 29:
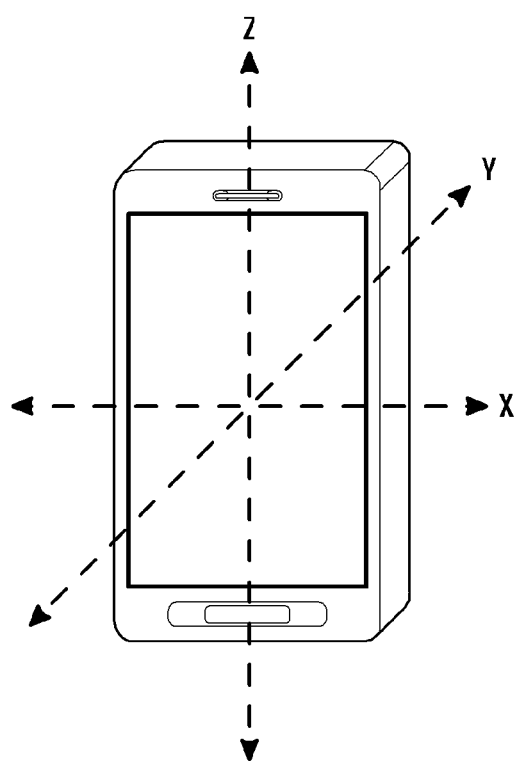

FIG. 29 illustrates a motion direction axis of a portable terminal according to an exemplary embodiment of the present invention.

When it is assumed that the sensor is an acceleration sensor, if the tapping motion of the user is input, the portable terminal generates a motion sense signal including acceleration change of each axis, and transmits the signal to the controller.

Figure 30:
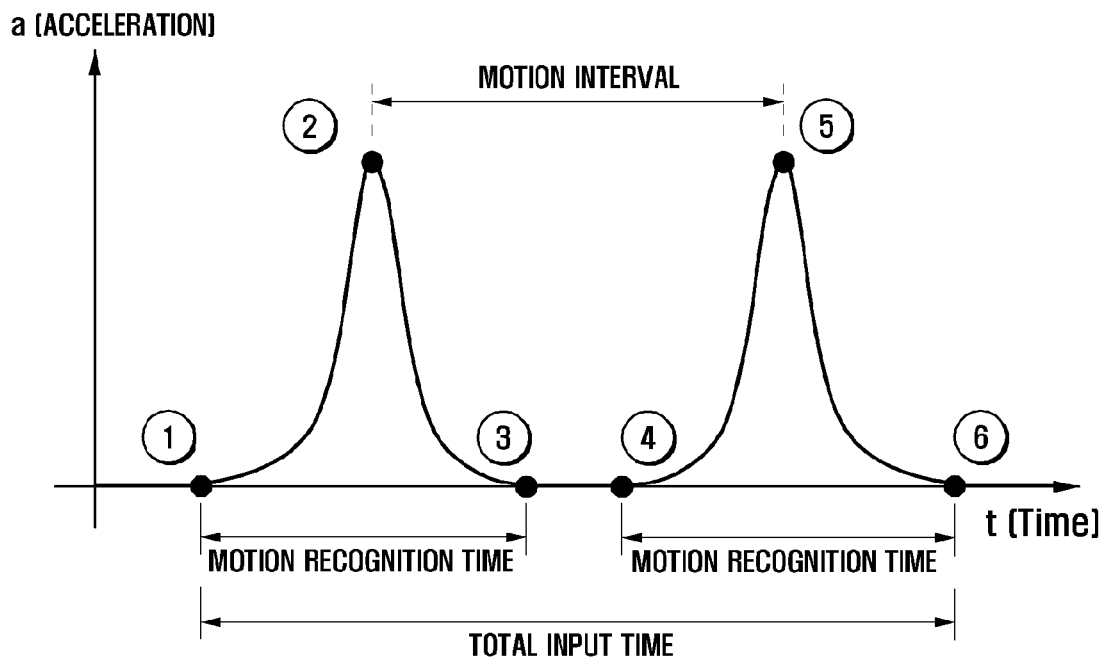

The controller determines the tapping pattern using the received motion sense signal. The tapping pattern is specifically illustrated in FIG. 30 and FIG. 31. In FIG. 29, if tappings are inputted on the side of the portable terminal, the acceleration is changed on X-axis in the portable terminal. FIG. 30 is a graph illustrating acceleration change in case two times of tapping are input on the right side of the portable terminal of FIG. 29, and FIG. 31 is a graph illustrating acceleration change if two taps are input on the left side of the portable terminal of FIG. 29.

Figure 31:
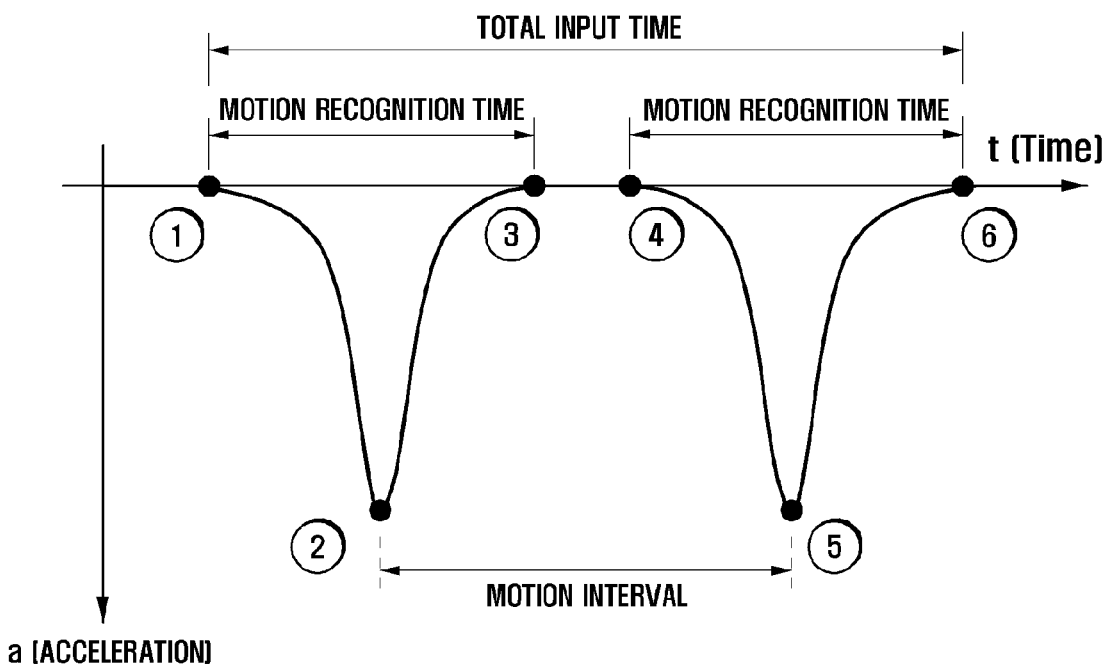

The controller determines the tapping intensity using acceleration values of positions ② and ⑤ in the graphs illustrated in FIG. 30 and FIG. 31. The pattern position is guessed using acceleration change of the X, Y and Z axes. In FIG. 31, the acceleration direction is opposite to that in FIG. 30 because the tappings have been inputted in a reverse direction. The controller can guess the tapping position by determining the direction of acceleration. FIG. 30 and FIG. 31 only illustrate acceleration change based on the X-axis, but if the acceleration change is checked on all X, Y and Z axes, the tapping potion can be accurately guessed.

The controller also determines the number of tappings using the frequency of the acceleration change. FIG. 30 and FIG. 31 show a graph illustrating the acceleration change when a total of two tapping motions are inputted. The controller can determine motion intervals by measuring time between positions ② and ⑤, and can measure tapping/motion recognition is time using ① & ③ and ④ & ⑥. Also, the controller can determine the entire tapping input time using ① and ⑥.

The controller can determine motions not only by using the tapping motions but also by linking other motions that are continually inputted. For example, in case the user inputs tappings in order and inputs a shaking motion, the controller can consider the inputted three taps as being cancelled. Then, if the user inputs tappings, the controller takes the tappings as a new tapping input and determines the tapping pattern.

The controller determines the inputted tapping pattern, and then compares the tapping patterns stored in the storage unit with the inputted tapping pattern (5240). The pattern information stored in the storage unit and the pattern information determined by the controller are compared. The stored tapping patterns may be provided from a scenario database or from an extension table inputted from the outside. For example, in case the frequency of tapping, tapping recognition time, and time interval between tappings are stored as pattern information, the controller compares the above pattern information, respectively. Also, in case certain values are stored as tapping patterns in the storage unit, the inputted tapping pattern and the stored tapping patterns can be compared in consideration of an error rate.

The function matched with the determined tapping pattern is searched from the scenario database stored in the storage unit (5250), and the searched corresponding function is then performed (5260). The searched function may correspond to an application stored in the portable terminal. The application may include a certain program executed in the portable terminal, and even when the background screen is being displayed or the screen is in the deactivate state, the application and corresponding program may be executed. It is possible to verify whether the user's pattern input has been accurately recognized before the function is performed. For example, in case the user inputs tappings according to a certain tapping pattern, if the user inaccurately inputs the tappings and exceeds the error range, the controller may execute a function that the user did not intend to use. Hence, the controller can prevent any function the user did not intend to use to be executed by informing the user of the function to be executed before the function is executed. The controller may inform the user of the function to be executed in advance by displaying a pop-up window on the display unit.

FIG. 28 is a flowchart illustrating the process of setting tapping patterns and the functions corresponding to the tapping patterns according to an exemplary embodiment of the present invention.

A user selects a motion pattern setting menu included in a general menu or a user setting menu. The motion pattern setting menu may be a menu that supports the setting of motion patterns. If the user selects the motion pattern setting menu (5310), the controller recognizes the selection of the motion pattern setting function, and performs the setting function. The controller controls the display unit to display a message that requests a tapping input (5320). If the user inputs tappings, the controller receives motion sense signals, and recognizes that the tapping motion is inputted (5330). If the user terminates input of tapping motions and enters the input completion key, the controller terminates the tapping input process (5340). If the user inputs at least one tapping and a given time elapses after the input of the last tapping, the controller may automatically terminate the tapping input process. After the user inputs at least one tapping, it is possible to cancel the tappings and input the tappings again by shaking the portable terminal.

The controller terminates the tapping input process, and then displays the list of at least one function in the portable terminal (5350). The application list may be included in the is function list.

If the user selects a certain function from the displayed function list, the controller recognizes the function selection, matches the tapping pattern inputted at step 5330 to the function selected at step 5350, and stores the setting in the storage unit (5360).

Figure 32:
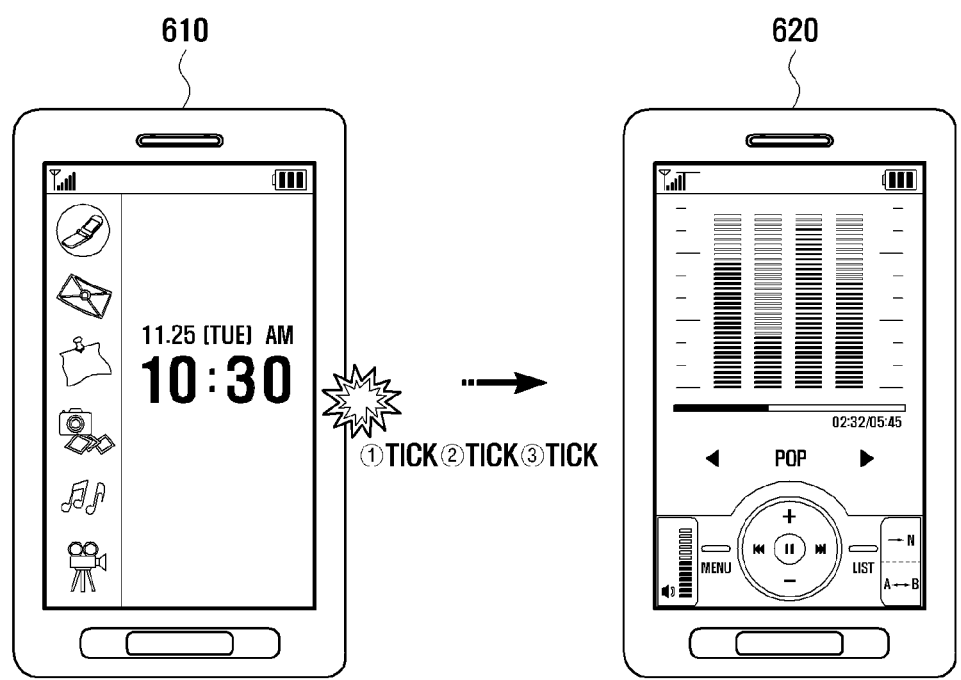

FIG. 32 displays a process of controlling an operation of a portable terminal related with the short-cut function according to an exemplary embodiment of the present invention.

Reference numeral 610 of FIG. 32 indicates an event in which three times of tapping are input on the right side of the portable terminal in an idle state. Reference numeral 610 may refer to an event in which a tapping motion is input in a screen-off state. As an example, three times of tapping on the right side of the portable terminal may be matched with a MP3 play function and stored before the tapping motion is input. The tapping pattern information stored in the storage unit may include the tapping position, the frequency of tapping, tapping intensity, tapping recognition time, and time interval between tappings.

Reference numeral 620 of FIG. 32 shows a screen where a MP3 function is executed. The function of directly executing an application in an idle state is called a short-cut function. The user can match a certain tapping pattern to MP3 execution function and store the correspondence, and execute MP3 player by inputting the stored tapping pattern using a short-cut function.

Figure 33:
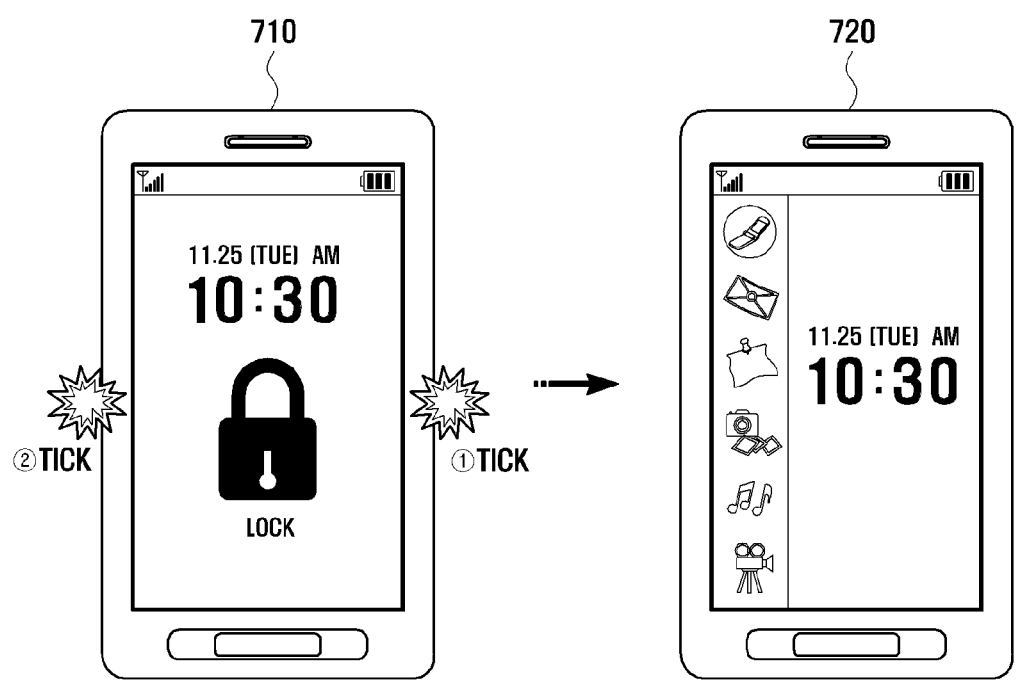

FIG. 33 shows a display screen showing the process of controlling operation of a portable terminal related with password control function according to an exemplary embodiment of the present invention.

Reference 710 of FIG. 33 indicates an event that in the touch-screen-locked state, is one tapping is input on the right side of a portable terminal, and one tapping is input on the left side. The portable terminal can perform a screen-unlock function or a password setting/removal function using the tapping of four directions (up, down, right, and left) and the front side/back side. Specifically, in case the user sets a password function by a tapping pattern (e.g., tick-tick-tickticktick) featured by the frequency of tapping and intervals between tappings, the user does not need to enter keys to unlock the screen or the system. The user may tap the portable terminal by a preset tapping pattern, and the unlocking function may be automatically executed by analyzing the inputted tapping pattern. In the present example, it is assumed that the user stored a pattern with one tapping on the right side and one tapping on the left side corresponding to a screen-unlocking function.

Reference numeral 720 of FIG. 33 shows a screen in an unlocked idle screen state. If the user inputs the tappings according to a stored tapping pattern as explained with reference to 710, the screen is unlocked, and the user can input commands using the screen.

Figure 34:
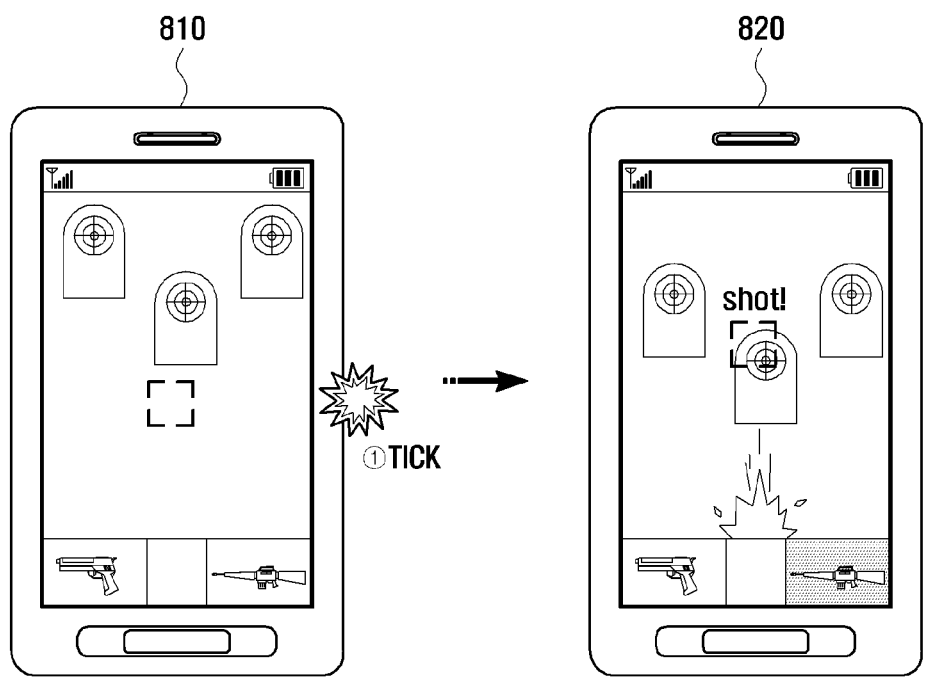

FIG. 34 shows a display screen illustrating the process of controlling operation of a portable terminal related with a game function according to an exemplary embodiment of the present invention.

Reference number 810 of FIG. 34 indicates a screen where a game application stored in a portable terminal is executed. The user matches a tapping pattern and a certain function of the game application through the motion pattern setting menu, and stores the correspondence before starting a game. For example, in the case of a war simulation game, it is assumed that the user matched one tapping on the right side to using the right side weapon, one tapping on the left side to using the left side weapon, and two times of tapping regardless of the tapping position to throwing a bomb. The user may execute the game application, and input one is tapping on the left side.

Reference numeral 820 of FIG. 34 indicates a screen where the right side weapon is used. If the user inputs one tapping on the right side, the controller takes the inputted tapping as using the right side weapon. The user can proceed with the game using tapping motions by storing the tapping pattern in advance, which allows a sensitive use of a portable terminal.

Figure 35:
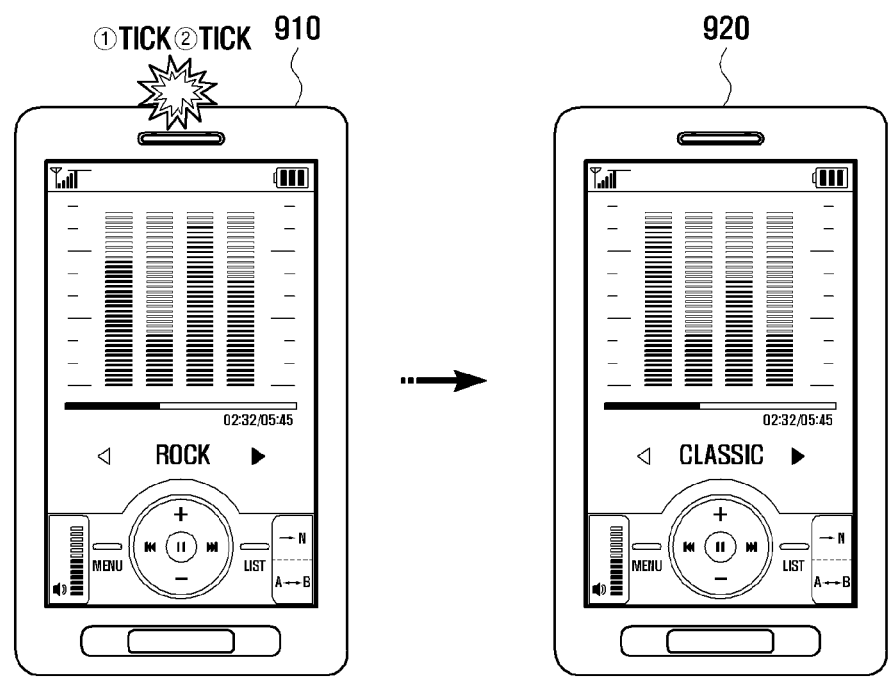

FIG. 35 shows a display screen illustrating the process of controlling operation of a portable terminal related with specific functions of a MP3 player according to an exemplary embodiment of the present invention.

Reference numeral 910 of FIG. 35 indicates a screen where MP3 player is executed. It is assumed that the user matched inputting two times of tapping on the upper front side of a portable terminal to a function for changing the equalizer mode of MP3 player through the motion pattern setting menu, and stored the correspondence before executing an MP3 player function. If the user inputs two times of tapping on the upper front side of the portable terminal while MP3 player function is activated, the equalizer mode is changed.

Reference numeral 920 of FIG. 35 indicates a screen where the equalizer mode is changed. The equalizer mode can be gradually changed by inputting tappings. Also, it is possible for the user to match each equalizer mode to a different tapping pattern depending on the embodiment. In such a case, it is possible to directly move to a certain equalizer mode by inputting tappings.

FIG. 36 shows a display screen illustrating the process of controlling an operation of a portable terminal related with sound source mixing.

Reference numeral 1010 of FIG. 36 indicates a display screen that enters the motion pattern setting menu and requests a motion input. In this example, the user may input "tickticktick-tick-tick." Reference numeral 1020 indicates a screen for selecting a function corresponding to the tapping pattern. A plurality of applications are listed in reference numeral 1020, and sound effect function application is also included in the application list. If the user selects sound effect, the controller matches "tickticktick-tick-tick" to the sound effect function, and the stores the correspondence. Reference numeral 1030 indicates a display screen which shows the correspondence between the tapping pattern and the application.

Then, the user executes an MP3 player application. Reference numeral 1040 indicates a screen where the MP3 player is executed. If the MP3 player application is executed, the controller controls the audio processing unit, and outputs sound. If the user inputs one tapping on the right side of a portable terminal, the controller outputs the sound effect of "ChakChakChak-Chak-Chak" by controlling the audio processing unit. The sound effect may be clapping sound, honking sound, drum sound, or the like, and the tempo is set up according to the tapping pattern input by the user in the motion pattern setting menu. Reference numeral 1050 indicates an event that MP3 music and the sound effect are output together. The sound effect may be output whenever the user inputs the tapping, and the sound effect may be continually output until another tapping is input after the tapping input. Through this function, the user can mix the user's designed sound effects with the stored music.

FIG. 37 illustrates the control of a scenario-based application program according to an exemplary embodiment of the present invention.

Referring to FIG. 37, a portable terminal of the present invention may include various application programs such as "A.app", "B.app" and "C.app" in a first process. Here, if the user chooses, for example, "A.app," the portable terminal loads "A.app" stored in the storage unit 170 to the controller in a second process. Here, the "A.app" is explained as a program that is directly selected by the user, but it may also be an automatically activated application program, such as a waiting screen output program, a menu screen output program, or a widget function output program.

Further, in the second process, the portable terminal may be controlled to perform a basic process for applying a scenario in order to perform application program control function according to "A.app" while loading "A.app." That is, the portable terminal refers to scenario database stored in the storage unit 170 in a third process, and may search for an input signal table corresponding to "A.app" among various input signal tables included in the scenario database (DB). The scenario DB may have input signal tables corresponding to various application programs stored in the storage unit 170. If there is no corresponding input signal table in the scenario DB, a corresponding input signal table may be downloaded from a certain web server or another portable terminal as explained above. The input signal tables allocated by application programs include at least one standards scenario including at least one motion signal, parameter types for each motion signal, information about parameter values, and information on commands to be executed by the application program through the corresponding motion signal. Referring to the illustrated drawing, A.1 disclosed in the standards scenario may be a command to be performed by the application program. For example, A.1 may be a command to terminate a currently activated application program or a command to perform a certain action of the application program. Also, in "Tap(a,b,c,d)," the motion corresponding to the motion signal is "Tap," and there are 4 types of parameters a, b, c and d. In case each parameter value corresponds to the corresponding alphabet, it provides a basis for recognizing the parameter value as a valid value. Likewise, when "C.app" application program is activated, C.1 may be loaded according to the control of the controller. For "C.app," the tilt may be specified as much is as the value indicated by parameters M and N. "Tilt(M,N)" corresponding to the command that can control certain operations of the application program "C.app" can provide the basis for taking as a command to apply the corresponding C.1 command. Each input signal table may be formed by a combination of respectively different motion signals for various commands.

If the corresponding application program, that is, an input signal table corresponding to "A.app" is searched in the scenario DB, the control unit of the portable terminal may be controlled to load standards scenarios disclosed in the corresponding input signal table in a fourth process.

Further, the portable terminal may be controlled to activate the sensor unit 130 and to generate sensor signals according to certain motions of the portable terminal. In the situation where such an activation is completed, if the user of the portable terminal gives certain physical force to the portable terminal, or changes the position of the portable terminal, the sensor unit 130 generates the sensor signal according to the physical force and transmits the signal to the controller in a fifth process. Here, the sensor unit 130 amplifies the signals collected by each sensor according to the received physical force using an amplifier, and converts the signals into digital signals using an analog-digital converter. Consequently, the sensor unit detects parameter values corresponding to various parameters such as the intensity, frequency, period, direction, and interval of each sensor; converts the signals into digital signals; and transmits the signals to the controller in a sixth process. For example, assuming that the sensor unit 130 has transmitted the value of the sensor signal (1, 1, 1, 1), the sensor signal (1, 1, 1, 1) transmitted by the sensor unit 130 may indicate types and values of certain parameters. That is, positions where numbers within parentheses are located may indicate types of certain parameters, and each number may indicate a certain value for the corresponding parameter.

In sixth process, when the sensor signal is received, the controller of the portable terminal determines motions based on the types and values of the corresponding parameters in a seventh process, and writes an input scenario based on the motions in the eighth process. For this, if at least one motion signal and a motion signal instructing completion of one input scenario are inputted, the controller of the portable terminal can write an input scenario.

If the writing of the input scenario is completed, in the ninth process, the controller of the portable terminal compares the input scenario written in the eighth process with at least one standards scenario loaded in the fourth process, and detects existence of the same standards scenario. Also, if the same standards scenario is detected, the controller of the portable terminal can extract command information included in the corresponding standards scenario, and transmit the command information to the function execution unit. The function execution unit can control an application program currently being operated based on the command information transmitted in the ninth process, and can, for example, terminate an application program or control the application program to perform a certain function.

In the foregoing detailed description of FIG. 37, serial numbers have been given for each process in order to explain the entire process, but the present invention is not necessarily performed in that order. That is, the activated point of the sensor unit 130 or the loading point of the standards scenario may be different from the explained time point. As such, exemplary embodiments of the present invention can be understood as controlling an application program based on motion signals generated based on sensor signals transmitted by the sensor unit 130 at the activated point of a certain application program, the input scenario written based on the at least one motion signal and commands included in the standards scenario corresponding to the input scenario.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of operating a portable terminal, the method comprising:
   determining at least one standards scenario corresponding to an application program in the portable terminal;
   operating at least one sensor in the portable terminal;
   receiving, from the at least one sensor, at least one sensor signal;
   generating a motion signal based on receiving the at least one sensor signal;
   generating an input scenario based on the motion signal;
   detecting, in the at least one standards scenario, a same standards scenario as the input scenario; and
   generating an input signal corresponding to the detected standards scenario, wherein generating the motion signal comprises providing a first motion signal selected from a plurality of motion signals, the first motion signal corresponding to the at least one sensor signal, and providing a second motion signal of the plurality of motion signals indicating that the input scenario is to be generated.

2. The method of claim 1, wherein determining at least one standards scenario comprises:
   detecting, in a scenario database, an input signal table associated with the application program; and
   detecting, in the input signal table, a standards scenario comprising a comparison criteria of the input scenario.

3. The method of claim 1, wherein receiving the at least one sensor signal comprises receiving the at least one sensor signal according to a change of acceleration, a change of direction, a change of vibration, and/or a change of pressure.

4. The method of claim 3, wherein generating the motion signal comprises generating the plurality of motion signals based on a first sensor signal from among the received at least one sensor signal.

5. The method of claim 1, wherein generating the motion signal comprises generating the motion signal based on a combination of at least two sensor signals transmitted by the at least one sensor.

6. The method of claim 1, wherein providing the first motion signal comprises providing, based on the at least one sensor signal, at least one motion signal selected from the group consisting of a tapping motion signal, a shaking motion signal, a snapping motion signal, a tilting motion signal, and a griping motion signal, and
   wherein the second motion signal comprises a no-operation motion signal.

7. The method of claim 6, wherein generating an input scenario comprises:
   preparing an input scenario by using at least one of the at least one motion signal successively input before the second motion signal indicating a completion of the input scenario is input; and
   generating the prepared input scenario as one input scenario.

8. The method of claim 1, further comprising:
   displaying a menu item of the portable terminal; and
   displaying a standards scenario corresponding to the motion signal for executing the menu item by using at least one of a text, an image, and an icon.

9. The method of claim 1, further comprising at least one of:
   executing the application program of the portable terminal; and
   displaying, using at least one of a text, an image, and an icon, a standards scenario for controlling the application program, the standards scenario corresponding to the input signal.

10. The method of claim 8, further comprising:
    displaying a parameter information comprising a frequency, a period, an intensity, and an interval of motion signals, based on the standards scenario.

11. The method of claim 1, further comprising:
    activating, in response to a key input or a touch on a touch screen, a motion user interface mode supporting generation of the input signal; and
    switching from an input mode of the portable terminal to the motion user interface mode.

12. The method of claim 1, wherein detecting a same standards scenario comprises:
    comparing the input scenario with a table comprising a plurality of standards scenarios; and
    detecting the same standards scenario if the same criteria scenario exists in the table.

13. A motion input device of a portable terminal, the motion input device comprising:
    a sensor detection unit configured to receive at least one sensor signal from at least one sensor unit;
    an operation recognition unit configured to generate, based on the at least one sensor signal, a motion signal;
    a scenario preparation unit configured to generate an input scenario based on the motion signal;
    a storage unit configured to store at least one application program; and
    a scenario mapping unit configured to detect, in a scenario database, a standards scenario corresponding to the input scenario, and to generate an input signal corresponding to the standards scenario in response to a determination that an application program has been executed in the portable terminal, and a determination that at least one standards scenario corresponding to the determined application program is stored in the scenario database,
    wherein the operation recognition unit is configured to generate the motion signal by providing a first motion signal selected from a plurality of motion signals, the first motion signal corresponding to the at least one sensor signal, and providing a second motion signal of the plurality of motion signals indicating that the input scenario is to be generated.

14. The motion input device of claim 13, wherein the storage unit comprises:
    the scenario database comprising at least one input signal table comprising the at least one standards scenario, the at least one standards scenario comprising a comparison criteria of the input scenario according to the application program.

15. The motion input device of claim 13, wherein the sensor unit comprises at least one sensor selected from the group consisting of an acceleration sensor, a gyro sensor, a vibration sensor, a pressure sensor, and a terrestrial magnetism sensor.

16. The motion input device of claim 13, wherein the operation recognition unit is configured to generate the plurality of motion signals based on the received at least one sensor signal, or to generate the first motion signal based on a combination of at least two of a plurality of sensor signals comprising the at least one sensor signal.

17. The motion input device of claim 13, wherein the operation recognition unit is configured to generate the first motion signal corresponding to at least one of a tapping motion signal, a shaking motion signal, a snapping motion signal, a tilting motion signal, and a griping motion signal based on the at least one sensor signal, and to generate the second motion signal corresponding to a no-operation motion signal.

18. The motion input device of claim 17, wherein the scenario preparation unit is configured to prepare the input scenario by using motion signals successively input before the second motion signal indicating a completion of the input scenario.

19. The motion input device of claim 13, further comprising a display unit comprising:
    an area configured to display a menu item; and
    an area configured to output at least one motion signal combination corresponding to the standards scenario for an execution of the menu item by using at least one of a text, an image, and an icon.

20. The motion input device of claim 13, further comprising a display unit comprising:

a screen display unit set according to an execution of a determined application program of the portable terminal; and an area configured to display, using at least one of a text, an image, and an icon, a standards scenario associated with at least one motion signal combination corresponding to the input signal for control of the determined application program.

21. The motion input device of claims 13, further comprising a display unit configured to display parameter information comprising a frequency, period, intensity, and interval of motion signals, according to the standards scenario.

22. The motion input device of claim 13, further comprising at least one of a key input unit configured to generate a key input for activating a motion user interface mode supporting the generation of the input signal; and a touch screen configured to display an image corresponding to the key input and a touch event according to a corresponding touch image.

23. The motion input device of claim 22, wherein, on the touch screen, a link image configured to activate the motion user interface mode is displayed or not displayed according to an activation and deactivation of the motion user interface mode, respectively.

* * * * *